(12) United States Patent
Burke

(10) Patent No.: US 12,740,910 B2
(45) Date of Patent: Sep. 22, 2026

(54) FALL CONTROL SYSTEM AND METHOD OF CONTROLLING A MOVEMENT DURING FALL

(71) Applicant: 2INNOVATE LLC, Hadley, MI (US)

(72) Inventor: Bradley Burke, Metamora, MI (US)

(73) Assignee: 2innovate, Hadley, MI (US)

( * ) Notice: Subject to any disclaimer, the term of this patent is extended or adjusted under 35 U.S.C. 154(b) by 1408 days.

(21) Appl. No.: 16/952,839

(22) Filed: Nov. 19, 2020

(65) Prior Publication Data

US 2021/0069052 A1 Mar. 11, 2021

Related U.S. Application Data

(63) Continuation-in-part of application No. 15/475,799, filed on Mar. 31, 2017, now Pat. No. 10,864,393.
(Continued)

(51) Int. Cl.
*A61H 3/00* (2006.01)
*A62B 35/00* (2006.01)
(Continued)

(52) U.S. Cl.
CPC ........... *A61H 3/00* (2013.01); *A62B 35/0081* (2013.01); *E04F 11/1863* (2013.01); *F16D 63/008* (2013.01); *A61H 2003/001* (2013.01); *A61H 2003/007* (2013.01); *A61H 3/008* (2013.01); *A61H 2201/163* (2013.01)

(58) Field of Classification Search
CPC .... A61H 3/00; A61H 3/008; A61H 2003/001; A61H 2003/007; A61H 2201/163; A61H 2201/1215; A61H 2201/1621; A61H 2201/1616; A61H 2201/1652;
(Continued)

(56) References Cited

U.S. PATENT DOCUMENTS 1,188,991 A * 6/1916 Putnam .................. E06C 1/397 188/41
3,780,663 A * 12/1973 Pettit .................... A61G 7/1042 119/857
(Continued)

FOREIGN PATENT DOCUMENTS

CA 2151984 A1 12/1996
CA 2800185 A1 6/2013
(Continued)

*Primary Examiner* — Daniel P Cahn
*Assistant Examiner* — Shiref M Mekhaeil
(74) *Attorney, Agent, or Firm* — Brooks Kushman P.C.

(57) ABSTRACT

A fall control system is described. The fall control system comprises an elongate guide rail extending along an axis, one or more than one trolley for moving along the elongate guide rail, a tether attached to the trolley at a first end, a second end of the tether for attaching to a user, and a speed control system for controlling a speed of the trolley along the elongate guide rail. The speed control system comprises one or more than one speed control track attached to the elongate guide rail and extending along the axis, a background speed controller coupled to the trolley and engaged with the one or more speed control track when the speed control system or the trolley is in a travelling orientation and controlling the speed of the trolley along the elongate guide rail to not exceeded a maximum walking speed.

18 Claims, 50 Drawing Sheets

Related U.S. Application Data

(60) Provisional application No. 62/316,420, filed on Mar. 31, 2016.

(51) Int. Cl.
*E04F 11/18* (2006.01)
*F16D 63/00* (2006.01)

(58) Field of Classification Search
CPC ............ A62B 35/0062; A62B 35/0081; A62B 35/0093; E04F 11/1863; F16D 63/008
USPC ............................................................ 182/37
See application file for complete search history.

(56) References Cited

U.S. PATENT DOCUMENTS 4,499,966 A 2/1985 Milne et al.
4,545,575 A * 10/1985 Forjot ................ A63B 21/4005 482/69
4,688,813 A 8/1987 Misawa et al.
4,788,463 A 11/1988 Layh
4,899,989 A * 2/1990 Kitson ................ E04F 11/1863 52/182
5,022,197 A 6/1991 Aragona
5,145,038 A 9/1992 Kuwahara
5,154,623 A 10/1992 Kuwahara
5,156,240 A 10/1992 Ostrobrod
5,158,510 A 10/1992 Lemire
5,269,227 A * 12/1993 Warren ..................... B66B 9/08 105/29.1
5,522,322 A * 6/1996 Warren ............... E04F 11/1863 5/81.1 R
5,638,919 A 6/1997 Pejout
5,908,087 A 6/1999 Johansson
6,019,195 A 2/2000 Pelofi
6,109,398 A 8/2000 Lempio et al.
6,176,355 B1 1/2001 Yamamoto
6,334,507 B1 * 1/2002 Westerweel ........ E04G 21/3261 182/36
6,389,618 B1 * 5/2002 Flynn ................... A61G 7/1042 5/81.1 R
6,412,611 B1 7/2002 Pribonic
6,659,230 B1 12/2003 Jenkins
6,666,147 B1 12/2003 Minges
6,679,353 B1 1/2004 Muranaka
7,395,764 B2 7/2008 Debrunner
7,870,695 B2 1/2011 Manson et al.
7,883,450 B2 2/2011 Hidler
8,234,980 B2 8/2012 Boren et al.
8,601,951 B2 12/2013 Lerner
10,016,634 B2 7/2018 Weston et al.
10,023,207 B2 7/2018 Brown
10,053,334 B1 8/2018 Cheng
2002/0047683 A1 4/2002 Kawashima
2005/0146213 A1 7/2005 Imanishi et al.
2005/0279580 A1 12/2005 Szentistvany
2006/0101614 A1 5/2006 Sellars
2006/0243112 A1 * 11/2006 Debrunner ............ B66B 9/0846 83/455
2007/0004567 A1 1/2007 Shetty et al.
2007/0039788 A1 * 2/2007 Fulton ....................... B60L 7/28 188/164
2008/0245617 A1 10/2008 Madoz Michaus et al.
2009/0294223 A1 12/2009 Hesl
2010/0037971 A1 * 2/2010 Scherer ................... F16L 57/00 138/104
2010/0314201 A1 12/2010 Stannah et al.
2011/0147125 A1 6/2011 Blomberg
2011/0162917 A1 * 7/2011 Steele ...................... B61H 9/02 188/65.1
2011/0203871 A1 8/2011 Faye et al.
2012/0031701 A1 2/2012 Jones
2012/0048652 A1 * 3/2012 DiGiovanni .......... B66B 9/0815 187/201
2013/0220743 A1 * 8/2013 Headings ................ B61H 9/02 188/65.1
2013/0327242 A1 12/2013 Bernier
2013/0333586 A1 12/2013 Cylvick
2014/0083801 A1 3/2014 Vroegindeweij
2014/0196990 A1 * 7/2014 Steele ................... B61B 12/105 188/65.2
2014/0231738 A1 * 8/2014 Amos ................ E04F 11/1863 188/67
2014/0311376 A1 10/2014 Brannan
2014/0326161 A1 * 11/2014 Halliday ............... F16D 63/008 188/65.1
2015/0135983 A1 5/2015 Halliday et al.
2015/0217151 A1 8/2015 Jones et al.
2015/0266454 A1 9/2015 McGowan
2015/0364958 A1 12/2015 Zanotti
2016/0052400 A1 * 2/2016 McGowan ................ B61B 3/00 188/165
2016/0272225 A1 9/2016 Liggett et al.
2016/0287989 A1 10/2016 Fung
2016/0355197 A1 12/2016 Brown
2017/0036123 A1 2/2017 Liggett et al.
2017/0088150 A1 3/2017 Christinet
2017/0217726 A1 * 8/2017 Guilani ..................... B66B 5/22
2018/0126287 A1 5/2018 Wilson et al.
2018/0214782 A1 8/2018 Hackett
2018/0216656 A1 * 8/2018 Bailey ..................... B60C 27/10
2018/0229070 A1 8/2018 McBridge et al.
2020/0346671 A1 11/2020 Sulc et al.
2021/0101031 A1 4/2021 Bornack et al.

FOREIGN PATENT DOCUMENTS

CN 1872365 A 12/2006
DE 102018102325 A1 8/2019
EP 2522399 A2 11/2012
EP 2870982 A2 5/2015
JP H1057435 A 3/1998
JP 2005192836 A 7/2005
WO 2002074389 A2 9/2002
WO 2009108040 A1 9/2009
WO 2014116628 A1 7/2014
WO 2014195227 A2 12/2014

* cited by examiner

FALL CONTROL SYSTEM AND METHOD OF CONTROLLING A MOVEMENT DURING FALL

CROSS-REFERENCE TO RELATED APPLICATIONS

This application is a continuation-in-part of U.S. application Ser. No. 15/475,799 filed Mar. 31, 2017, which has issued as U.S. Pat. No. 10,864,393 on Dec. 15, 2020 which, in turn, claims the benefit of U.S. provisional application Ser. No. 62/316,420 filed Mar. 31, 2016, the disclosures of which are hereby incorporated in their entirety by reference herein.

STATEMENT REGARDING FEDERALLY SPONSORED RESEARCH OR DEVELOPMENT

This invention was made with government support under award number (FAIN) 2304063 awarded by the National Science Foundation (NSF) Technology, Innovation and Partnerships. The government has certain rights in the invention.

TECHNICAL FIELD

The present disclosure relates to a fall control system and a method of controlling a movement during a fall event.

BACKGROUND

Unintentional falls are a leading cause of non-fatal injuries treated in hospital emergency departments. The Centers for Disease Control and Prevention (USA), reported that unintentional falls in the elderly resulted in more non-fatal injuries in 2013 than the top 2 to top 10 leading causes of injuries in that age category (>65 years of age) combined.

Fall assist or fall arrest systems have been developed to lessen the frequency of injuries arising from unintentional falls, see for example EP 2,522,399, U.S. Pat. No. 7,883,450, US 2007/0004567, WO 2014/116628. In known fall assist systems, a person is attached to a harness that is coupled to a trolley that runs along a guiding track. During regular use, the person exerts a pulling force on the trolley, thereby moving the trolley along the guiding track. During a fall event, a braking system within the trolley is activated and the trolley comes to a complete stop thereby arresting the person from further movement and preventing the person from impacting the ground. Braking systems typically used in fall assist systems include friction engagement systems, for example as described in CA 2,800,185, and WO 2002/074389, or ratchet-like engagement braking systems, for example as described in EP 2,870,982, US 2012/0031701 or US 2015/0217151

Other mobility aiding systems have also been developed. For example, stairlift systems transport a person over a flight of stairs. Generally, such systems comprise a guide rail, an electrical motorized trolley for moving along the guide rail (with or without a backup battery), and a passenger seat or platform attached to the trolley. In use, a passenger sits on the seat, or stands on the platform, attaches a seat-belt like device, and is carried from a first point to a second point along the guide rail. No movement on the passenger's part, other than to board and alight the seat or platform, is required.

SUMMARY

The present disclosure relates to a fall control system and a method of controlling a movement during a fall event.

It is an object of the present disclosure to provide an improved fall control system.

As described herein there is provided a fall control system that allows a user to ascend and descend stairs, or travel along a level surface, on their own accord. The fall control system decreases the user's fall distance during a fall event and limits the vertical drop of the user towards the ground, and does not completely stop a user from impacting or contacting the ground during a fall event.

A fall control system comprising, an elongate guide rail extending along an axis, a trolley for moving along the elongate guide rail, a tether attached to the trolley at a first end, a second end of the tether for attaching to a user, and a speed control system for controlling a speed of the trolley along the elongate guide rail is provided. The speed control system comprises one or more than one speed control track attached to the elongate guide rail and extending along the axis, a surface of the speed control track selected from a flat surface, a wave-like surface, a toothed or geared surface, or a combination thereof. The speed control system may also comprise a background speed controller, and a speed controller. The background speed controller coupled to the trolley and engaged with the one or more speed control track when the speed control system or the trolley is in a travelling orientation, the background speed controller selected from the group of one or more than one background eddy current brake, one or more than one background pre-tensioned gear, one or more than one background onset wheel, and a combination thereof, the background speed controller for controlling the speed of the trolley along the elongate guide rail in the travelling orientation to not exceed a maximum walking speed. The speed controller coupled to the trolley and engageable with the one or more than one speed control track, the speed controller displaceable from a first position when the speed control system or the trolley is in the travelling orientation and the speed controller is not engaged with the speed control track, to a second position when the speed control system or the trolley is in a falling orientation and the speed controller is engaged with the speed control track, the speed controller selected from the group of one or more than one eddy current brake, one or more than one pre-tensioned gear, one or more than one onset wheel, one or more than one offset wheel, a wave-like surface on the body of the trolley, a flat surface on the body of the trolley, and a combination thereof, the speed controller for controlling the speed of the trolley along the guide rail in the falling orientation to not exceed a maximum fall speed. The maximum walking speed being greater than the maximum fall speed, and the maximum walking speed and the maximum fall speed being greater than zero.

Also described herein is the fall control system as described above, wherein one of the one or more than one speed control track is a background speed control track, the background speed control track engaged with the background speed controller, and a second of the one or more than one speed control track is for engaging the speed controller. For example, the background speed control track and the speed control track may be the same, or alternatively, the background speed control track and the speed control track may be separate.

Also provided is the fall control system as described above, wherein the background speed control track, the speed control track, or the background speed control track and the speed control track is conductive. For example, a circular shaft of the elongate guide rail may be conductive, or one or more than one elongate portion of the guide rail is conductive, and the background speed controller is the background eddy current brake. Furthermore, the background speed controller may comprise one or more than one background magnet coupled to the trolley and positioned on the trolley so that when the trolley is mounted on the elongate guide rail, the one or more than one background magnet is adjacent the background speed control track and the background eddy current brake is activated when the trolley moves along the guide rail. Also provided is the fall control system as described above, wherein the background speed controller comprises a gear wheel comprising a plurality of teeth and the trolley comprises a moveable arm (swing arm) on a pivot configured to interact with the teeth of the gear wheel. When the trolley is moved along the elongate guide rail, the gear wheel is rotated and its rotation is slowed by the resistance caused by the contact between the moveable arm and the teeth of the gear wheel. The more limited the movement of the moveable arm about its pivot, the greater resistance is provided to the movement of the gear wheel (and therefore movement of the trolley). In some embodiments, the moveable arm may be configured to provide resistance when the gear wheel rotates in one direction, but not in the opposite direction.

The fall control system as described above is also provided, wherein the surface of the speed control track is a wave-like surface and the speed controller is a wave-like surface on the body of the trolley, a flat surface on the body of the trolley, or one or more than one onset wheel. Alternatively, the surface of the speed control track may be a flat surface and the speed controller is a wave-like surface on the body of the trolley, a flat surface on the body of the trolley, or one or more than one offset wheel. For example, when the trolley is in the travelling orientation, the wave-like surface on the body of the trolley, the flat surface on the body of the trolley, or the onset wheel, is separated from the speed control track by a sufficient distance that the speed controller is not active, and when the trolley moves from the first position (travelling orientation) to the second position (falling orientation), in the second position the wave-like surface on the body of the trolley, the flat surface on the body of the trolley, or the onset wheel, is brought into contact with the speed control track. In some embodiments, the surface of the speed control track may be a flat or wave-like surface, and the speed controller is a surface on the body of the trolley, which may be a flat or wave-like surface. For example, when the trolley is in the travelling orientation, the speed control track and the trolley surface are separated by a sufficient distance that the speed controller is not active, and when the trolley moves from the first position to the second position the trolley surface is brought into contact with the speed control track. Some embodiments comprise combinations of the speed control tracks and controllers described herein.

The speed control track of the fall control system, as generally described above, may comprise the one or more than one elongate portion of the guide rail that is conductive, and the speed controller may comprise one or more than one magnet coupled to the trolley and positioned on the trolley so that when the trolley is in the travelling orientation, the one or more than one magnet is separated from the speed control track by a sufficient distance that the eddy current brake is not active, and when the trolley moves to the falling orientation from the first position to the second position, in the second position the one or more than one magnet of the speed controller is brought into a position adjacent the one or more than one elongate portion of the guide rail that is conductive, thereby activating eddy current brake.

A fall control system is provided as described above, wherein a surface of the background speed control track is the toothed or geared surface, and the background speed controller is the one or more than one background pre-tensioned gear, and the speed control track is the toothed or geared surface and the speed controller is the one or more than one pre-tensioned gear. A fall control system is also provided as described above, which may not comprise a background speed control system. For example, if the fall control system is to be installed for a user to walk along a flat surface with a substantially horizontal guide rail, a background speed controller to control the speed on the trolley in the travelling orientation may not be required.

The trolley may move along the elongate guide rail using any known rail and trolley system. In some embodiments, the guide rail comprises a circular shaft and the trolley comprises a corresponding recess for the circular shaft. Rolling elements positioned between the shaft and trolley surfaces may be used to assist movement of the trolley along the guide rail. Alternative means for providing a smooth, low friction surface, for example, self-lubricating bearing elements may also be used. In other embodiments, the elongate guide rail may comprise one or more than one raceway and the trolley may comprise one or more than one rollers for moving along the one or more than one raceway.

A fall control trolley for moving along an elongate guide rail is also provided. The trolley comprises, a body, optionally a background speed controller coupled to the body, and a speed controller coupled to the body: The background speed controller for engaging with one or more speed control track when the trolley is mounted on a guide rail and in a travelling orientation, the background speed controller selected from the group of one or more than one background magnet, one or more than one background pre-tensioned gear, one or more than one background onset wheel, and a combination thereof, the background speed controller for controlling the speed of the trolley along the elongate guide rail in the travelling orientation to not exceed a maximum walking speed. A speed controller for engaging with the one or more than one speed control track, when the speed controller is displaced from a first position, when the trolley is in the travelling orientation and the speed controller is not engaged with the speed control track, to a second position when the trolley is in a falling orientation and the speed controller is engaged with the speed control track. The speed controller selected from the group of one or more than one magnet, one or more than one pre-tensioned gear, one or more than one onset wheel, one or more than one offset wheel, a wave-like surface on the body of the trolley, a flat surface on the body of the trolley, and a combination thereof, the speed controller for controlling the speed of the trolley along the guide rail in the falling orientation to not exceed a maximum fall speed, wherein the maximum walking speed being greater than the maximum fall speed, and the maximum walking speed and the maximum fall speed being greater than zero. In some embodiments, the fall control trolley may not comprise the background speed controller.

The fall control trolley as described above may move from the travelling orientation to the falling orientation by rotating about a circular shaft and an axis, of the elongate guide rail. Alternatively, the fall control trolley as described above may comprise a braking arm, the braking arm moveable from a travelling orientation (first position) to a falling orientation (second position). In one group of embodiments, the braking arm may rotate about an elongate axis of the trolley body from the travelling orientation to the falling orientation. For example, the braking arm may comprise an elongate pin and the trolley body may comprise a recess to receive the pin. In other embodiments, the elongate pin may be part of the trolley body and the braking arm may comprise the recess to receive the pin. The braking arm may be biased towards the first position whereby upon application of a force by the user in a direction generally opposed to the biasing force that overcomes the biasing force, the braking arm moves from the travelling orientation to the falling orientation to engage the speed controller with the speed control track. Alternatively, the braking arm may be positioned above the trolley and biased towards the travelling orientation (first position), whereby upon the application of a force by the user in a direction generally opposed to the biasing force that overcomes the biasing force, the braking arm moves from the travelling orientation to the falling orientation to engage the speed controller with the speed control track. For example, the braking arm may be positioned above the trolley on a retainer that is compressible upon application of a force by the user to displace the braking arm from the first position to the second position, where the speed controller is engaged with the speed control track.

A method for controlling a movement of a movable object during a fall event is also described herein. The method comprising:

(a) coupling a first end of a tether to a trolley, the trolley being moveable along an elongate guide rail extending along an axis, the trolley comprising a background speed controller (optionally) and a speed controller, the background speed controller active while the trolley is in a first position, in a travelling orientation, and the speed controller active when the trolley is in a second position, in a falling orientation;

(b) coupling a second end of the tether to the moveable object;

(c) exerting a pulling force, through the tether, on the trolley that is sufficient to move the trolley along the elongate guide rail while in the travelling orientation, the background speed controller controlling the speed of the trolley along the elongate guide rail to not exceed a maximum walking speed;

(d) during the fall event, exerting a falling force, through the tether, on the trolley that is sufficient to displace the trolley from the first position to the second position, the speed controller for controlling the speed of the trolley along the guide rail in the falling orientation to not exceed a maximum fall speed; and (e) allowing the moveable object to descend towards a ground at a controlled speed Preferably the maximum walking speed is greater than the maximum fall speed, and the maximum walking speed and the maximum fall speed are greater than zero. Also provided is a method wherein the coupling in step (a), the trolley may not comprise a background speed controller.

Also provided herein is a transfer belt comprising, a padded belt for placement about a user's waist, an attachment cable fixed to the belt at a first and a second end and located along a forward-facing portion of the belt, the attachment cable for receiving a tether and providing side-to-side movement of the tether from the first end to the second end when the tether is attached to attachment cable, a cable backing attached to the belt and placed behind the belt attachment cable, the cable backing extending at least between the first and the second end, a cable cover attached to the padded belt below the attachment cable and comprising a free end protruding out from the belt and partly or fully overlapping the attachment cable, the cable cover extending at least between the first and the second end. In some embodiments, the transfer belt may comprise two or more attachment cables for receiving two or more tether ends attached to the trolley The fall control system described herein may allow the user, following a fall, to move (e.g., crawl) along the floor or stairs while still attached to the fall control system should he or she be injured and/or too weak to stand fully erect. The trolley of the fall control system is typically pulled along by the user (when ascending stairs or moving along a flat surface), or by gravity (when descending stairs) and does not require an external power source. However, an external power source may be used to move the trolley if desired. For example, in some embodiments an external power source may assist the user to move the trolley along the elongate guide rail. In some embodiments, an external power source (e.g., a battery-powered remote control train) may push or pull the trolley to meet the user (or a second user) at the opposite end of the guide rail.

The guide rail of the fall control system described herein may also be used as a standard height hand rail (for example, approximately 30-37 inches from the floor or stairs), or can be installed in addition to a standard hand rail. If installed as a separate rail, then the guide rail may be located at some distance above and parallel to the standard hand rail. In some embodiments, the trolley may lag behind the user travelling upstairs, and may lead the user travelling downstairs, and there would be room for the users hand on the rail ahead of the trolley walking upstairs, and behind the trolley walking downstairs (given an adequate and proper tether length). In some embodiments described herein, the trolley may lag behind the user when descending stairs and there would be room for the users hand on the rail ahead of the trolley walking downstairs (given an adequate and proper tether length). Similarly, on a level surface the trolley would lag behind the user, allowing room for the hand in front of the trolley. In some embodiments, the guide rail of the fall control system may be installed on a wall at least above waist height of the user. In some embodiments, the guide rail of the fall control system may be installed on a wall at least above shoulder height of the user.

The outer surface of the trolley (not including the funnel-like opening for the tether) may be padded with high density foam to decrease the chance of injury should the user fall forwards, backwards, or sideways and strike their head or other part of their body on the trolley.

The trolley may also comprise a pad moveable with the trolley and configured to hang between the user and the wall on which the guide rail is installed. The pad may be a fitness pad, crash pad or any other suitable pad to prevent or reduce injury to the user should they fall against the wall or handrail. The pad may be attached to the trolley so that it rides away from the wall while the trolley is moving. The attachment of the pad to the trolley may comprise a hinge and the pad may comprise one or more folds or creases so that the pad can readily be folded away when not in use. The attachment of the pad to the trolley may be permanent, or the pad may be removable so that the pad can be removed for storage purposes or to prevent the pad from tearing in the event of significant downward forces. The pad may have a low friction and/or durable backing to reduce resistance and reduce wear and tear from repetitive gliding over the wall and/or handrail. If use of the handrail is required, the pad may comprise one or more holes or cut-outs to allow the user to hold the handrail. The holes or cut-outs may comprise hinged flaps to avoid or reduce injury to the user should they fall on the part of the pad with the hole or cut-out. Alternatively, the pad may comprise a built-in handrail or ledge at standard height from the floor, constructed, for example, of a dense contoured foam connected to, or part of, the pad that the user grasps while walking. The pad may extend to, or higher than, the elongate guide rail to cover (glide over) part of the guide rail adjacent to the side end(s) of the trolley, and/or cover most of the trolley facing the user (except for an opening for the tether attachment) to protect the user from directly striking the trolley or guide rail in the event of a fall towards the wall. A padded flap may overhang the trolley's tether attachment site to also reduce the chance of injury. For added stability, the pad may also be attached to the elongate guide rail via one or more smaller "mini trollies" that passively glide along the same guide rail as the trolley, with the "mini trollies" travelling at a distance from one or both ends of the trolley.

There is provided a fall control system comprising, an elongate guide rail extending along an axis and comprising a circular shaft, the elongate guide rail for mountain to a wall, a trolley for moving along the circular shaft of the elongate guide rail, the trolley comprising an attachment end, the attachment end of the trolley extending outwards from the elongate guide rail in a direction substantially perpendicular to a longitudinal plane of the elongate guide rail, a tether attached to the attachment end of the trolley at a first end, a second end of the tether for attaching to a user, and a speed control system for controlling a speed of the trolley along the elongate guide rail, the speed control system comprising: one or more than one speed control track extending along the axis of the elongate guide rail, the one or more than one speed control track comprising a first surface and a second surface; a speed controller coupled to the trolley, the trolley rotatably displaceable about the circular shaft from a first position when the trolley is in the travelling orientation and the speed controller does not reduce speed, or temporarily stop movement, of the trolley along the elongate guide rail, to a second position when the trolley is in a falling orientation and the speed controller reduces speed, or temporarily stops movement, of the trolley along the elongate guide rail, the speed controller comprising one or more than one wheel assembly for interacting with the first surface of the one or more than one speed control track, the wheel assembly comprising: an onset wheel with a first axel on a first center of rotation of the onset wheel or an offset wheel with a second axel off a second center of rotation of the offset wheel, the speed controller further comprising a surface of the trolley for interacting with the second surface of the one or more than one speed control track, the speed controller for controlling the speed of the trolley along the elongate guide rail in the falling orientation. The fall control system may be mounted on a wall, or on a wall bracket mounted on the wall such that the attachment end of the trolley extends outwards from the elongate guide rail in a direction substantially perpendicular to a longitudinal plane of the elongate guide rail, and substantially perpendicular to the wall.

There is provided a fall control system comprising, an elongate guide rail comprising a circular shaft and a conductive portion extending along a shoulder of the elongate guide rail, a trolley for moving along the elongate guide rail, a tether attached to the trolley at a first end, a second end of the tether for attaching to a user, and a speed control system for controlling a speed of the trolley along the elongate guide rail, the speed control system comprising: one or more than one speed control track extending along the axis of the elongate guide rail, the one or more than one speed control track comprising a first surface and a second surface; a background speed controller coupled to the trolley and engaged with the conductive portion of the elongate guide rail, the background speed controller comprising one or more than one magnet, the background speed controller for controlling the speed of the trolley along the elongate guide rail in a travelling orientation while the user is walking, ascending stairs, or descending stairs; a speed controller coupled to the trolley, the trolley rotatably displaceable about the circular shaft from a first position when the trolley is in the travelling orientation and the speed controller does not reduce speed, or temporarily stop movement, of the trolley along the elongate guide rail, to a second position when the trolley is in a falling orientation and the speed controller reduces speed, or temporarily stops movement, of the trolley along the elongate guide rail, the speed controller comprising one or more than one wheel assembly for interacting with the first surface of the one or more than one speed control track, the wheel assembly comprising: an onset wheel with a first axel on a first center of rotation of the onset wheel or an offset wheel with a second axel off a second center of rotation of the offset wheel, the speed controller further comprising a surface of the trolley for interacting with the second surface of the one or more than one speed control track, the speed controller for controlling the speed of the trolley along the elongate guide rail in the falling orientation, and the second surface of the speed control track, the surface of the trolley of the speed controller, or both the second surface of the speed control track and the surface of the trolley of the speed controller, is a material selected from a group consisting of: metal, sandblasted metal, rubber, sandblasted rubber, polymeric material, and sandblasted polymeric material; or, both the second surface of the speed control track and the surface of the trolley of the speed controller comprise a brake pad.

The conductive portion extending along the shoulder of the elongate guide rail may be located between a wall mounting portion and the shaft of the elongate guide rail, a side of the elongate guide rail adjacent a wall mounting portion, or a combination thereof. The conductive portion of the elongate guider rail may be made of a ferromagnetic material such as aluminum.

In some embodiments, the first surface of the speed control track may be a sinusoidal wave surface, and the wheel assembly of the speed controller may comprise an onset wheel. In some embodiments, the first surface of the speed control track may be a flat surface, and the wheel assembly of the speed controller may comprise an onset wheel. In some embodiments, the first surface of the speed control track may be a flat surface, and the wheel assembly of the speed controller may comprise an offset wheel. In some embodiments, the second surface of the speed control track and the surface of the trolley of the speed controller may both be flat surfaces. In some embodiments, the second surface of the speed control track and the surface of the trolley of the speed controller may both be sinusoidal wave surfaces. In some embodiments, the second surface of the speed control track may be a sinusoidal wave surface and the surface of the trolley of the speed control track is a flat surface, or the second surface of the speed control track may be a flat surface and the surface of the trolley of the speed control track is a sinusoidal wave surface.

In some embodiments, the wheel assembly of the speed controller may be an onset wheel and the onset wheel is a deformable onset wheel. In some embodiments, the one or more than one wheel assembly of the speed controller comprises an onset wheel, wherein the wheel assembly further comprises a retainer for biasing the onset wheel towards the first surface of the speed control track.

In some embodiments, the conductive circular shaft may be made of a material, selected from a group consisting of aluminum, anodized aluminum, steel, stainless steel, a metal alloy, a ceramic coated aluminum, a ceramic coated anodized aluminum, a ceramic coated steel, a ceramic coated stainless steel, a ceramic coated metal alloy.

There is provided a fall control system comprising, an elongate guide rail comprising one or more than one raceway, a trolley configured to move along the one or more than one raceway of the elongate guide rail, the trolley comprising a trolley body and a braking arm, the braking arm attached to the trolley body and moveable from a first position to a second position, the braking arm comprising an attachment end and a braking end, the attachment end of the braking arm extending outwards from the trolley body in a direction substantially perpendicular to a longitudinal plane of the elongate guide rail; a tether attached at a first end to the attachment end of the braking arm, a second end of the tether for attaching to a user, and a speed control system for controlling a speed of the trolley along the elongate guide rail, the speed control system comprising: one or more than one speed control track extending along the axis of the elongate guide rail, the one or more than one speed control track comprising a first surface, and a speed controller coupled to the trolley, the speed controller comprising a surface of the braking arm for interacting with the first surface of the one or more than one speed control track, wherein the braking arm is movable from the first position when the trolley is in the travelling orientation and the speed controller does not reduce speed, or temporarily stop movement, of the trolley along the elongate guide rail, to the second position when the trolley is in a falling orientation, so that the surface of the braking arm engages the first surface of the one or more than one speed control track, and the speed controller reduces speed, or temporarily stops movement, of the trolley along the elongate guide rail, the speed controller for controlling the speed of the trolley along the elongate guide rail in the falling orientation, and the first surface of the speed control track is a sinusoidal wave surface and the surface of the braking arm is a flat surface or a sinusoidal wave surface, or the first surface of the speed control track is a flat surface and the surface of the braking arm is a sinusoidal wave surface or a flat surface. The fall control system may be mounted on a wall, or on a wall bracket mounted on the wall such that the attachment end of the braking arm extends outwards from the elongate guide rail in a direction substantially perpendicular to a longitudinal plane of the elongate guide rail, and substantially perpendicular to the wall.

In some embodiments, the trolley may comprise one or more than one roller for moving along the one or more than one raceway of the elongate guide rail. The one or more than one raceway of the elongate guide rail may comprise one or more than one rod, and the one or more than one roller may engage with the one or more than one rod. In some embodiments, the one or more than one rod may comprise a convex surface and the one or more than one roller of the trolley may comprise a corresponding concave surface, or vice versa.

There is provided a fall control system comprising, an elongate guide rail comprising one or more than one pair of raceways, a trolley comprising one or more than one pair of rollers for moving the trolley along the one or more than one pair of raceways of the elongate guide rail, the trolley comprising a trolley body and a braking arm, the braking arm moveable from a first position to a second position, a tether attached to the trolley at a first end, a second end of the tether for attaching to a user, and a speed control system for controlling a speed of the trolley along the elongate guide rail, the speed control system comprising: one or more than one speed control track extending along the axis of the elongate guide rail, the one or more than one speed control track comprising a first surface; and a speed controller coupled to the trolley, the speed controller comprising a surface of the trolley for interacting with the first surface of the one or more than one speed control track, wherein the braking arm is movable from the first position when the trolley is in the travelling orientation and the speed controller does not reduce speed, or temporarily stop movement, of the trolley along the elongate guide rail, to the second position when the trolley is in a falling orientation and the speed controller reduces speed, or temporarily stops movement, of the trolley along the elongate guide rail, the speed controller for controlling the speed of the trolley along the elongate guide rail in the falling orientation, and the first surface of the speed control track is a sinusoidal wave surface and the surface of the trolley of the speed control track is a flat surface or a sinusoidal wave surface, or the first surface of the speed control track is a flat surface and the surface of the trolley of the speed control track is a sinusoidal wave surface or a flat surface, wherein the one or more than one pair of rollers are attached to each end of a swivel arm that rotates around a pivot on the trolley body having a first axis of rotation substantially perpendicular to the direction of movement of the trolley (and substantially perpendicular to the longitudinal plane of the elongate guide rail), and wherein each roller in each one or more pair of rollers is pivotable about a second axis of rotation substantially perpendicular to the direction of movement of the trolley (and substantially parallel to the longitudinal plane of the elongate guide rail), wherein the movement of the swivel arm about the first axis of rotation and movement of each roller about the second axis of rotation allow the trolley to move along a guide rail curving in any direction. In some embodiments, the braking arm comprises an attachment end and a braking end, the attachment end of the braking arm extending outwards from the trolley body in a direction substantially perpendicular to a longitudinal plane of the elongate guide rail. The fall control system may be mounted on a wall, or on a wall bracket mounted on the wall such that the attachment end of the braking arm extends outwards from the elongate guide rail in a direction substantially perpendicular to a longitudinal plane of the elongate guide rail, and substantially perpendicular to the wall.

In some embodiments, the first surface of the speed control track, the surface of the trolley of the speed controller, or both the first surface of the speed control track and the surface of the trolley of the speed controller, may be a material selected from a group consisting of: metal, sandblasted metal, rubber, sandblasted rubber, polymeric material, and sandblasted polymeric material; or, both the second surface of the speed control track and the surface of the trolley of the speed controller comprise a brake pad.

In some embodiments, the braking arm may comprise a circular shaft extending substantially parallel to the elongate guide rail for pivotally displacing the braking arm between the first position and the second position, the braking arm biased to the first position, the first surface of the speed control track is on a lower end of the elongate guide rail and the surface of the trolley is on a lower end of the braking arm and positioned to face the first surface of the speed control track, and wherein in the first position, the surface of the trolley is not engaged with the first speed control track, and wherein in the second position, the surface of the trolley is engaged with the first surface of the speed control track.

In alternative embodiments, the braking arm may be positioned above the trolley and slidable in a plane parallel to the plane of the elongate guide rail from the first position to the second position, the braking arm biased to the first position, the first surface of the speed control track is on an upper end of the elongate guide rail and the surface of the trolley is on an upper end of the braking arm and positioned to face the first surface of the speed control track, and wherein in the first position, the surface of the trolley is not engaged with the first speed control track, and wherein in the second position, the surface of the trolley is engaged with the first surface of the speed control track. The trolley may further comprise a braking plate moveable in a compartment formed by the body of the trolley and a guide plate, the braking plate slidable in a plane parallel to the elongate guide rail when the braking arm moves from the first position to the second position. The compartment may comprise one or more rolling elements in the compartment, the rolling elements sandwiched between the braking plate and the guide plate and between the braking plate and the body of the trolley.

In some embodiments, the speed control system may further comprise a background speed controller coupled to the trolley and engaged with the elongate guide rail, the background speed controller for controlling the speed of the trolley along the elongate guide rail in a travelling orientation while the user is walking, ascending stairs, or descending stairs. The background speed controller may comprise one or more than one magnet and the elongate guide rail comprises a conductive portion extending along the elongate guide rail. The conductive portion of the elongate guide rail may be the shaft of the elongate guide rail. Alternatively, the conductive portion of the elongate guide rail may be located between a wall mounting portion and the shaft of the elongate guide rail, a side of the elongate guide rail adjacent a wall mounting portion, or a combination thereof. Alternatively or in addition to the magnets and conductive portion. In embodiments where the trolley comprises one or more than one roller for moving the trolley along the elongate guide rail or raceway of the elongate guide rail, the background speed controller may comprise a gear wheel coupled to the one or more the one roller of the trolley, the gear wheel comprising a plurality of teeth, and the trolley comprises a moveable arm configured to interact with the teeth of the gear wheel.

In some embodiments, the trolley further comprises a hanger (at the attachment end of the trolley or the braking arm), and the tether is attached to the hanger. In some embodiments, the tether may further comprise a belt or harness to be worn by the user. In some embodiments, the fall control system may comprise two or more trollies. For example the fall control system may comprise one or more than one second trolley for moving along the elongate guide rail, and a second tether attached to the one or more than one second trolley at a first end, a second end of the second tether for attaching to the user. One or more than one of the second trollies may comprise a speed controller and/or a background speed controller.

In some embodiments, the fall control system may comprise a secondary wheel assembly comprising a secondary wheel for interacting with a surface of the elongate guide rail. The secondary wheel assembly may comprise a retainer for biasing the secondary wheel towards the surface of the elongate guide rail. The secondary wheel may be a deformable wheel.

In some embodiments, the trolley may further comprise one or more protective coverings for shielding the user from magnetic fields. The one or more protective coverings may comprise a first covering comprising a ferromagnetic material and a second covering comprising a non-magnetic material.

In some embodiments, the fall control system may further comprise a pad attached to the trolley and configured to be positioned between the user and a wall when the trolley is mounted on the guide rail and the guide rail is mounted on the wall, the pad moveable with the trolley along the elongate guide rail. The pad may comprise one or more than one pad wheel at a lower edge of the pad. The pad may comprise one or more than one holes to allow the user to hold a handrail mounted on the wall, and/or the pad may comprise a handrail attached to the pad, or a handrail built-in to the pad. In some embodiments, the pad is positioned to cover the trolley, a portion of the guide rail, or a combination thereof. The pad may be foldable at one or more fold axis. The pad may be removeably attached to the trolley.

In some embodiments, the tether comprises two or more attachment points for attaching the trolley to the user. In some embodiments, the first end of the tether is attached to a hanger on the braking arm. In some embodiments, the first end of the tether comprises a swivel connection to allow rotation of the tether with respect to the braking arm, e.g., a 360-degree swivel connection.

There is further provided a fall control trolley for use in the fall control system described herein, the fall control trolley for moving along an elongate guide rail.

There is further provided a method for controlling movement of a moveable object during a fall event using the fall control system described herein, the method comprising: (a) coupling the first end of the tether to the trolley of the fall control system, the trolley being moveable along the elongate guide rail extending along the axis of the elongate guide rail, the trolley comprising the speed controller and optionally comprising the background speed controller, the background speed controller active while the trolley is in the first position, in the travelling orientation, and the speed controller active when the trolley is in the second position, in the falling orientation; (b) coupling the second end of the tether to the movable object, (c) exerting a pulling force, through the tether, on the trolley that is sufficient to move the trolley along the elongate guide rail while in the travelling orientation, the background speed controller controlling the speed of the trolley along the elongate guide rail to not exceed a maximum walking speed; (d) during the fall event, exerting a falling force, through the tether, on the trolley that is sufficient to displace the trolley from the first position to the second position, the speed controller for controlling the speed of the trolley along the guide rail in the falling orientation to not exceed a maximum fall speed; and (e) allowing the moveable object to descend towards a ground at a controlled speed, wherein the maximum walking speed is greater than the maximum fall speed, and the maximum walking speed and the maximum fall speed are greater than zero.

This summary does not necessarily describe the entire scope of all aspects of the disclosure. Other aspects, features and advantages will be apparent to those of ordinary skill in the art upon review of the following description of specific embodiments.

BRIEF DESCRIPTION OF THE DRAWINGS

In the accompanying drawings, which illustrate one or more exemplary embodiments.

DETAILED DESCRIPTION

The present disclosure relates to a fall control system and a method of controlling a movement during a fall event.

Directional terms such as "top," "bottom," "upwards," "downwards," "vertically," and "laterally" are used in the following description for the purpose of providing relative reference only, and are not intended to suggest any limitations on how any article is to be positioned during use, or to be mounted in an assembly or relative to an environment. The use of the word "a" or "an" when used herein in conjunction with the term "comprising" may mean "one," but it is also consistent with the meaning of "one or more," "at least one" and "one or more than one." Any element expressed in the singular form also encompasses its plural form. Any element expressed in the plural form also encompasses its singular form. The term "plurality" as used herein means more than one, for example, two or more, three or more, four or more, and the like.

As used herein, the terms "comprising," "having," "including" and "containing," and grammatical variations thereof, are inclusive or open-ended and do not exclude additional, un-recited elements and/or method steps. The term "consisting essentially of" when used herein in connection with a composition, use or method, denotes that additional elements, method steps or both additional elements and method steps may be present, but that these additions do not materially affect the manner in which the recited composition, method or use functions. The term "consisting of" when used herein in connection with a composition, use or method, excludes the presence of additional elements and/or method steps.

Figure 17A:
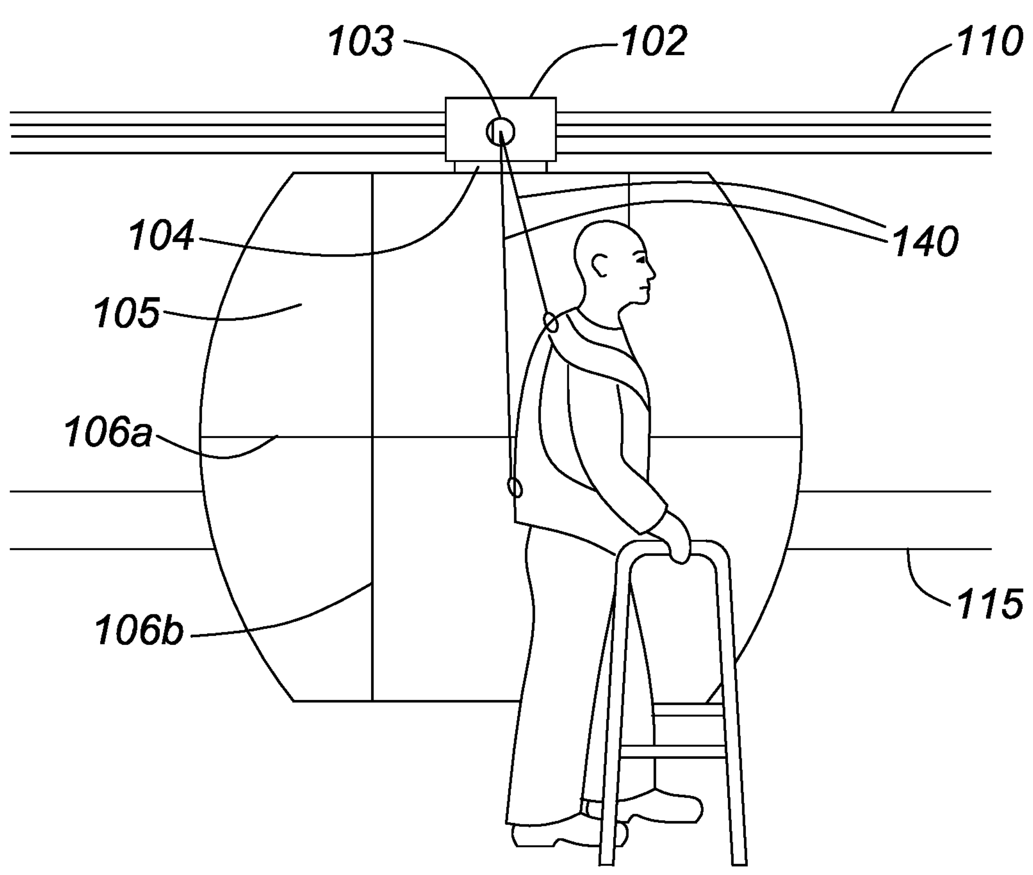
FIG. 17A shows a side view of another example of a fall control system with pad as described herein whilst in use attached to a user.

As described herein there is provided a non-electrical fall control system that allows a user to ascend and descend stairs or level surface on their own accord (travelling orientation of the fall control system). The fall control system generally comprises an elongate guide rail and a trolley that moves along the elongate guide rail. The trolley generally moves by being pulled by the user, and no external electrical power source is used to move the trolley when attached to the user. However, in some embodiments an external power source may assist the user to move the trolley along the elongate guide rail. In some embodiments, an external power source (e.g., a battery-powered remote control train) may push or pull the trolley to meet the user (or a second user) at the opposite end of the guide rail. The fall control system decreases the user's ground impact speed during a fall event (falling orientation of the fall control system), limits the vertical drop of the user towards the ground, and does not completely stop a user from impacting or contacting the ground during a fall event. The fall control system described herein may allow the user, following a fall, to move (e.g., crawl) along the floor or stairs while still attached to the fall control system should he or she be injured and/or too weak to stand fully erect. The general arrangement of the various fall control systems described herein is shown in FIGS. 1A, 1B and 17A.

Figure 1A:
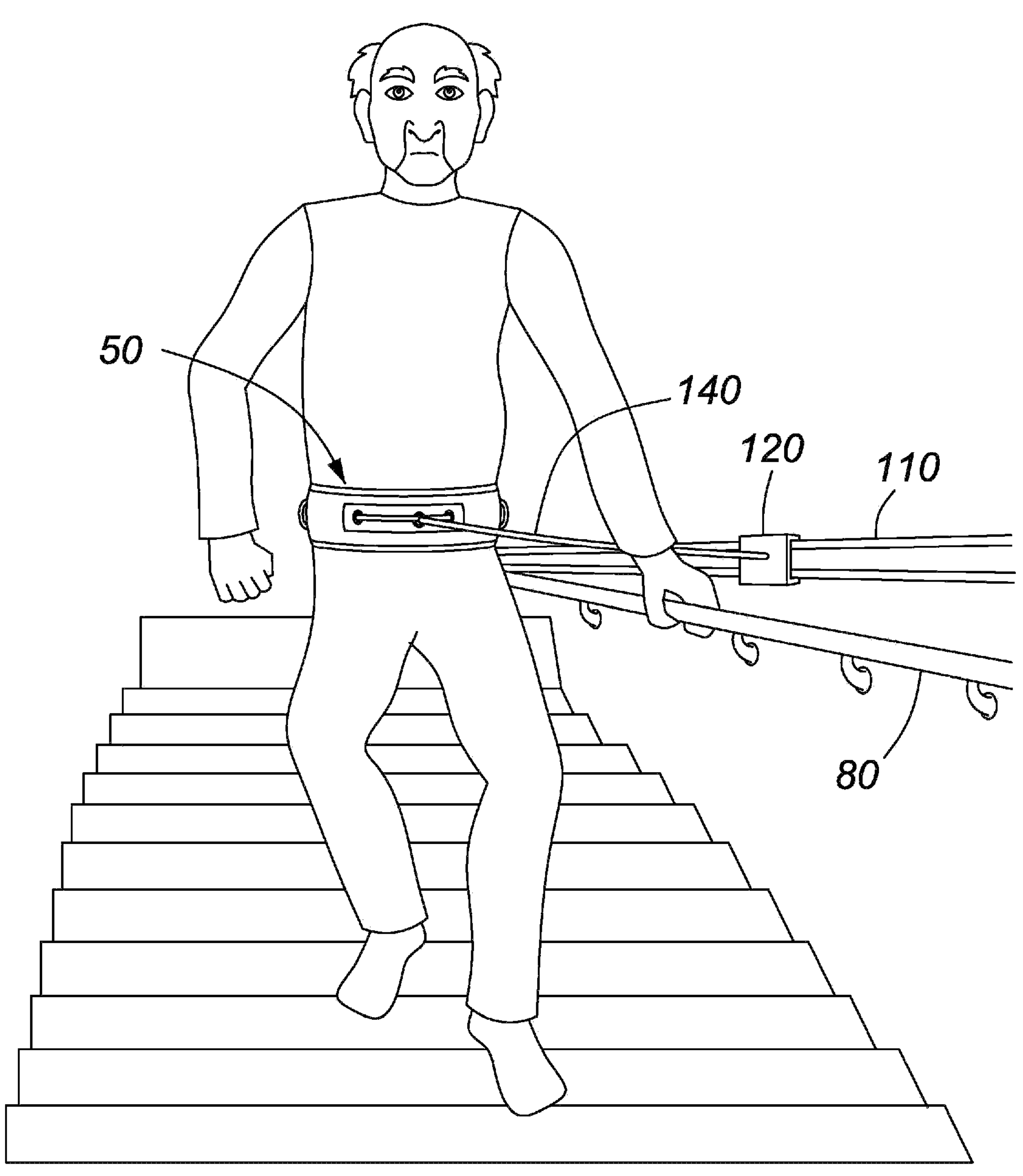
FIG. 1A shows a perspective view of a person ascending a set of stairs using an example of a fall control device as described herein.

With reference to FIG. 1A there is shown a user ascending a set of stairs while attached to a fall control system as described herein. The fall control system may be used while the user is moving along a horizontal surface, or while the user is descending or ascending stairs of any pitch or steepness. In the example shown in FIG. 1A, the user is wearing a belt 50 that is connected to a trolley 120 by an adjustable length tether 140. While the user ascends the stairs in a travelling orientation, trolley 120 moves along guide rail 110 by being pulled by the user along the guide rail 110 via tether 140. The trolley is not electric, or powered by an external power source when attached to the user.

In the example shown in FIG. 1A, the guide rail 110 is separate from the handrail, and the user may hold onto a regular hand rail if desired. As shown in FIG. 1B, the guide rail 110 may also be used as a standard height hand rail (approximately 25-60 inches, such as 30-37 inches from the floor or stairs), or it can be used along with a standard hand rail (FIG. 1A). If both a hand rail and a guide rail are used, then the guide rail 110 is generally placed parallel to the standard hand rail 80 and at a suitable height, for example above the hand rail. In use, the trolley 120 will move along guide rail 110 and lag behind the user travelling upstairs (FIG. 1A), and may lead the user travelling downstairs (FIG. 1B). However, in some embodiments described herein, the trolley may lag behind the user when descending stairs. As a result, the user may place their hand on the hand rail ahead of the trolley walking upstairs, or behind the trolley walking downstairs. The user may also use the guide rail 110 as a hand rail on a level surface as the trolley would lag behind the user, allowing room for their hand in front of trolley 120.

Figure 1B:
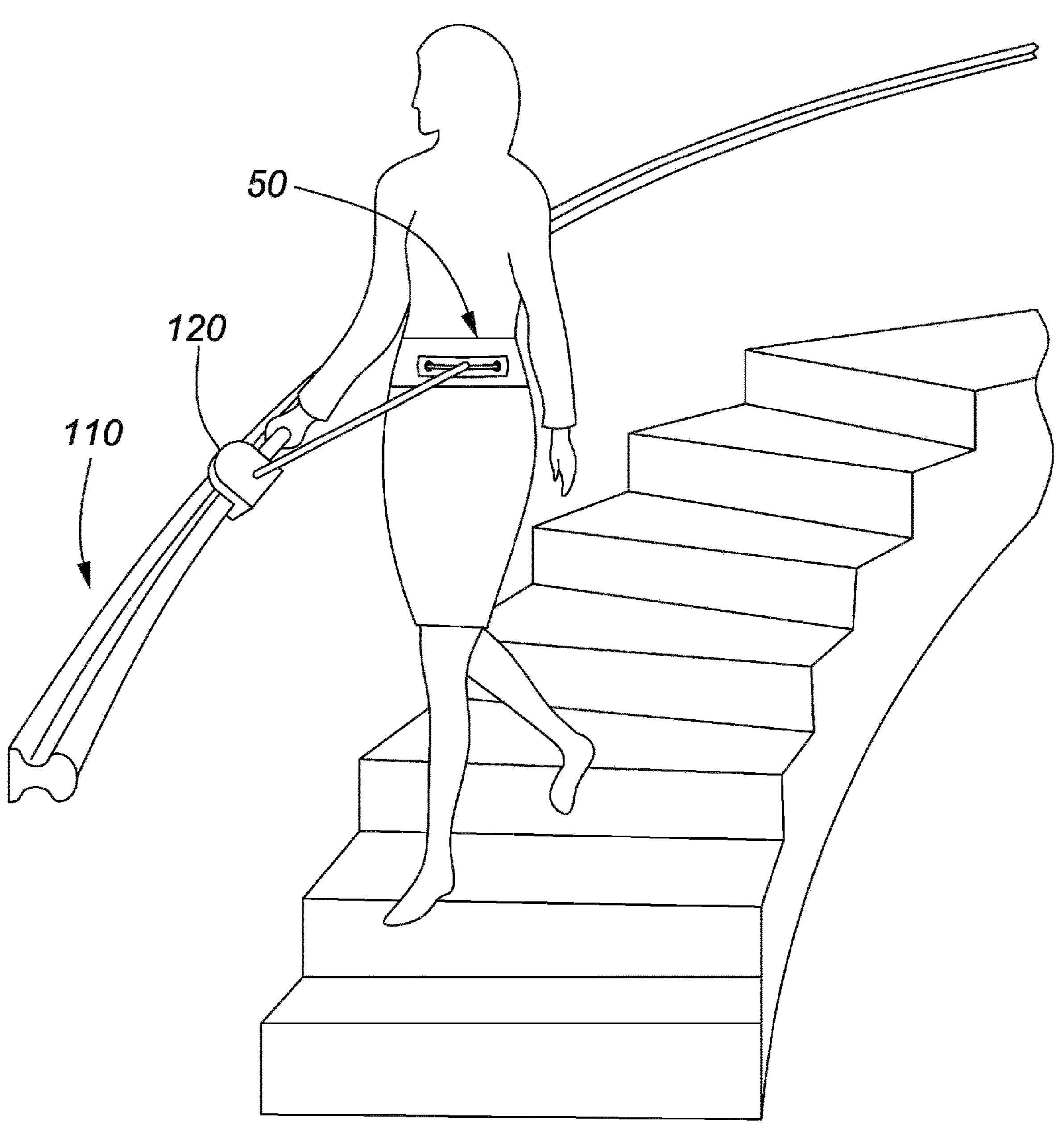
FIG. 1B shows a perspective view of a person descending a set of curved stairs using of another configuration of an example of a fall control device as described herein.

FIG. 1B also shows an alternate configuration of a fall control system described herein where the guide rail 110 is curved to match the curve of the curved stair case. In this example, the user is descending the stairs and the trolley is moving along the guide rail under the influence of gravity.

The trolley (120, FIGS. 2A, 2B, 3A; 220, FIGS. 3B, 5A-5D, 6A; 320, FIGS. 4, 6B; 620, FIGS. 8A, 8B, 9A, 9B, 10A, 10B, 11A, 11B), is typically of a light weight and the outer layer or surface 118 of the trolley may be padded (e.g., FIGS. 9A, 9B, 10A, 10B), for example, with a high density foam. This arrangement may help to decrease chance of injury should the user fall forwards, backwards, or sideways and strike their head or other part of their body on the trolley. Additionally, in some examples described herein, that comprise the trolley 120 disposed within a C-shaped guide rail 110, the outer surface or layer 118 of the guide rail 110 may be padded (FIGS. 2A, 2B, 3A, 4) to decrease chance of injury should the user fall forwards, backwards, or sideways and strike their head or other part of their body on the C-shaped guide rail.

The trolley comprises a speed control system comprising one or more than one background speed control system, and one or more than one speed retarding subsystem, which interact with the guide rail, a portion of the guide rail, a speed control track, a background speed control track, or a combination thereof. Collectively, the speed control system controls movement of the trolley along the guide rail. The trolley can transition from a first position (or travelling orientation) to a second position (or falling orientation). At the first position when the trolley in a travelling orientation, the trolley may be in a resting position (not moving along the guide rail), or the trolley may be moving along the guide rail at speed controlled by the background speed control system. In the travelling orientation the trolley moves at a speed that does not greatly exceed a usual maximum walking speed of the user. At a second position, or fall orientation, the trolley moves along the guide rail at a speed that is less than the usual walking speed and significantly less than a maximum fall speed. If the user falls, the fall control system transitions to the second position (fall orientation) and the one or more than one speed retarding subsystem is activated. When the speed retarding subsystem is activated, the movement of the trolley along the guide rail is reduced, thereby slowing the speed of user's fall and minimizing any injury that would occur as a result of the fall.

For some applications, e.g., where the guide rail is horizontal, the background speed control system may not be required to slow the movement of the trolley in the travelling orientation. In such embodiments, the speed control system may simply comprise the one or more speed controller for controlling the speed of the trolley in the falling orientation in the event of a fall (e.g., see FIG. 18E). All of the fall control systems shown in FIGS. 9-19 may comprise or may not comprise the background speed controller.

By "travelling orientation" or 'first position" it is meant the relative position of the trolley, one or more than one trolley component, or a combination thereof with respect to the guide rail, a background speed control track (if present), a speed control track, or combination thereof. The travelling orientation is achieved when the trolley is in a resting position (i.e., not moving along the guide rail) or when the trolley is attached to a user and the trolley moving along the guide rail as the user is walking, ascending, or descending stairs. In the travelling orientation the background speed control system may be activated.

By "falling orientation" or "second position" it is meant the relative position of the trolley, one or more than one trolley component, or a combination thereof with respect to the guide rail, the background speed control track (if present), the speed control track, or combination thereof. The falling orientation is achieved when the trolley is attached to a user and the user falls thereby imparting a force on the tether, the trolley body, one or more than one trolley component, or a combination thereof. In the falling orientation the speed retarding subsystem is activated.

"speed control system" as used herein refers to the combination of the background speed control system and the speed retarding subsystem, of the fall control system.

A "background speed control system" as used herein refers to a combination of elements that control the speed of the trolley when the trolley is in the travelling orientation. The background speed control system may comprise a background speed control track, located along, beside, on the surface of, or within, the guide rail, and one or more than one background speed controller attached to the trolley body. The background speed controller interacts with the background speed control track when the trolley is the travelling orientation.

A "background speed controller" refers to an element or a combination of elements that are a part of the trolley body and that engage directly or indirectly with the background speed control track, or the speed control track, when the fall control system is in the travelling orientation. The background speed controller may include one or more than one magnet, a pre-tensioned wheel, a pre tensioned gear wheel, one or more than one onset wheel (i.e., the axel is on the center of rotation of the wheel), or a combination thereof.

A "background speed control track" refers to a track that located along, beside, on the surface of, or within, the guide rail. The background speed control track may comprise a flat surface, a toothed (gear) surface, a wave-like surface, a conductive surface, a conductive body, or a combination thereof. In some examples described herein the background speed control track and the speed control track may be the same element.

A "speed retarding subsystem" as use herein refers to a combination of elements that control the speed of the trolley when the trolley is in a falling orientation. The speed retarding subsystem comprises a speed control track located along, beside, on the surface of, or within, the guide rail, and a speed controller located in the trolley body. The speed controller engages or interacts with the speed control track when the trolley is the falling orientation:

A "speed controller" as used herein refers to an element or a combination of elements that are a part of the trolley body that engage or interact with the speed control track. The speed controller may include one or more than one magnet, a pre-tensioned wheel, a pre tensioned gear wheel, one or more than one onset wheel, one or more than one offset wheel (i.e., the axel is off the center of rotation of the wheel), a wave-like surface of the trolley body, or a combination thereof.

A "speed control track" as used herein refers to a track that is located along, beside, on the surface of, or within, the guide rail. The speed control track may comprise a flat surface, a toothed (gear) surface, a wave-like surface, a conductive surface, a conductive body, or a combination thereof. In some examples described herein the speed control track and the background speed control track may be the same element.

Figure 2A:
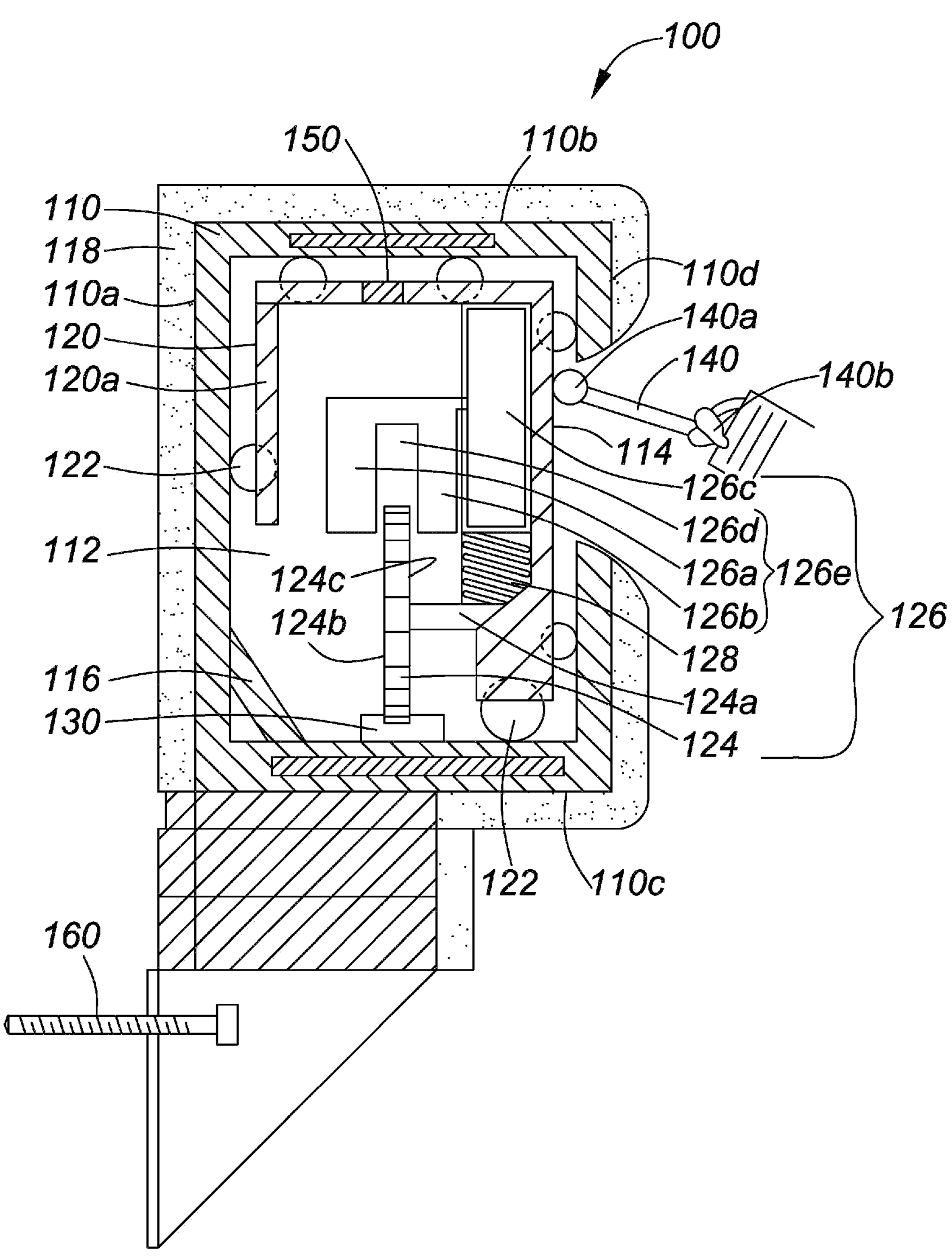
FIG. 2A shows a cross-sectional side view of an example of a fall control system as described herein.
Figure 2B:
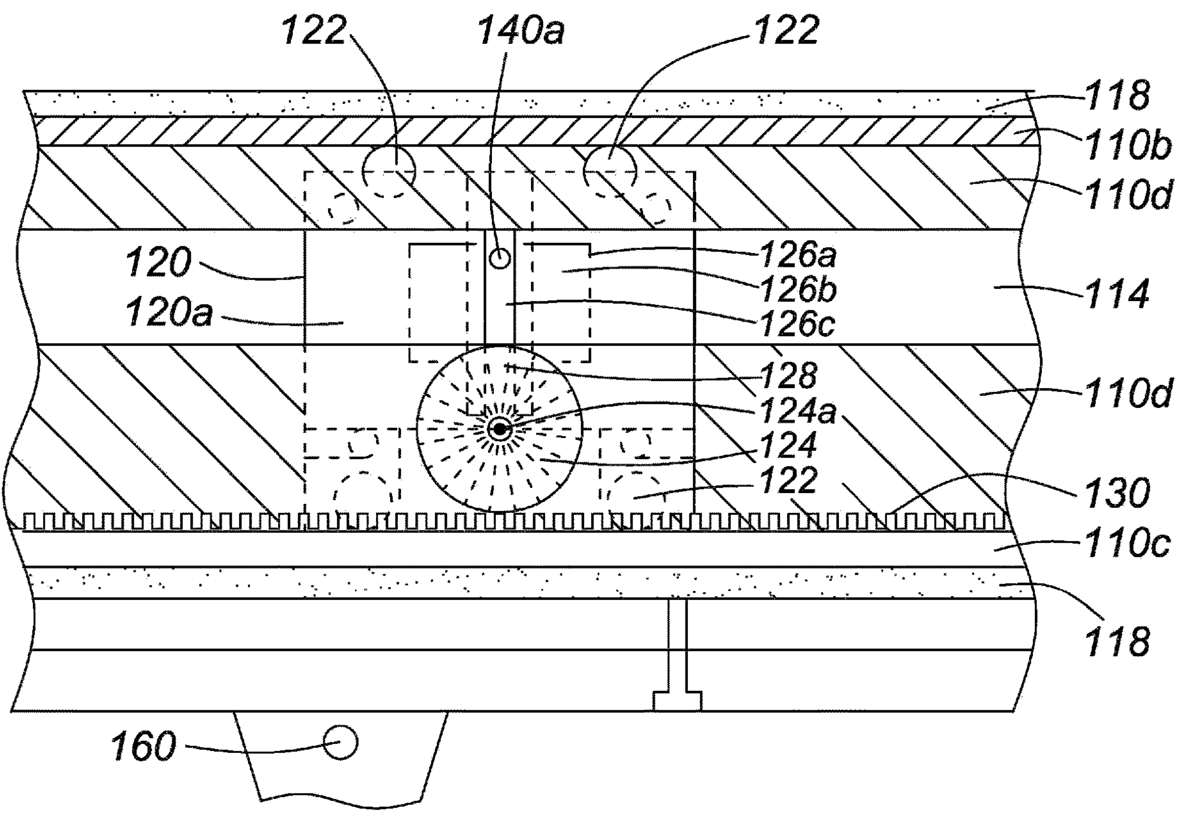
FIG. 2B shows a front view of the fall control system of FIG. 2A. In this example, the fall control system comprises an eddy current brake speed control system. The eddy current brake speed control system comprising a pair of magnetic arms and a conductive gear wheel rotatable therebetween.

Referring to FIGS. 2A and 2B, there is provided an example of a fall control system 100 comprising an elongate guide rail 110, a trolley 120 for moving along an elongate guide rail 110, and an adjustable length tether 140 that passes through an opening in the trolley 120 and couples to support 126*c*, of a speed control system 126. In this example, the guide rail has a general C shape when viewed in cross section.

The guide rail 110 comprises a mounting surface 110*a*, a top surface 110*b*, a base surface 110*c*, and a surface 110*d* that is opposite the mounting surface 110*a*. The surfaces 110*a*, 110*b*, 110*c*, and 110*d* of the guide rail 110 define a spatial volume 112. One or more reinforcing supports 116 for connecting a surface 110*a*, 110*b*, 110*c*, or 110*d* to an adjacent surface (e.g., the mounting surface 110*a* and the base surface 110c as depicted in FIG. 2A) may be provided for improving the structural integrity of the guide rail 110. The outer surface of the guide rail 110 may also be surrounded with a protective cover 118, for example, but not limited to, a metallic cover, high density foam, or a plastic rail cover. An elongate opening 114 is defined within the surface 110d of the guide rail 110 and defines the C-shape of the guide rail. The opening 114 extends along a length, and an elongate axis, of the guide rail 110.

The guide rail 110 may be manufactured of any material suitable in the art, for example, but not limited to, a suitable metal, aluminum, steel, copper, nickel, tungsten, zinc, iron, tin, titanium, stainless steel, nichrome, an alloy, or a resilient polymeric material, and manufactured in a manner that when installed to a weight bearing surface, the guide rail can support a weight capacity of a person that may be attached to the guide rail, for example, a person with a weight of from about 20 (10 kg) to about 700 pounds (320 kg), or any weight therebetween, such as a weight of from about 20 (10 kg) to about 400 pounds (185 kg).

The guide rail 100 may be formed as one continuous rail, or by a plurality of guide rail sections (not shown) coupled together. The guide rail 100 may be linear or curved so that they may be fitted against a bearing surface, for example a wall, a ceiling, support posts, wall studs, rafters or overhead beams, within a stair well, a room, a hall or passageway. Where a plurality of guide rail sections (not shown) are coupled together to form the guide rail 110, the plurality of guide rail sections are coupled together as would be known in the art, for example, but not limited to, interlocking sections, snap-fit sections, friction-fit sections, or the sections may be attached using screws, bolts, rivets, welding, solvents, compression clips and the like, or a combination thereof. A mounting bracket may first be installed on the wall, to which is attached the guide rail. In practice, the mounting surface 110a of the guide rail 110 is mounted onto a weight bearing surface (not shown; e.g., a wall, ceiling, post, rafter, stud and the like) by any suitable attachment or fastener 160 known in the art, for example, but not limited to, wall screws lag bolts, bolts, anchor bolts, expansion plugs, expansion anchors, expansion bolts.

The guide rail 110 may also comprise a speed-control track 130 that is formed along with, or attached to, the guide rail 110. The speed control track 130 extends along the length, and the elongate axis of, the guide rail 110. In this example the background speed control track and the speed control track are the same element.

If the speed control track 130 is formed separately from the guide rail 110, then it may be attached to the guide rail 110 using any suitable attachment for example but not limited to screws, bolts, rivets, snap-locks, clips, welding, solvents and the like, or a combination thereof of these devices. If the speed control track 130 is formed separately from the guide rail 110, then it may be formed as one continuous track, or by a plurality of speed-control track sections (not shown) that are coupled together in a similar manner as sections of the guide rail 110 described above. For example, the sections mat be coupled together using interlocking sections, snap-fit sections, friction-fit sections, or the sections may be attached using screws, bolts, rivets, welding, solvents, compression clips and the like, or a combination thereof.

The trolley 120 comprises a trolley body 120a and a speed control system 126 that is coupled to the trolley body 120a. An adjustable length tether 140 is attached to support 126c of the speed control system 126. Trolley 120 is disposed within the spatial volume 112, of the guide rail 110, and contacts inner surfaces 110a, 110b, 110c, and 110d of the guide rail through one or more rolling elements 122, or through a low resistance contact surface, for example, the outer surface of the trolley body 120a may be made from a low resistance material, for example, TEFLON® (polytetrafluoroethylene, PTFE) or other polymer as would be known in the art that permits the trolley 120 to easily slide within the guide rail 110.

The rolling elements 122 are attached to the trolley 120 in a rotating relationship, and they support the trolley 120 within the guide rail 110. Motion of the trolley 120 relative to, and within, the guide rail 110 causes the one or more rolling elements 122 to roll therebetween with preferably low rolling resistance and minimal sliding. Rolling elements 122 may include, but are not limited to, train wheels, heavy duty ball transfers, flying saucer ball transfers (e.g., Hudson Hauler or Hudson Super Mover, from Hudson Bearings), castor bearing, a roller-bearing, a needle bearing, cylindrical roller, roller ball bearing, and the like. If desired, the roller element may be made of a non-magnetic material. Examples of a non-magnetic rolling element include elements made from resilient polymeric materials, carbon reinforced polymers, carbon graphite, or roller elements that comprises austenite, and the like. Some embodiments of the fall control system may not comprise rolling elements 122 and may comprise alternative means for providing a smooth, low friction surface, for example, self-lubricating bearing elements such as PBC Linear (Pacific Bearing Company) SIMPLICITY® Linear Plain Bearings. In some embodiments, the fall control system may comprise a curvilinear guide rail such as a Rollon® Curviline rail.

The trolley 120 may be manufactured of any material suitable in the art, for example, but not limited to, a suitable metal, alloy, resilient polymeric material, epoxy resin, fibreglass cloth-fibreglass resin composition, carbon-fibre-fibreglass resin composition, fibreglass cloth-epoxy resin composition, carbon fibre cloth epoxy resin composition, and manufactured in a manner that can support a weight capacity of a person that may be attached to the trolley 120, for example, a person with a weight of from about 20 (10 kg) to about 700 pounds (320 kg), or any weight therebetween, such as a weight of from about 20 (10 kg) to about 400 pounds (185 kg). Preferably, the material with which the trolley 120 is manufactured is not ferromagnetic.

The speed control system, collectively shown as 126 in FIG. 2A, comprises a conductive gear wheel 124, a speed controller 126e, magnetic arms 126a, 126b, support 126c and retainer 128. The conductive gear wheel 124 is coupled to the trolley body 120a by axle 124a, and engages and rotates along the speed-control track 130. The conductive gear wheel 124 is made of any conductive material, for example but not limited to, metal, steel, copper, aluminum, nickel, tungsten, zinc, iron, tin, titanium, stainless steel, nichrome, or an alloy of these metals. The conductive gear wheel 124 is optionally pre-tensioned as is known in the art. By pre-tensioned it is meant that the speed of rotation of the conductive gear wheel 124 along speed-control track 130 is limited to a pre-determined typical speed for the average user, thereby controlling the speed at which the trolley 120 moves along the guide rail 110. In this example, the background speed control system and the speed retarding subsystem may share the same components. As explained below, the relative position of the components within the trolley body may determine which subsystem is actively engaged to control the speed of movement of trolley 120 along guide rail 110.

Pre-tensioning of the conductive gear wheel may be achieved by any known mechanism, for example, through the use of a governor, an additional gear mechanism, use of an inertia flywheel, tensioned bearings, and the like. Pre-tensioning may also be determined by using a "first position" or "biased position" of the eddy-current brake as described below. In this manner the conductive gear wheel 124 is characterized as having two rotational speed ranges, the first speed range may be set by pre-tensioning of the conductive gear wheel 124 (background speed control system), and the second speed range is determined by the degree of engagement of the eddy-current brake (speed retarding subsystem). As an alternate or additional option, the first speed range can also be set by the eddy-current brake having a starting position that overlaps with the wheel thereby functioning as a background speed control system. When the eddy current brake is partially or fully engaged, the magnetic arms drop down further over the gear wheel, causing further slowing (speed retarding subsystem). The first speed range is set to approximate the range in walking speeds of a person, so that the trolley 120 moves along the guide rail 110, at a speed that is less that the expected maximum fall velocity of the user in the event of a fall. For example which is not to be considered limiting, the first maximum speed may be less that the expected maximum fall velocity of the user in the event of a fall. For example which is not to be considered limiting, the first maximum speed may be from about 0.5 to about 5 km/hr, or any amount therebetween, or from about 0.5, 1.0, 1.5, 2.0, 2.5, 3.0, 3.5, 4.0, 4, 5, 5.0 km/hr, or any amount therebetween. The second speed range, is less than that of the first speed range, and it is achieved when the eddy-current brake is partially or fully engaged and the components are acting as a speed retarding subsystem. The eddy-current brake is partially or fully engaged by a person that trips or loses their footing and falls while walking along a flat or inclined surface, or while ascending or descending stairs. Therefore, the second speed range of trolley 120 as it moves along the guide rail 110, helps control the falling speed of the person.

By "first maximum speed" or "maximum walking speed" as used herein, refers to the typical speed achieved by the average user (and when attached by tether to the trolley, the speed of the trolley), of the fall control system described herein. As would be evident to one of skill, the maximum walking speed will vary depending on the age, weight, and physical impairments or abilities of the user.

By "maximum fall speed" as used herein, refers to the typical speed of the trolley travelling along the elongate axis when all the components of the speed control system are activated by the average user in the event of a fall. As would be evident to one of skill, the maximum fall speed will vary depending on certain factors, such as the angle of guide rail relative to a horizontal plane and the weight of the user. The maximum fall speed does not refer to the fall speed of the user attached to the trolley just before or after the trolley reaches maximum fall speed. It is expected that the speed at which the user travels in the event of a fall, just before or after the trolley attains maximum fall speed, will initially be greater than the maximum fall speed of the trolley, but the speed will be considerably reduced (slowed) by the slower trolley speed and the elastic properties of the tether attaching the user to the trolley prior to the user contacting the steps or level surface.

The speed controller generally comprises the elements shown as 126*e* in FIG. 2A, comprises a pair of magnetic arms 126*a*, 126*b*. The magnetic arms 126*a* and 126*b* may be made of any magnetic material, for example a paramagnetic, ferromagnetic material, or a combination thereof, a rare earth magnet, or a neodymium magnet. Magnetic arms 126*a*, 126*b* of the speed controller 126*e* are for interacting with the conductive gear wheel 124 to form an eddy current brake which is described in more detail below. The speed controller 126*e* is also attached to a support 126*c*. Support 126*c* includes an attachment point for attaching the tether 140 to the speed retarding subsystem (and the background speed control subsystem) 126.

The retainer 128, is located between the support 126*c* and the trolley body 120*a*, the retainer 128 is for providing a retaining or biasing force, that biases the speed controller 126*e* away from the conductive gear wheel 124. The retainer may comprise, for example but not limited to, a spring, compressible rubber, or other biasing device. The biasing force of the retainer 128 is of sufficient force to counteract any minor pulls or tugs that a person may apply against the support 126*c* via tether 140 as the trolley 120 moves along the guiderail 110. However, if a force is applied to support 126*c* the exceeds a threshold force of the retainer, then the retainer is compressed and the support 126*c* is moved from its biased position (first position) shown in FIG. 2A, towards a compressed position (second position; not shown) that compresses the retainer and moves the magnetic arms 126*a* and 126*b*, that are attached to the support 126*c*, to engage an increased surface area of conductive gear wheel 124. Preferably, the retainer 128 has a biasing force of about 20 to about 35 pounds/inch, or any amount therebetween. However, the biasing force of the retainer 128 may be of any suitable magnitude, for example, but not limited to, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50 pounds/inch, or any amount therebetween.

The pair of magnetic arms 126*a*, 126*b* are positioned so that they overlap a first surface 124*b* and a second surface 124*c* of the conductive gear wheel 124, and form a channel 126*d* therebetween. The conductive gear wheel 124 rotates within channel 126*d*. The range of overlap between the pair of magnetic arms 126*a*, 126*b*, and the conductive gear wheel 124 extends from a first, or biased position through to a second, compressed position. It is to be understood that the overlap between the magnetic arms 126*a* and 126*b* and the conductive gear 124 may be at any position between the first and second positions, and depends upon the force used to compress the retainer 128.

At the first position (or biased position, travelling orientation), the speed controller 126*e* is maximally biased away from the conductive gear wheel 124 by the retaining force exerted by the retainer 128 against the support 126*c*. At the first position, the pair magnetic arms 126*a*, 126*b* of the speed controller 126*e* and the conductive gear wheel 124 exhibit no, or a minimal overlap. The amount of overlap between the pair of magnetic arms 126*a*, 126*b* and the conductive gear wheel 124 at the first position may be set to create an electromagnetic drag force which limits the rotation speed of the conductive gear wheel 124 along the speed-control track 130 to a first maximum speed so that the speed controller and gear wheel act as a background speed control system (i.e., a background eddy current brake). By setting the first position to provide an overlap of the magnetic arms with respect to the conductive gear wheel 124, a pre-tensioning the conductive gear wheel may be established. That is, the spatial relationship between the pair of magnetic arms 126*a*, 126*b* and the conductive gear wheel 124, and the rotation of the conductive gear wheel 124 through the channel 126*d*, creates a corresponding electromagnetic drag force that prevents the conductive gear wheel 124 from rotating beyond the first maximum speed of the first speed range of the trolley 120 along guide rail 110 (e.g., a maximum walking speed). As contemplated in this embodiment, the first maximum speed of the movement of the trolley 120 along guide rail 110, in the travelling orientation, is less that the expected maximum fall velocity of the user in the event of a fall. For example which is not to be considered limiting, the first maximum speed may be from about 12 to about 14 inches/second, or any amount therebetween. However, in other embodiments the first maximum speed of the movement of the trolley 120 along guide rail 110 may be adjusted to any desired speed, provided the speed is less that the expected maximum fall velocity of the user in the event of a fall. For example which is not to be considered limiting, the first maximum speed may be about 5, 6, 7, 8, 9, 10, 11, 12, 13, 14, 15, 16, 17, 18, 19, 20 inches/second, or from 0.5 to 5 km/hr, or any amount therebetween, or from about 0.5, 1.0, 1.5, 2.0, 2.5, 3.0, 3.5, 4.0, 4.5, 5.0 km/hr, or any amount therebetween, in order to approximate the range in walking speeds of a person.

In an embodiment wherein the conductive gear wheel 124 is pre-tensioned, for example using a governor, an additional gear mechanism, use of an inertia flywheel, tensioned bearings, and the like, the pair of magnetic arms 126*a*, 126*b* may or may not overlap the conductive gear wheel 124 at the first position. In this arrangement (i.e., magnets that may or may not overlap the conductive gear wheel) the pre-tensioned conductive gear wheel is functioning as part of the part of the background speed control system.

The second speed range, in a falling orientation, of the speed controller 126*e* is determined by the degree of engagement of the magnetic arms 126*a* and 126*b* of the speed controller 126*e*, with the conductive gear wheel 124, thereby engaging the "eddy-current brake". In the second position, when the speed retarding subsystem is fully engaged the speed controller 126*e* is minimally biased away from the conductive gear wheel 124. That is, the retaining force exerted by the retainer 128 against the support 126*c*, to bias the speed controller magnet 126*a*, 126*b*, towards the first position, is completely overcome. In the engaged or second position, the pair of magnetic arms 126*a*, 126*b* and the conductive gear wheel 124 are overlapped and the speed retarding subsystem is activated. The amount of overlap between the pair of magnetic arms 126*a*, 126*b* and the conductive gear wheel 124 at the second position creates an electromagnetic drag force which limits the rotation speed of the conductive gear wheel 124 along the speed-control track 130 to a second maximum speed (e.g., a fall speed less than the expected fall speed without the speed controller) of the movement of the trolley 120 along guide rail 110.

When fully engaged in the falling orientation, the second maximum speed of the trolley 120 as it moves along guide rail 110, is from about 3 to about 6 inches/second, or any amount therebetween. The second maximum speed of the movement of the trolley 120 along guide rail 110 may be adjusted to any desired speed, for example, but not limited to 1, 2, 3, 4, 5, 6, 7, 8, 9, 10 inches/second, or any amount therebetween. The second speed range, is achieved when the eddy-current brake may be partially or fully engaged by a person that trips or loses their footing and falls while walking along a flat or inclines surface, or while ascending or descending stairs. The second speed range thereby helps to control the falling speed of the person. It is to be understood that the second speed range will vary depending upon the degree of engagement between the speed controller 126*e* and the conductive gear wheel 124. The values stated above for the second maximum speed are for a fully engaged eddy-current brake. However, a partially engaged eddy current brake may result in movement of the trolley 120 along the guide rail 110 anywhere from 5 to about 20 inches/second or any amount therebetween for example, 5, 6, 7, 8, 9, 10, 11, 12, 13, 14, 15, 16, 17, 18, 19, 20 inches/second, or any amount therebetween (the first speed range; travelling orientation), to about 1 to about 10 inches/second, for example, from about 1, 2, 3, 4, 5, 6, 7, 8, 9, 10 inches/second, or any amount therebetween (the second speed range).

The speed control system 126 does not comprise a brake that brings the trolley 120 to a complete stop during its travels along the guide rail 110. Therefore, the first maximum speed of the trolley 120 is greater than the second maximum speed of the trolley 120, and neither the first maximum speed nor the second maximum speed is zero. In the arrangement of the speed control system 126 described herein, both the first maximum speed and the second maximum speed are greater than zero, and the trolley 120 is never fully arrested, even when the speed controller 126*e* is displaced fully in the second position. The conductive gear wheel 124 is rotatable in the channel 126*d* between the pair of magnetic arms 126*a*, 126*b*, and the conductive gear wheel 124 moves along the speed-control track 130 regardless of whether the speed controller 126*e* is positioned at the first position, the second position, or any position therebetween.

An adjustable length tether 140 is attached to the trolley 120 at a first end 140*a*, and affixed to a person either directly, or via a harness or a transfer belt (also see FIGS. 7A to 7E) at a distal second end 140*b*. A non-limiting example of a suitable transfer belt is a SafteySure® Transfer Belt (available from health suppliers, for example, Healthcare Solutions, MTS Medical Supply, or SCAN Medical). An alternate transfer belt with several useful unique features is illustrated in FIGS. 7A to 7E and described herein. As contemplated in this embodiment, the tether 140 is couplable to the support 126*c* through a slot (not shown) that is formed in the part of the trolley body 120*a* that is adjacent to the support 126*c*. In order to permit movement of the support 126*c* in response to a pull on the tether 140, the slot is oriented in the same plane as that of the movement of the speed controller 126*e* from the first position to the second position. The tether 140 may be an elasticized cord or belt, flexible cord or belt, non-elastic flexible cord or belt, a bungee-type cord, or a combination thereof, and may be of any length suitable for attachment to the person and the trolley 120 to permit movement along the guide rail 110. In some embodiments, the tether 140 may comprise multiple attachment points for attaching to the user. In some embodiments, the point of attachment of the tether 140 to the trolley 120 may comprise a hanger, roller, pulley, spring roller, spring pulley, or a combination thereof (e.g., see FIG. 17B).

In an example of a use of the fall control system 100, a tether 140 is coupled to a support 126*c* at first end 140*a*, and coupled to a person at second end 140*b*. When the person is walking, the person exerts a first pulling force on the speed controller 126*e* (at support 126*c*), through the tether 140. The first pulling force is sufficient to move the trolley 120 along the guide rail 110, but insufficient to displace the speed controller 126 from the first position. In other words, the first pulling force exerted on the speed controller 126*e* is not sufficient to overcome the retaining force of the retainer 128. Owing to the pre-tensioning of conductive gear wheel 124, for example, using electromagnetic drag force created as a result of the conductive gear wheel 124 rotating through the channel 126*d*, the person would be permitted to walk or move only as quickly as the first maximum speed.

When the person falls, the person exerts a downward pulling force on the support 126*c* and speed controller 126*e*, through the tether 140, that is sufficient to both move the trolley 120 along the guide rail 110, and displace the speed controller 126*e* from the first position to the second position by overcoming the retaining force of the retainer 128. The overlap between the pair of magnetic arms 126*a*, 126*b* and the conductive gear wheel 124 increases, and as a result, increases the electromagnetic drag force created as the conductive gear wheel 124 rotates through the channel 126*d*. At the second position, or a partial second position, the trolley 120 therefore is permitted to move only as quickly as the second maximum speed, or a speed between the first and second maximum speed, respectively.

When the person has regained composure (e.g., stands back up and proceeds walking again), the downward pulling force against the retainer 128 is alleviated and the retainer 128, displaces or the speed controller 126*e* from the second position to the first position, at which point the person is permitted again to proceed at a walking speed that is no quicker than the first maximum speed. For example, the person may proceed at a walking speed that may be less than 20 inches per second, although greater walking speeds are possible. Alternatively, if desired, the person may move (e.g., crawl) down the stairs, or along a surface, while still attached to the trolley, and the movement of the trolley would not substantially impede their movement. As the minimum speed of the second position, when all speed control systems are activated, is never zero, the person can move up or down the stairs, or along a surface, even when the speed controller is fully engaged. This may be important as a disabled individual, that is unable to move up or down the stairs (as a result of a fall control system that impedes all movement), could potentially become stuck on stairs or floor for several hours or days until help arrived.

When the fall control system 100 is not in use, the trolley 120 may be secured in place at one end of guide rail 110 by coupling a contact 150 to a corresponding component (not shown) located at either end of the guide rail 110. For example, the trolley 120 may be secured in place by any suitable device known in the art, including but not limited to a magnet, a snap clip, a lever, a clasp, a clip, a cord, a hook, and the like.

Figure 3A:
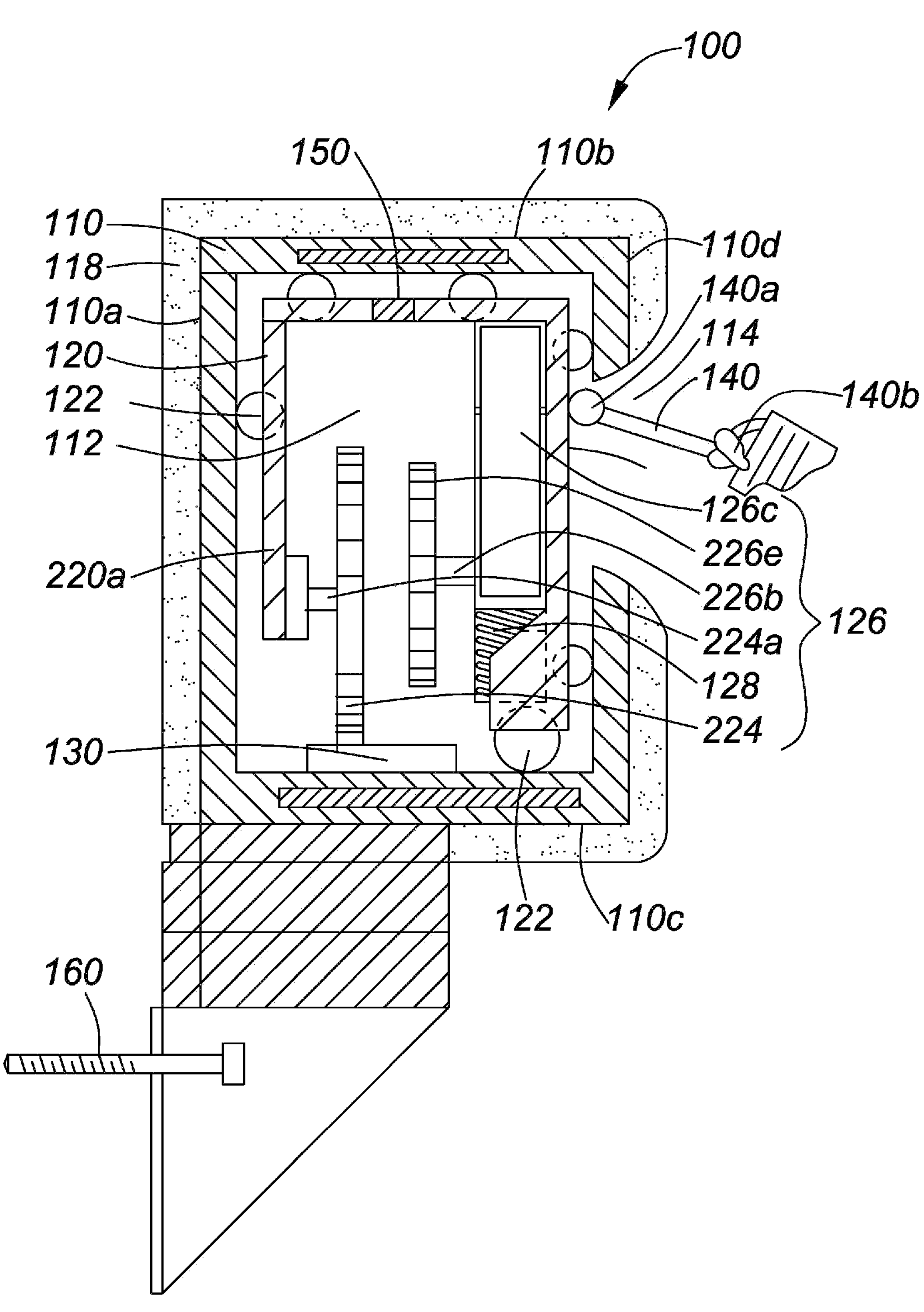
FIG. 3A shows a cross-sectional side view of an example of a fall control system as described herein. In this example, the fall control system comprises a speed control system. The speed control system comprises a first pre-tensioned gear wheel (background speed control system) that is engaged to a speed-control track, and a second pre-tensioned gear wheel (speed retarding subsystem) that is engageable to the speed-control track (rail).
Figure 3B:
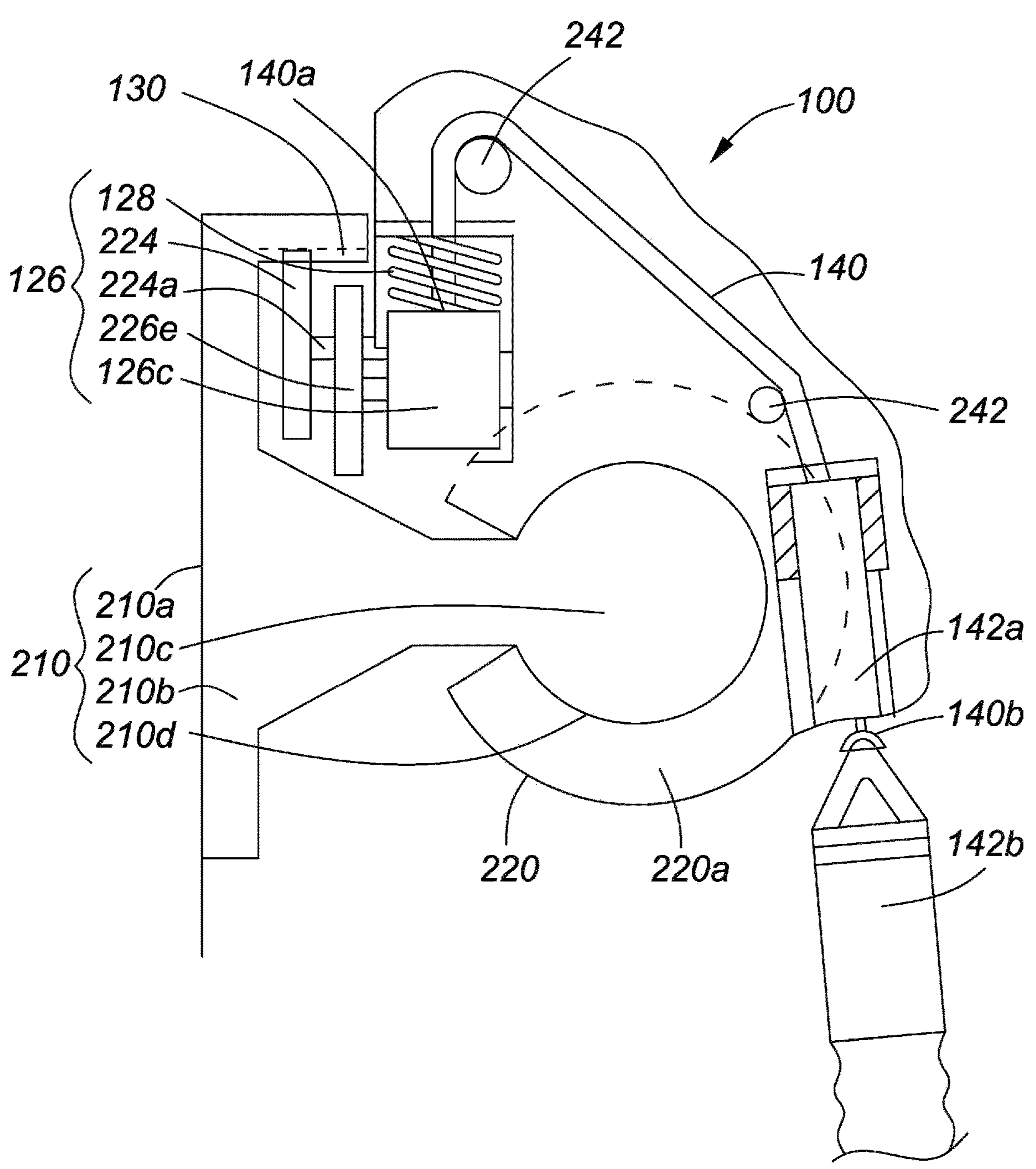
FIG. 3B shows a cross-sectional side view of an alternate example of a fall control system comprising a circular rail and trolley interface, as described herein. In this example, the fall control system comprises a speed control system. The speed control system comprises a first pre-tensioned gear wheel (background speed control system) that is engaged to a speed-control track, and a second pre-tensioned gear wheel (speed retarding system) that is engageable to the speed-control track (rail).

Referring to FIGS. 3A and 3B, there are provided additional examples of a fall control system 100 of the present invention, characterized in that both of these fall control systems have an alternate speed control system 126 when compared to the embodiment described in FIGS. 2A and 2B. However, several of the components of the fall control systems described below and shown in FIGS. 3A and 3B are similar or analogous to those described above with reference to FIGS. 2A and 2B, and include for example, a guide rail 110 (FIG. 3A) or 210 (FIG. 3B), a trolley 120 (FIG. 3A), or 220 (FIG. 3B), for moving along the guide rail 110 or 210, and an adjustable length tether 140 that couples to a speed control system 126 therein.

The C-shaped guide rail 110 in FIG. 3A, comprises a mounting surface 110*a*, a top surface 110*b*, a base surface 110*c*, and a surface 110*d* that is opposite the mounting surface 110*a*. The surfaces 110*a*, 110*b*, 110*c*, and 110*d* define a spatial volume 112 (see FIG. 3A). The outer surface of the guide rail 110 may also be surrounded with a protective cover 118. An opening 114 is provided through the surface 110*d*, the opening 114 extending along a length of the guide rail 110.

As noted above in respect to the fall control system of FIG. 2A, the guide rail 110 may be manufactured of any material suitable in the art, for example, but not limited to, a suitable metal, aluminum, steel, copper, nickel, tungsten, zinc, iron, tin, titanium, stainless steel, nichrome, or an alloy of these metals, or a resilient polymeric material, and manufactured in a manner that when installed to a weight bearing surface, the guide rail can support a weight capacity of a person that may be attached to the guide rail, for example, a person with a weight of from about 20 (10 kg) to about 700 pounds (320 kg), or any weight therebetween, such as a weight of from about 20 (10 kg) to about 400 pounds (185 kg).

The guide rail 110 may be formed as one continuous rail, or by a plurality of guide rail sections (not shown) coupled together. The guide rail 110 may be linear or curved so that they may be fitted against a bearing surface, for example a wall, a ceiling, support posts, wall studs, rafters or overhead beams, within a stair well, a room, a hall or passageway. Where a plurality of guide rail sections (not shown) are coupled together to form the guide rail 110, the plurality of guide rail sections are coupled together as would be known in the art, for example, but not limited to, interlocking sections, snap-fit sections, friction-fit sections, or the sections may be attached using screws, bolts, rivets, welding, solvents, compression clips and the like, or a combination thereof. In practice, the mounting surface 110*a* of the guide rail 110 is mounted onto a weight bearing surface (not shown, e.g., a wall, ceiling, post, rafter, stud and the like) by any suitable attachment or fastener 160 known in the art, for example, but not limited to, wall screws lag bolts, bolts, anchor bolts, expansion plugs, expansion anchors, expansion bolts. A mounting bracket may first be installed on the wall, to which the guide rail is attached.

The guide rail 110 also comprises a speed-control track 130 that is formed along with, or attached to, the guide rail 110. The speed control track 130 extends along the length, and the elongate axis of, the guide rail 110. In this example the background speed control track and the speed control track are the same element.

If the speed control track 130 is formed separately from the guide rail 110, then it may be attached to the guide rail 110 using any suitable attachment for example but not limited to screws, bolts, rivets, snap-locks, clips, welding, solvents and the like, or a combination thereof of these devices. If the speed control track 130 is formed separately from the guide rail 110, then it may be formed as one continuous track, or by a plurality of speed-control track sections (not shown) that are coupled together in a similar manner as sections of the guide rail 110 described above. For example, the sections may be coupled together using interlocking sections, snap-fit sections, friction-fit sections, or the sections may be attached using screws, bolts, rivets, welding, solvents, compression clips and the like, or a combination thereof.

The trolley 120 comprises a trolley body 120*a* and a speed control system 126 that is coupled to the trolley body 120*a*. An adjustable length tether 140 is attached to support 126*c* of the speed control system 126. Trolley 120 is disposed within the spatial volume 112 (see FIG. 3A), of the guide rail 110, and contacts inner surfaces 110*a*, 110*b*, 110*c*, and 110*d* of the guide rail through one or more rolling elements 122, or through a low resistance contact surface, for example, the outer surface of the trolley body 120*a* may be made from a low resistance material, for example, TEFLON® (polytetrafluoroethylene, PTFE) or other polymer as would be known in the art that permits the trolley 120 to easily slide within the guide rail 110.

The rolling elements 122 are attached to the trolley 120 in a rotating relationship, and they support the trolley 120 within the guide rail 110. Motion of the trolley 120 relative to, and within, the guide rail 110 causes the one or more rolling elements 122 to roll therebetween with preferably low rolling resistance and minimal sliding. Rolling elements 122 may include, but are not limited to, train wheels, heavy duty ball transfers, flying saucer ball transfers (e.g., Hudson Hauler or Hudson Super Mover, from Hudson Bearings), a roller-bearing, a needle bearing, cylindrical roller, roller ball bearing, and the like. If desired, the roller element may be made of a non-magnetic material. Examples of a non-magnetic rolling element include elements made from resilient polymeric materials, carbon reinforced polymers, carbon graphite, or roller elements that comprises austenite, and the like. Some embodiments of the fall control system do not comprise rolling elements 122 and may comprises alternative means for providing a smooth, low friction surface, for example, self-lubricating bearing elements such as PBC Linear (Pacific Bearing Company) SIMPLICITY® Linear Plain Bearings. In embodiments where the guide rail is curvilinear, the guide rail may comprise a Rollon® Curviline rail.

The trolley 120 may be manufactured of any material suitable in the art, for example, but not limited to, a suitable metal, alloy, resilient polymeric material, epoxy resin, fibreglass cloth-fibreglass resin composition, carbon-fibre-fibreglass resin composition, fibreglass cloth-epoxy resin composition, carbon fibre cloth epoxy resin composition, and manufactured in a manner that can support a weight capacity of a person that may be attached to the trolley 120, for example, a person with a weight of from about 20 (10 kg) to about 700 pounds (320 kg), or any weight therebetween, such as a weight of from about 20 (10 kg) to about 400 pounds (185 kg). Preferably, the material with which the trolley 120 is manufactured is not ferromagnetic.

With reference to FIG. 3B, the guide rail 210 comprises body of the guide rail 210*b* and 210*c*, a mounting surface, or base 210*a*, and a curved outer surface 210*d* that interfaces with trolley 220. The guide rail 210 further comprises a speed-control track 130 coupled to a surface of the guide rail 210. In this example the background speed control track and the speed control track are the same element.

The guide rail 210 may be made from steel, stainless steel, aluminum, anodized aluminum, copper, nickel, tungsten, zinc, iron, tin, titanium, nichrome, an alloy of these metals, or similar material. The outer surface 210*d* of guide rail 210 may be coated in a ceramic, or other low friction material to facilitate movement of trolley 220 along the guide rail 210. An example, that is not to be considered limiting, of such a rail-trolley arrangement is a linear bearing system using round shaft technology from PBC Linear (Pacific Bearing Company), for example, Simplicity® 60 Plus® Shafting, and accompanying bearing. The bearing component may be modified to include the components of the trolley described herein.

The trolley 220 comprises a trolley body 220*a* and a speed control system 126 that is coupled to the trolley body 220*a*. An adjustable length tether 140 is attached to support 126*c* of the speed control system 126. The tether 140 may pass over guides 242 within the trolley 220. An inner surface of trolley 220 slides along outer surface 110*d* of guide rail 110 through a low resistance contact surface, for example, the inner surface of the trolley body 220 may be made from a low resistance material, for example, TEFLON® (polytetrafluoroethylene, PTFE) or other polymer as would be known in the art that permits the trolley 220 to easily slide along guide rail 210. The trolley 220 may also move along guide 210*c* using rolling elements as shown for example in FIGS. 8A, 9A, 10A, 11A.

The trolley 220 may be manufactured of any material suitable in the art, for example, but not limited to, a suitable metal, alloy, resilient polymeric material, epoxy resin, fibreglass cloth-fibreglass resin composition, carbon-fibre-fibreglass resin composition, fibreglass cloth-epoxy resin composition, carbon fibre cloth epoxy resin composition, and manufactured in a manner that can support a weight capacity of a person that may be attached to the trolley 120, for example, a person with a weight of from about 20 (10 kg) to about 700 pounds (320 kg), or any weight therebetween, such as a weight of from about 20 (10 kg) to about 400 pounds (185 kg).

The speed control system 126 shown in the examples of the fall control system 100 presented in FIGS. 3A and 3B comprises: a pre-tensioned first gear wheel (or a background pre-tensioned gear wheel; an onset wheel) 224 that is coupled to the trolley body 220*a* by axle 224*a*, the background pre-tensioned gear wheel 224 (background speed control system) for engaging and rotating along the speed-control track 130; a speed controller assembly comprising a support 126*c* and a pre-tensioned second gear wheel an onset second wheel) 226*e* coupled to the support 126*c* via an axle 226*b*; and a retainer 128 disposed between the support 126*c* and the trolley body 120 (FIG. 3A) or 220 (FIG. 3B; speed retarding subsystem). The retainer 128 provides a biasing force that biases the second gear wheel 226*e* of the speed controller 126, away from the speed-control track 130. In this example, the background speed control track and the speed control track are the same.

The first gear wheel 224 of the background speed control system, and the second gear wheel 226*e* of the speed retarding subsystem, are pre-tensioned to provide different speed ranges of the trolley 120 or 220, as it moves along the guide rail 110 or 210, using methods known to one of skill in the art. Pre-tensioning of the first 224 and second 226*e* gear wheel may be achieved by any known mechanism, for example, through the use of a governor, an additional gear mechanism, an inertia flywheel, tensioned bearings, and the like. The tension on the first, the second, or both the first and the second gear wheels can be custom set by means of a dial, or screw, or the like, allowing a customized pre-set tension of the gear wheels that matches the approximate weight of the user.

In this manner, the speed control system 126 is characterized as having two rotational speed ranges, the first speed range of the background speed control system (travelling orientation) is set by pre-tensioning of the first (background) gear wheel 224, and the second speed range of the speed retarding subsystem, is determined by pre-tensioning of the second gear wheel 226*e*. The first speed range is set to approximate the range in walking speeds of a person, so that the trolley 120 or 220, moves along the guide rail 110 or 210, and is less that the expected maximum fall velocity of the user in the event of a fall. For example which is not to be considered limiting, the first maximum speed may be from 0.5 to 5 km/hr, or any amount therebetween. The second speed range (falling orientation), is less than that of the first speed range, and it is achieved when the second gear wheel 226*e* is engaged with speed control track 130. The second gear wheel 226*e* becomes engaged with speed control track 130 when a person attached to the trolley trips or loses their footing and falls while walking along a flat or inclined surface, or while ascending or descending stairs. Therefore, the speed range of trolley 120 as it moves along the guide rail 110 is determined by the pre-tensioned second gear wheel, and helps control the falling speed of the person.

As contemplated in this example, the first gear wheel 224 of the background speed control system is in constant contact with the speed-control track 130, and rotates along the speed-control track 130 when the trolley 120, or 220, is moving along the guide rail 110 or 210. The first gear wheel 224 is pre-tensioned to an amount such that the speed at which the first gear wheel 224 may rotate along the speed-control track 130 is limited to a maximum speed of the movement of the trolley 120 or 220 along guide rail 110 or 210 is less that the expected maximum fall velocity of the user in the event of a fall. For example which is not to be considered limiting, the first maximum speed may be from about 12 to about 14 inches/second, or any amount therebetween. However, in other embodiments the first maximum speed of the movement of the trolley 120 or 220 along guide rail 110 or 210 may be adjusted to any desired speed, for example, but not limited to, 5, 6, 7, 8, 9, 10, 11, 12, 13, 14, 15, 16, 17, 18, 19, 20 inches/second, or from 0.5 to 5 km/hr, or any amount therebetween, for example, from about 0, 5, 1.0, 1.5, 2.0, 2.5, 3.0, 3.5, 4.0, 4.5, 5.0 km/hr, or any amount therebetween, in order to approximate the range in walking speeds of a person.

Similarly, the second gear wheel **226*e* of the speed retarding subsystem is preferably pre-tensioned to an amount such that the second maximum speed of the trolley 120 or 220 as it moves along guide rail 110 or 210, is from about 4 to about 6 inches/second, or any amount therebetween. The second maximum speed of the movement of the trolley 120 or 220 along guide rail 110 or 210** may be adjusted to any desired speed, for example, but not limited to 1, 2, 3, 4, 5, 6, 7, 8, 9, 10 inches/second, or any amount therebetween.

The support **126*c*, retainer 128, axel of second gear wheel 226*b* and the second gear wheel 226*e*, of speed controller 126 are collectively moveable between a first position and a second position. At the first position (shown in FIGS. 3A and 3B), the second gear wheel 226*e* is maximally biased away, and disengaged with the speed-control track 130 by the retaining force exerted by the retainer 128 against the support 126*c* of the speed controller. In this position, the second gear wheel 226*e* is not engaged with the speed-control track 130 when the speed controller 126 and support 126*c* are located at the first position. In the second position, the retaining force exerted by the retainer 128 on the support 126*c* of the speed controller 126 has been overcome by an external pulling force, for example a pull from tether 140 when the user falls (fall event) in any direction. At the second position, the second gear wheel 226*e* of the speed retarding subsystem is brought into rotational engagement with the speed-control track 130. Upon engagement of the second gear wheel 226*e* with the speed-control track 130, the speed at which the trolley 120 or 220, moves relative to the guide rail 110 is limited to the speed at which the pre-tensioned second gear wheel 226*e* rotates along the speed-control track 230** (i.e., the second speed).

In FIG. 3A, the second gear wheel **226*e* of the speed controller 126 is depicted as engaging the speed-control track 130 during a fall event by moving down, towards the speed control track 130. The components of the fall control system may be re-configured, as would be apparent to a person skilled in the art, such that a second geared wheel 226*e* is pulled upwards, for example as shown in FIG. 3B, or to the side, or obliquely, to engage a speed-control track 130** during a fall event.

The speed control system 126 does not comprise a brake that brings the trolley 120 or 220 to a complete stop during its travels along the guide rail 110 or 210. Therefore, the first maximum speed of the trolley 120 or 220 is greater than the second maximum speed of the trolley 120 or 220, and neither the first maximum speed nor the second maximum speed is zero. In the arrangement of the speed control system 126 described herein, both the first maximum speed and the second maximum speed are greater than zero, and the trolley 120 or 220 is never fully arrested, even when the speed controller 126 is displaced fully in the second position.

Figure 7A:
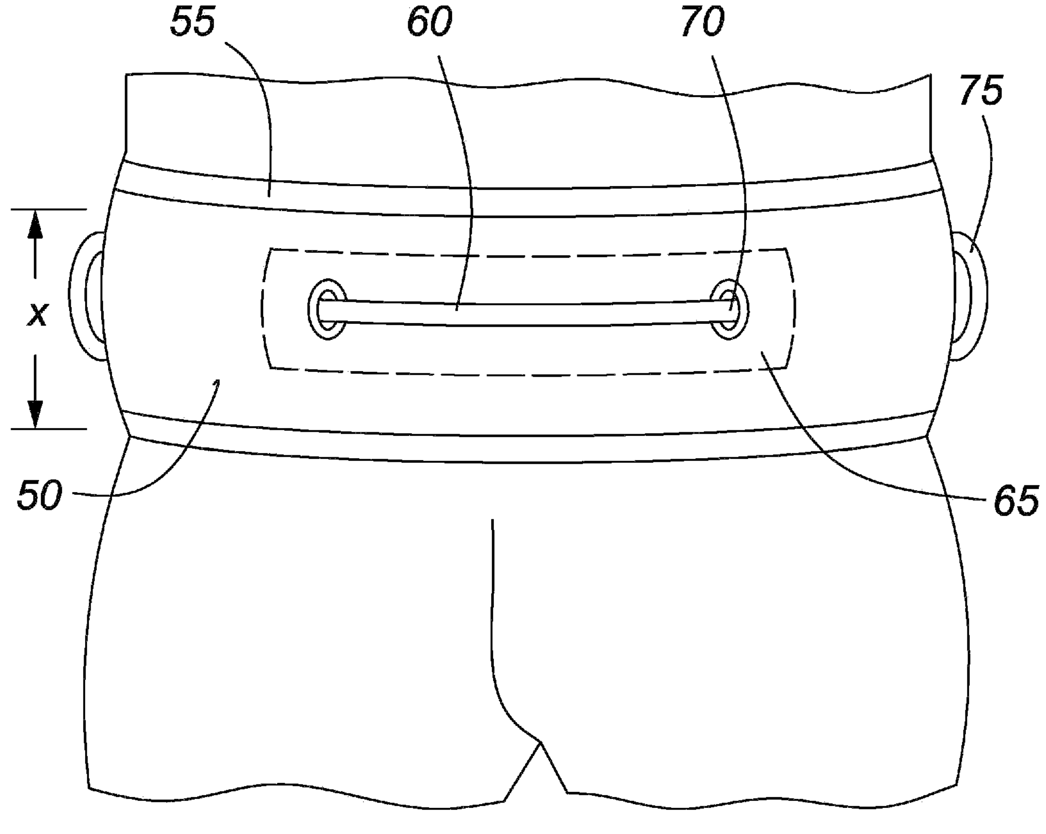
FIG. 7A shows a front view of a transfer belt that may be used in conjunction with the fall control systems as described herein.
Figure 7B:
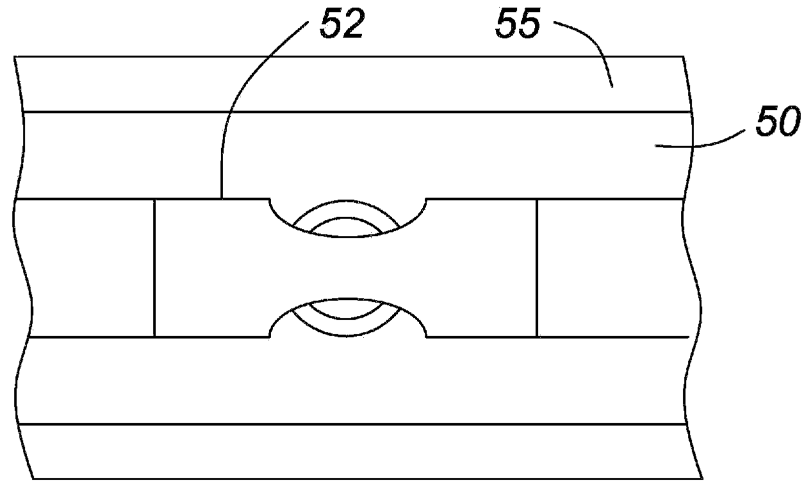
FIG. 7B shows a close-up side view of an example of a fastener of the transfer belt of FIG. 7A.
Figure 7C:
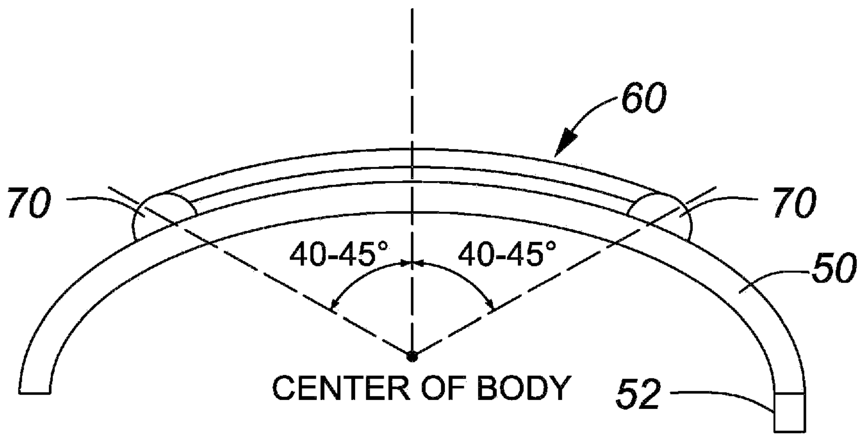
FIG. 7C shows a top view of a portion of the front of the transfer belt of FIG. 7A.
Figure 7D:
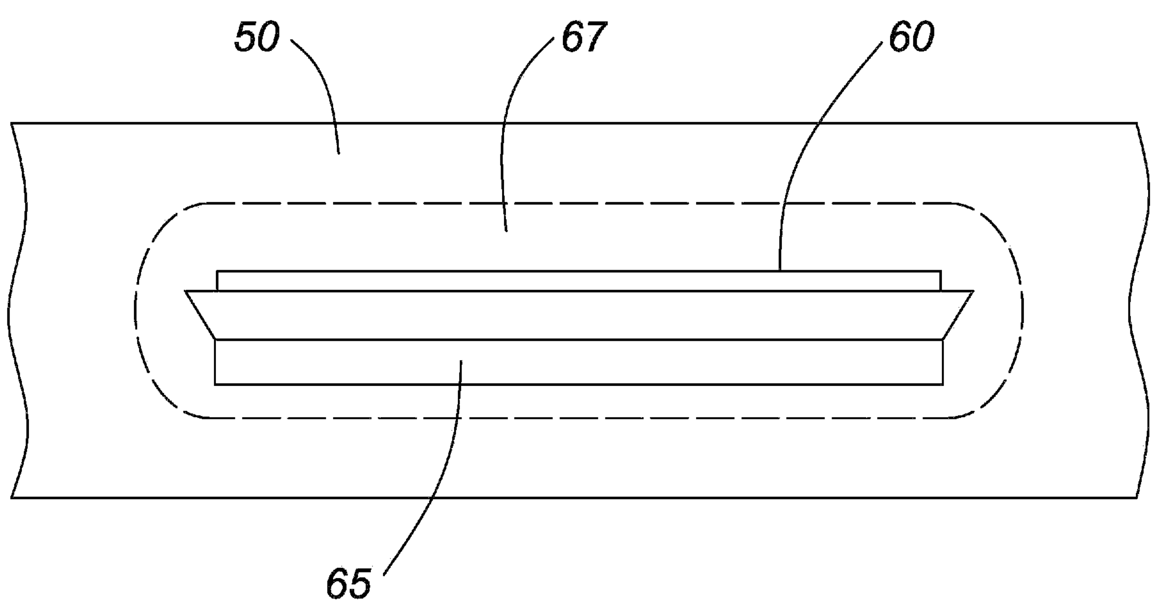
FIG. 7D shows a detail of a front view of the transfer belt of FIG. 7A showing the arrangement of the belt cable and belt cover.
Figure 7E:
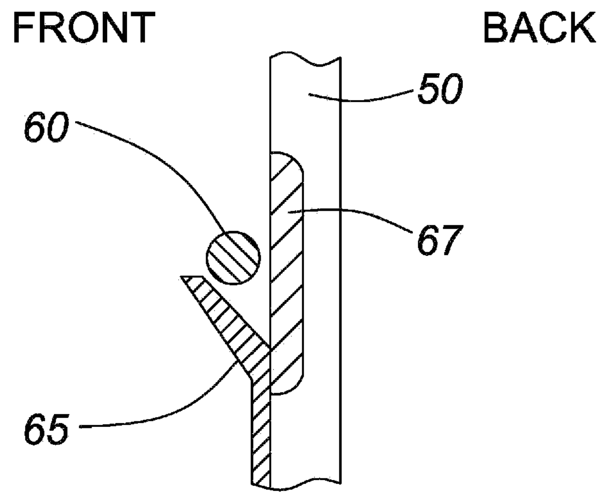
FIG. 7E shows a detail of a cross-sectional side view of the transfer belt of FIG. 7A showing the arrangement of the belt cable and belt cover.

An adjustable length tether 140 is attached to the support **126*c* of the trolley 120 or 220, at a first end 140*a*, and affixed to a belt or cord 140*b* for attachment to the user, either directly, or via a harness or a transfer belt (see FIGS. 7A to 7**E). A non-limiting example of a belt that may be used is a SafetySure® Transfer Belt (available from health suppliers, for example, Healthcare Solutions, MTS Medical Supply, or SCAN Medical). As discussed for other embodiments, the tether may be for attachment to the user in multiple locations. For example, the tether may be suitable for attachment directly to the user or via a harness or transfer belt at the user's shoulder and waist.

A customized transfer belt 50 is also described herein (see FIGS. 7A to 7E) which may be used with any of the fall control systems 100 described herein. Tether 140 (not shown in FIGS. 7A to 7E) may be attached to the transfer belt via attachment cable 60. This arrangement provides movement of tether 140 about a 30-45 degree radius on each side of the midline (FIG. 7C; anterior aspect of belt) to permit tether 140 to slide to either side (see FIGS. 7A and 7C), or remain midline, relative to the users body. Tether 140 may be attached to cable 60 via a carabiner or other secure clip mechanism. For example, the carabiner may be spring-loaded to open easily when pushed and close automatically when released. Attachment cable 60 may be a coated cable, coated with rubber, vinyl, or a similar smooth material. The diameter of the cable itself (without any coating material) may be from about ¼ to about ½ inch. By permitting the sliding motion of tether 140 along attachment cable 60, the user can ambulate sideways facing the trolley and guide rail if desired. The cable 60 may be attached to belt 50 at attachment points 70, using for example D rings, by riveting the cable, or by stitching the cable to the belt.

The belt 50 may be removed from the user via buckle 52 (FIG. 7B), allowing it to dangle from tether 140 that is attached to the trolley. Then if the user decides to travel in the opposite direction, the user can put the transfer belt 50 back on without having to undo the tether 140 from the transfer belt 50. Should the user for some reason be unable to move (e.g., crawl) up or down the stairs when attached to the trolley, the user can undo buckle 52 and release the user from belt 50.

The portion of belt 50 that is behind cable 60 may comprise a semi-rigid plastic support, or cable backing, 67 (FIGS. 7D and 7E), or other similar material, that facilitates movement of the tether 140 along cable 60 and that assist in reducing wear of the belt resulting from the sliding tether 140. Cable backing 67 may also prevent or lessen the chances of a "pinching effect" in the event of a fall if the cable 60 is pulled with a force perpendicular to the user.

Attachment cable 60 and rings 70 may also be partially covered with shield, or cable cover, 65 (FIGS. 7D and 7E) to reduce catching or snagging of cable 60 to objects when the belt is worn. For example, the cable cover may be an angled plastic sleeve. The cable cover is meant to deflect such objects away from getting caught up in attachment cable 60, but still allow attachment to the cable by a carabiner or other attachment mechanism. Shield or cable cover 65 may be made of plastic or other suitable material that is flexible but partially covers cable 60 and rings 70.

The belt 50 may be padded 55, and have a width "X" (FIG. 7A) that is comfortable for use, for example width "X" may be from about 1 to about 5 inches or any amount therebetween. The belt may also comprise handles 75.

Therefore, a transfer belt is also provided herein. The transfer belt comprising, a padded belt for placement about a user's waist, an attachment cable fixed to the belt at a first and a second end and located along a forward-facing portion of the belt, the attachment cable for receiving a tether and providing side-to-side movement of the tether from the first end to the second end when the tether is attached to attachment cable, a cable backing attached to the belt and placed behind the belt attachment cable, the cable backing extending at least between the first and the second end, a cable cover attached to the padded belt below the attachment cable and comprising a free end protruding out from the belt and partly or fully overlapping the attachment cable, the cable cover extending at least between the first and the second end.

The adjustable length tether 140 may be an elasticized cord or belt, flexible cord or belt, non-elastic flexible cord or belt (for example made from nylon, a durable material or cable), an elastomeric cord, a bungee-type cord, or a combination thereof, and may be of any length suitable for attachment to the person and the trolley to permit movement along the guide rail 110. The tether may also be comprised of a flexible band (for example a cable or nylon band) that is attached to an elasticized cord (for example an elastomeric or bungee-type cord) that then attaches to the transfer belt being worn by the user. As discussed for other embodiments, the tether may be for attachment to the user in multiple locations. For example, the tether may be suitable for attachment directly to the user or via a harness or transfer belt at the user's shoulder and waist.

During use of the fall control system 100, with a pulling force from the user that is insufficient to overcome the retaining force of the retainer 128, the trolley 220 moves along the guide rail 110 or 210 at a speed that is no greater than the first speed (first maximum speed, travelling orientation). During a fall event (falling orientation), a pulling force that is sufficient to overcome in part or in whole the retaining force of the retainer 128 is exerted through the tether 140 and on the speed controller 126. As a result, the speed controller 126 is displaced from the first position to the second position. In the examples shown in FIGS. 3A and 3B, in the second position, the second gear wheel 226*e* engages the speed-control track 130, and the speed of the trolley 120 or 220, to move along the guide rail 110 or 210 is limited to a speed that is no greater than the second speed (second maximum speed). By reducing the speed of the person from the first speed to the second speed during a fall event, the ground-impact speed is reduced, and the speed at which a person descends to the ground is controlled.

When the person has regained composure (e.g., stands back up and proceeds walking again), the downward pulling force against the retainer 128 is alleviated and the retainer 128 displaces the speed controller 126 from the second position to the first position, at which point the person is permitted again to proceed at a walking speed that is no quicker than the first maximum speed. Alternatively, if desired, the person may move (e.g., crawl) up or down the stairs, or along a level surface, while still attached to the trolley, and the movement of the trolley would not impede their movement.

When the fall control system 100 is not in use, the trolley 120 or 220 may be secured in place at one end of guide rail 110 or 210 by coupling a contact 150 (e.g., see FIGS. 2A and 3A) to a corresponding component (not shown) located at either end of the guide rail 110 or 210. For example, the trolley 120 or 220, may be secured in place by any suitable device, or coupling contact 150, known in the art, including but not limited to a magnet, a snap clip, a lever, a clasp, a clip, a cord, a hook, and the like.

Referring to FIGS. 4, 5A to 5E and 6A, there are provided additional variants of the fall control system 100. The variants described with reference to FIGS. 4, and 5A to 5E each include an eddy-current braking system. The basic components of the fall control system 100 in the examples below are similar to those already described with reference to FIGS. 2A, 2B (use of an eddy-current braking system), and FIGS. 3A, 3B (use of pre-tensioned gear wheels). In these examples, the background speed control track and the speed control track are the same.

In the fall control system 100 described below, and with reference to FIGS. 4, 5A to 5E and 6A, the fall control system comprises a guide rail 310 or 210, a trolley 320 or 220 for moving along the guide rail 310 or 210, an adjustable length tether 140 for coupling to a speed-retarding subsystem of a trolley 320 or 210.

Figure 4:
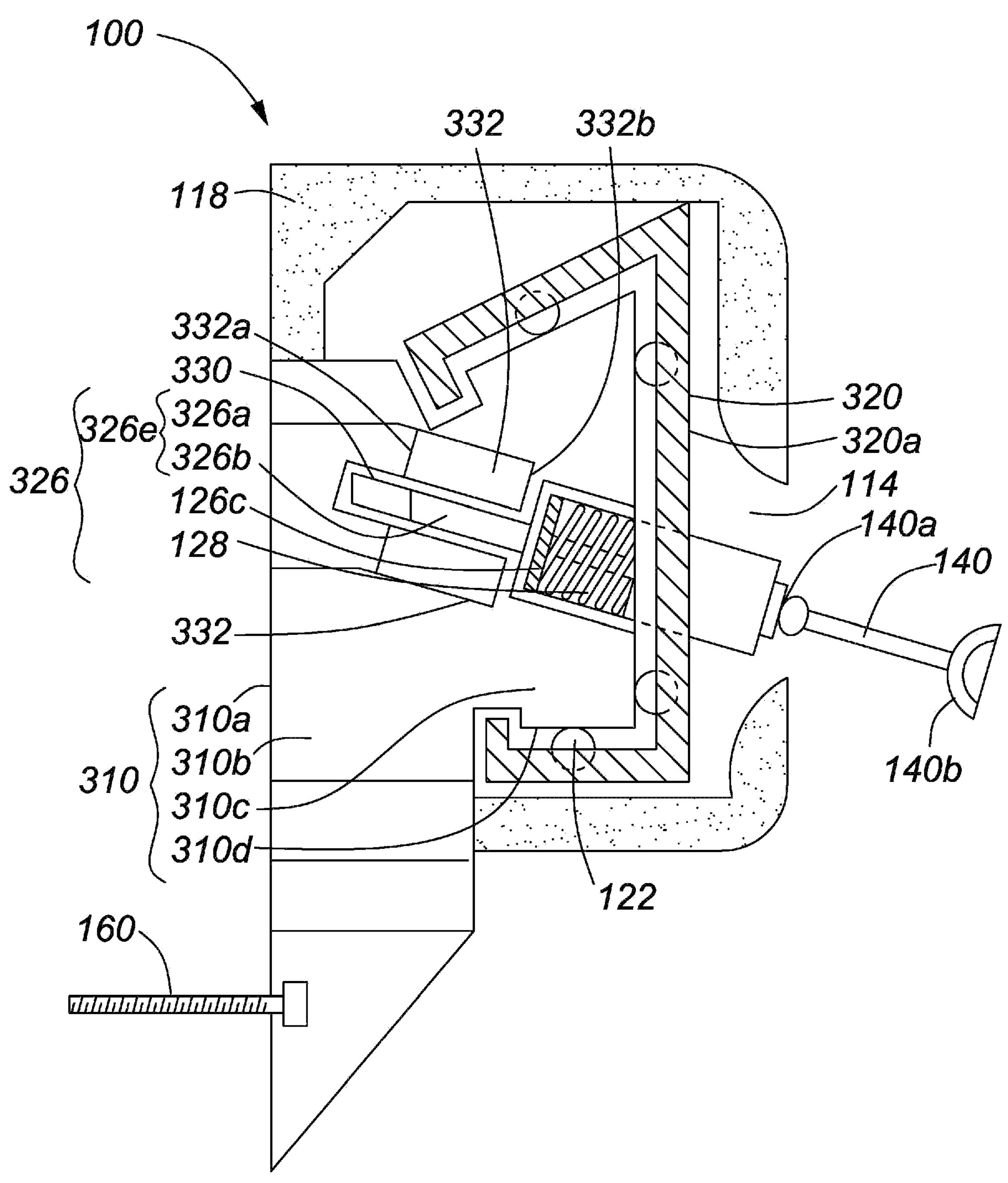
FIG. 4 shows a cross-sectional side view of an example of a fall control system as described herein. In this example, the fall control system comprises an eddy current brake speed control system, the eddy current brake speed control system comprising a conductive element that is displaceable into a magnetized slot within a speed-control track (rail).

With reference to FIG. 4, the guide rail 310 comprises a mounting surface 310*a* for mounting the guide rail to a surface, an outer surface 310*d* upon which the trolley 320 moves along, and a speed-control track 330. An outer case or protective cover 118 may surround the guide rail 310 and trolley 320.

In this example, and with reference to FIG. 4, the speed-control track 330 comprises two magnets 332 with surfaces that define a channel formed within the guide rail 310. The speed control track 330 extends along a length of the guide rail 310. The two magnets 332 are positioned between 332*a* and 332*b*, and exert a magnetic field within the speed control track 330. The magnets may be made of any magnetic material, for example a paramagnetic, ferromagnetic material, or a combination thereof, a rare earth magnet, or a neodymium magnet.

Trolley 320 comprises a trolley body 320*a*, and a speed control system 326 that is coupled to the trolley body 320*a* and indirectly, to tether 140. Trolley 320 is slides along the outer surface 310*d* of the guide rail 310 via one or more rolling elements 322 as previously described.

With reference to FIGS. 5A-5E and 6A, the guide rail 210 comprises a mounting surface or base 210*a* for mounting onto a substrate, a wall, or fixture, an elongate guiding shaft 210*c* with a circular cross-section, a body portion 210*b* connecting the base 210*a* to the elongate guiding shaft 210*c*, and a speed-control track 430 extending away from a surface of the guide rail 210. The elongate guiding shaft comprises an outer surface 210*d* on which a trolley 220 moves along. The speed-control track 430 comprises a body 430*a*, that may be mild to moderately conductive, and a more strongly conductive cap 430*b* (a conductive cap) that is disposed at an end of the less conductive body 430*a* (a base conductive element) so that conductive cap 430*b* extends away from the surface of the guide rail 210.

The guide rail 210 may be made from steel, stainless steel, aluminum, anodized aluminum, copper, nickel, tungsten, zinc, iron, tin, titanium, nichrome, an alloy of these metals, or similar material. The outer surface 210*d* of guide rail 210 may be coated in a ceramic, or other low friction material to facilitate movement of trolley 220 along the guide rail 210. An example, that is not to be considered limiting, of such a rail-trolley arrangement is a linear bearing system using round shaft technology from PBC Linear (Pacific Bearing Company), for example, Simplicity® 60 Plus® Shafting, and accompanying bearing. The bearing component may be modified to include the components of the trolley described herein. The trolley 220 may also move along guide 210*c* using rolling elements, for example, as shown for example in FIGS. 8A, 9A, 10A, 11A.

The trolley 220 comprises a trolley body 220*a* and a speed control system 126 that is coupled to the trolley body 220*a*. An adjustable length tether 140 is attached to support 126*c* of the speed control system 126. The trolley 220 also comprises a channel (not shown) for receiving the tether 140, and one or more rollers or guides 242 for supporting the tether 140 in the channel within the trolley 220. An inner surface of trolley 220 slides along outer surface 110*d* of guide rail 110 through a low resistance contact surface, for example, the inner surface of the trolley body 220 may be made from a low resistance material, for example, TEFLON® (polytetrafluoroethylene; PTFE) or other polymer as would be known in the art that permits the trolley 220 to easily slide along guide rail 210.

The trolley 220 may be manufactured of any material suitable in the art, for example, but not limited to, a suitable metal, alloy, resilient polymeric material, epoxy resin, fibreglass cloth-fibreglass resin composition, carbon-fibre fibreglass resin composition, fibreglass cloth-epoxy resin composition, carbon fibre cloth epoxy resin composition, and manufactured in a manner that can support a weight capacity of a person that may be attached to the trolley 120, for example, a person with a weight of from about 20 (10 kg) to about 700 pounds (320 kg), or any weight therebetween, such as a weight of from about 20 (10 kg) to about 400 pounds (185 kg).

With reference to FIG. 4, the speed control system 326 comprises a speed controller 326*e* comprising a conductive element 326*a* (conductive cap) at the tip of the speed controller, that is connected to a support 126*c* by a non-conductive or mildly conductive element 326*b* (base conductive element), and a retainer 128 for providing a retaining force that biases the conductive element 326*a* away from the magnetized second section formed between magnets 332 within the speed control track 330. Non-conductive or mildly conductive element 326*b* is manufactured of a suitable material known in the art, for example, but not limited to, an austenite-containing composition, a resilient polymeric material, epoxy resin, fibreglass cloth-fibreglass resin composition, carbon-fibre fibreglass resin composition, fibreglass cloth-epoxy resin composition, carbon fibre cloth epoxy resin composition, and the like. Alternatively, the mildly conductive material may be composed of metal, steel, copper, aluminum, nickel, tungsten, zinc, iron, tin, titanium, stainless steel, nichrome, or an alloy of these metals.

Conductive element 326*a* (conductive cap) is manufactured of a suitable material known in the art, for example, any conductive material, for example but not limited to, metal, steel, copper, aluminum, nickel, tungsten, zinc, iron, tin, titanium, stainless steel, nichrome, or an alloy of these metals.

Support 126*c* comprises a body portion and at least a portion of the body of the support 126*c* is traversable through an opening (not shown) in the trolley body 320*a*. A first end of support 126*c* is attached to the non-conductive or mildly conductive element 326*b*, while the second end of the speed retarding subsystem 326 is attached to a first end of tether 140*a* by any suitable coupling. The support 126*c* is preferably manufactured of a non-conductive material known in the art as described above. Support 126*c* may be hollow and so that the retainer 128 is disposed within support 126*c*, between the first end, and an inner surface of the trolley body 320*a*. Alternatively, the support 126*c* may be hollow or solid, and the retainer 128 is placed outside of the support so that the retainer surrounds at least a portion of the body of the support 126*c* and is positioned between the first end of the support 126*c* and the trolley body 320*a*.

In use, a portion of the speed controller 326 is disposed within the speed control track 330 to provide a first maximum speed (as described above) of the trolley 320 along the guide rail 310. Speed controller 326*e* is displaceable within the speed-control track 330, from a first position (travelling orientation) to a second position (falling orientation). The first position is shown in FIG. 4. In this example, the background speed control system and the speed retarding subsystem share many of the some components.

At the first position, the speed controller 326*e* is maximally inserted within the speed control track 330, so that the speed controller 326*e* is fully inserted within the slot of the speed control track 330. At the first position the non-conductive or mildly conductive element 326*b* (base conductive element) substantially overlaps with the magnetic field created between magnets (surfaces) 332, while the interaction of the more strongly conductive element 326*a* (conductive cap) with the magnetic field is minimal and functions as a background eddy current brake, but sufficient to establish (or aid in stabilizing) a first maximum speed of the movement of the trolley 320 along guide rail 310. The retainer 128 provides a retaining force against support 126*c* to bias the speed controller 326*e* towards the first position. In this configuration the components of the speed control system function as the background speed control system.

At the second position, the speed controller 326*e* is withdrawn from the slot of the speed control track 330, and the overlap between the speed controller 326*e* and the magnetic field within the speed control track 330 increases. The more strongly conductive element 326*a* (conductive cap) is displaced from the first position, and pulled into the magnetic field by an external pulling force on support 126*c*. The pulling force, for example a fall, compresses the retainer 128 and displaces the conductive element 326*a* into the region between surfaces 332, within the slot of the speed control track 330. In other words, at the second position, the overlap between the more strongly conductive element 326*a* (conductive cap) and the magnetic field is greatest and the components function as a speed retarding system. The amount of overlap between the conductive element 326*b* and the magnetic field at the second position creates an electromagnetic drag force that is greater than that produced at the first position. The created electromagnetic drag force limits the speed at which the trolley 320 may move along the guide rail 310, to one that does not exceed a second maximum speed. In a manner similar to the examples previously described in relations to FIGS. 2A, and 2B, the second maximum speed is less than the first maximum speed.

With reference to FIGS. 5A to 5E and 6A, the speed control system, collectively shown as 126, comprises a speed controller 126*e*, magnetic arms 126*a*, 126*b*, support 126*c* and retainer 128. The magnetic arms 126*a* and 126*b* are connected to magnetic material that is larger in surface area than the arm. There is a space between the magnetic arms 126*a* and 126*b* for receiving the speed-control track 430. In these examples the background speed control track and speed control track are the same. Similarly, the background speed control system and the speed retarding subsystem share many of the same components. The magnetic material may be made of any magnetic material, for example a paramagnetic, ferromagnetic material, or a combination thereof, a rare earth magnet, or a neodymium magnet. Magnetic arms 126*a*, 126*b* of the speed controller 126*e* interact with the speed-control track 430 to form an eddy-current brake. The speed controller 126*e* is also attached to a support 126*c*. Support 126*c* includes an attachment point for attaching the first end of tether 140*a* to the speed retarding subsystem 126.

The retainer 128, is located between the support 126*c* and the trolley body 220*a*, the retainer 128 is for providing a retaining or biasing force, that biases the speed controller 126*e* away from the conductive cap 430*b* (i.e., towards elongate rail 210) of the speed-control track 430. In this configuration, the components of the speed control system functions as a background speed control system.

The retainer 128 may comprise, for example but not limited to, a spring, compressible rubber, or other biasing device. The biasing force of the retainer 128 is of sufficient force to counteract any minor pulls or tugs that a person may apply against the support 126*c* via tether 140 as the trolley 220 moves along the guiderail 210. However, if a force is applied to support 126*c* that exceeds a threshold force of the retainer, then the retainer 128 is compressed and the support 126*c* is moved from its biased position (first position; shown in FIGS. 5A to 5E, and 6A), towards a compressed position (second position) that compresses the retainer and moves the magnetic arms 126*a* and 126*b*, and the magnetic tips of these arms, to engage an increased surface area of the speed-control track 430 and engage the speed retarding subsystem. The cap (430*b*; conductive cap) is composed of a more strongly conductive element than 430*a* (base conductive element). The base conductive element, 430*a*, has some conductive properties to impede the trolley's speed to approximately 12-14 inches per second, or any amount therebetween, for the average user, or just slightly more, for example, approximately 10-18 inches per second, or any amount therebetween, when the braking mechanism is not fully engaged. Preferably, the retainer 128 has a biasing force of about 20 to about 35 pounds, or any amount therebetween. However, the biasing force of the retainer 128 may be of any suitable magnitude, for example, but not limited to, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50 pounds/inch or any amount therebetween.

The pair of magnetic arms 126*a*, 126*b* are positioned so that they overlap the less conductive body of the speed-control track 430 and function as a background eddy current brake. The range of overlap between the pair of magnetic arms 126*a*, 126*b*, and the speed-control track 430 extends from a first, or biased position (background speed control system engaged) through to a second, compressed position (speed retarding subsystem engaged). It is to be understood that the overlap between the magnetic arms 126*a* and 126*b* and the speed-control track 430 may be at any position between the first and second positions, and depends upon the force used to compress the retainer 128.

At the first position (biased position), the speed controller 126*e* is maximally biased away from the more strongly conductive cap 430*b* (conductive cap) of the speed-control track by the retaining force exerted by the retainer 128 against the support 126*c*, functioning as a background eddy current brake. At the first position, the pair magnetic arms 126*a*, 126*b* of the speed controller 126*e* and the more strongly conductive cap 430*b* (conductive cap) of the speed-control track 430 exhibit no, or a minimal overlap, while maximizing the amount of overlap between the magnetic elements and the less conductive body 430*a* (base conductive element) of the speed-control; track 430. As noted above, in this configuration the components of the speed control system function as a background speed control system.

The amount of overlap between the pair of magnetic arms 126*a*, 126*b* and the speed-control track 430 at the first position may be set to create an electromagnetic drag force, which limits the movement of the trolley 220 along the guide rail 210 to a first maximum speed. That is, the spatial relationship between the pair of magnetic arms 126*a*, 126*b* and the speed-control track 430 creates a corresponding electromagnetic drag force that prevents the trolley 220 from moving more than the first maximum speed of the first speed range, along guide rail 210 (e.g., a maximum walking speed at the upper range of normal). The first maximum speed of the movement of the trolley 220 along guide rail 210 is less that the expected maximum fall velocity of the user in the event of a fall. For example which is not to be considered limiting, the first maximum speed may be from about 12 to about 14 inches/second, or any amount therebetween. However, in other embodiments the first maximum speed of the movement of the trolley 220 along guide rail 210 in a travelling orientation may be adjusted to any desired speed, for example, but not limited to, 5, 6, 7, 8, 9, 10, 11, 12, 13, 14, 15, 16, 17, 18, 19, 20 inches/second, or from 0.5 to 5 km/hr, or any amount therebetween, for example, from about 0.5, 1.0, 1, 5, 2.0, 2.5, 3.0, 3.5, 4.0, 4.5, 5.0 km/hr, or any amount therebetween, in order to approximate the range in walking speeds of a person.

The second (compressed or falling orientation) position the speed range of the speed controller 126*e* is determined by the degree of engagement of the magnetic arms 126*a* and 126*b* of the speed controller 126*e*, the speed-control track 430, thereby engaging the "eddy-current brake". At the fully engaged, second position, the speed controller 126*e* is pulled along the height (or depth) of the speed-control track 430. In this position, the magnetic field produced from the magnetic tips of the magnetic arms 126*a* and 126*b* fully interact with conductive cap 430*b* of the speed-control track 430. In the second position the retaining force exerted by the retainer 128 against the support 126*c*, to bias the speed controller 126 towards the first position, is completely overcome. In the engaged or second position, the pair of magnetic tips of the magnetic arms 126*a*, 126*b* and the more strongly conductive cap 430*b* (conductive cap) of the speed-control track 430, overlap. The amount of overlap between the pair of magnetic arms 126*a*, 126*b* and the conductive cap 430*b* at the second position creates an electromagnetic drag force, which limits the movement of the trolley 220 along the guide rail 210 to a second maximum speed (e.g., a fall speed). In this configuration the components of the speed control system function as a speed retarding subsystem.

When fully engaged in a falling orientation, the second maximum speed of the trolley 220 as it moves along guide rail 210, is from about 3 to about 6 inches/second, or any amount therebetween. The second maximum speed of the movement of the trolley 220 along guide rail 210 may be adjusted to any desired speed, for example, but not limited to 1, 2, 3, 4, 5, 6, 7, 8, 9, 10 inches/second, or any amount therebetween. The second speed range, is achieved when the eddy-current brake may be partially or fully engaged by a person that trips or loses their footing and falls while walking along a flat or inclined surface, or while ascending or descending stairs. The second speed range thereby helps to control the falling speed of the person. It is to be understood that the second speed range will vary depending upon the degree of engagement between the magnetic tips of magnetic arms 126*a* and 126*b* of speed controller 126*e* and the cap on the speed-control track (430*b*).

The speed control system 126 does not comprise a brake that brings the trolley 220 to a complete stop during its travels along the guide rail 210. Therefore, the first maximum speed of the trolley 220 is greater than the second maximum speed of the trolley 220, and neither the first maximum speed nor the second maximum speed is zero. In the arrangement of the speed control system 126 described herein, both the first maximum speed and the second maximum speed are greater than zero, and the trolley 220 is never fully arrested, even when the speed controller 126*e* is displaced fully in the second position.

An adjustable length tether 140 is attached to the end of the support 126*c* of support 126*c*, at the first end of the tether 140*a*. In an example of a use of the fall control system 100, the tether 140 is coupled to a person either directly, or via a harness or a transfer belt (see FIGS. 7A to 7E) at one end, and coupled to the support 126*c* of the speed controller 326 at another end, 140*a*. A non-limiting example of a transfer belt is a SafetySure® Transfer Belt" or modified version of such (available from health suppliers, for example, Healthcare Solutions, MTS Medical Supply, or SCAN Medical). The transfer belt as shown in FIGS. 7A to 7E, and as previously described, has several unique features that allows attachment to the transfer belt in a 30-45 degree radius on each side of the midline (anterior aspect of belt) to allow the attachment from the elasticized cord to the transfer belt to slide to either side (see FIGS. 7A and 7C), or remain midline relative to the users body. This design of belt permits the user to remove the belt, allowing it to dangle from tether 140 that is attached to the trolley 220. Then if the user decides to travel in the opposite direction, the user can put the transfer belt back on without having to undo tether 140 from the transfer belt. As discussed for other embodiments, the tether may be for attachment to the user in multiple locations. For example, the tether may be suitable for attachment directly to the user or via a harness or transfer belt at the user's shoulder and waist.

The tether 140, as previously described, may be an elasticized cord or belt, flexible cord or belt, non-elastic flexible cord or belt (for example made from nylon, a durable material or cable), an elastomeric cord, a bungee-type cord, or a combination thereof, and may be adjustable in length, or of any length, suitable for attachment to the person and the trolley 120 or 220 to permit movement along the guide rail 110. For example, a belt portion of tether 140 may be attached to an elasticized cord or cord portion, band or cable at 140*b*, and the cord, cord portion, band or cable attached to the user. The tether may also be comprised of a flexible band (for example a cable or nylon band) that is attached to an elasticized cord (for example an elastomeric or bungee-type cord) that then attaches to the transfer belt being worn by the user.

When the user or person is walking, for example using the speed control system 100 show in FIG. 4, the person exerts a pulling force on the speed controller 326, through the tether 140, that is sufficient to move the trolley 320 along the guide rail 310, and the speed controller 326 along the speed control track 330, but insufficient to displace the speed controller 326 from the first position. Due to the minimal overlap between the conductive element 326*a* the magnetic field between surfaces (magnets) 332, the electromagnetic drag force determines the first maximum speed. A person tethered to the trolley 320 is permitted to walk easily up to the first maximum speed permits. When the person falls, the person exerts a downward pulling force on the speed controller 326, through the tether 140, that is sufficient to overcome the retaining force of the retainer 128, and displaces the speed controller 326 from the first position to the second position. The overlap between the more strongly conductive element 326*a* (conductive cap) and the magnetic field increases as a result, and increases the magnitude of the electromagnetic drag force created by the speed-retarding subsystem. While the speed controller is in the second position, the trolley 320 is only permitted to move as quickly as the second maximum speed (the speed achieved by the average user when the speed controller is in the second position). The second maximum speed is less than the first maximum speed and both the first maximum speed and the second maximum speed are greater than zero. A similar mechanism of action applies to the speed control systems 100 as shown in FIGS. 5A to 5E and 6A.

When the person has regained composure, the pulling force against the retainer 128 is alleviated, the biasing force of the retainer 128 overcomes the pulling force exerted against the retainer 128, the speed controller 326 is displaced from the second position to the first position, and the person is permitted again to proceed at the first maximum speed.

Figure 5A:
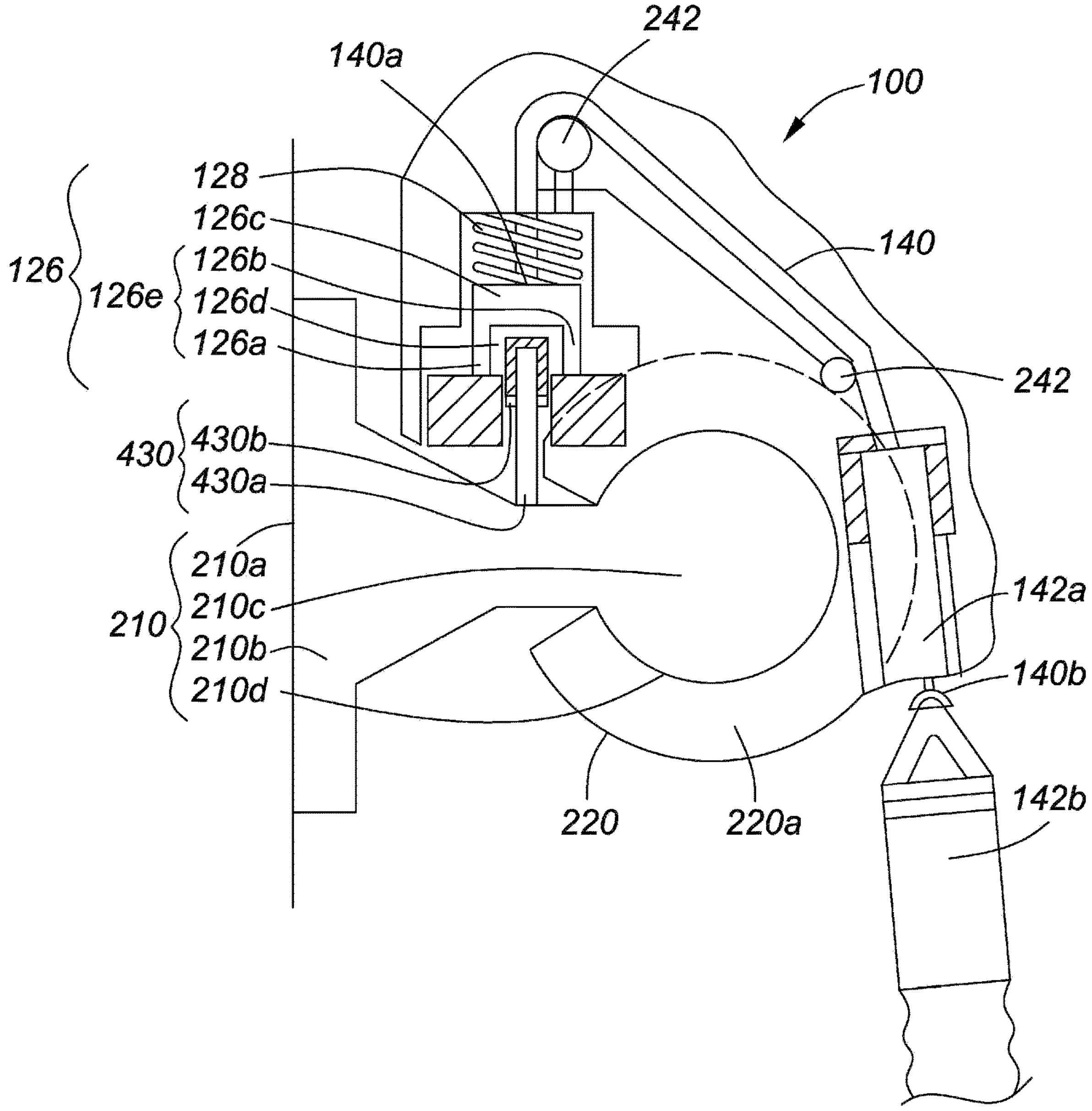
FIG. 5A shows a cross-sectional side view of an example of a fall control system as described herein.
Figure 5B:
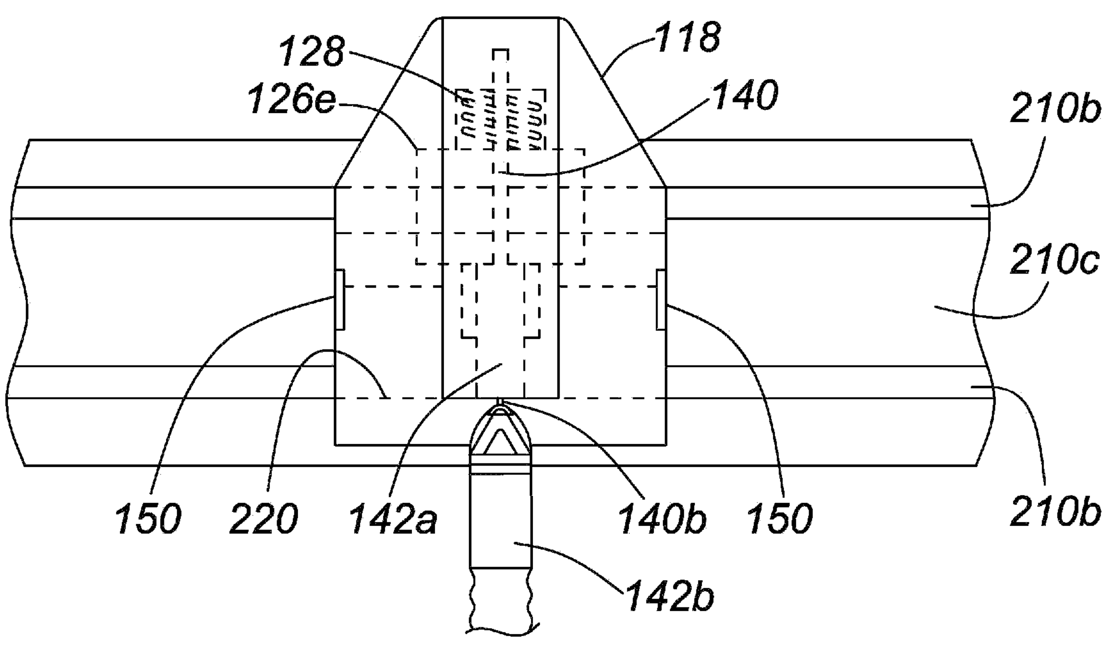
FIG. 5B shows a front view of the fall control system of FIG. 5A.
Figure 5C:
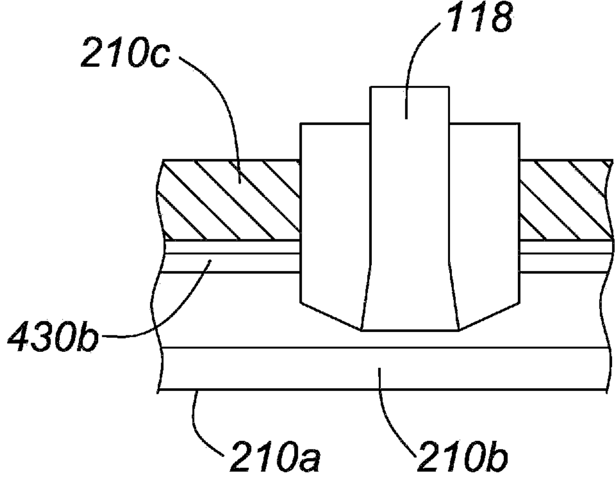
FIG. 5C shows a top view of the fall control system of FIG. 5A. In this example, the fall control system comprises an eddy current brake speed control system, the eddy current brake speed control system comprising a pair of magnets that is displaceable relative to a conductive element running a length of a speed-control track (rail).
Figure 5D:
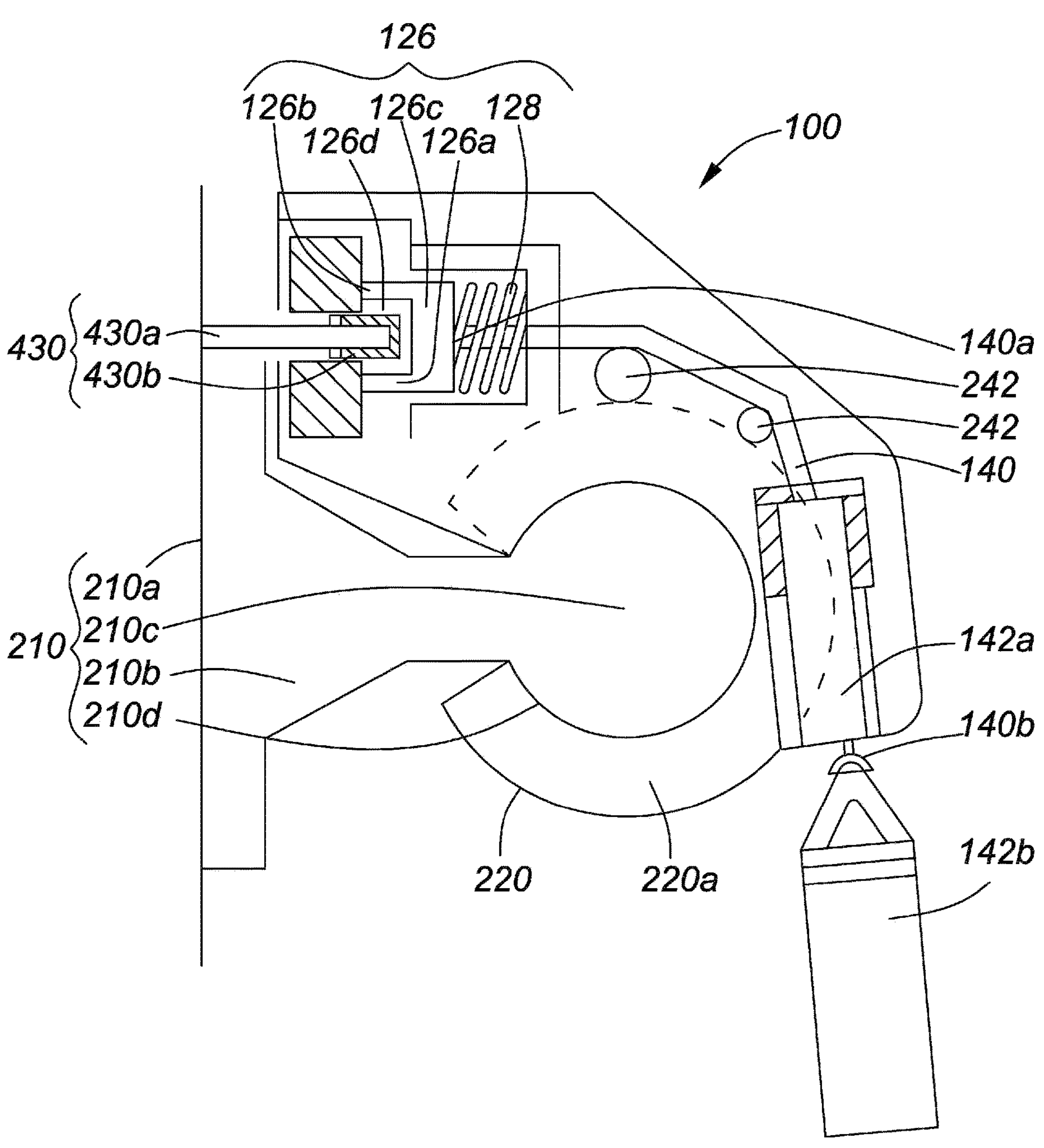
FIG. 5D shows a cross-sectional side view of another variant of the fall control system of FIG. 5A.
Figure 5E:
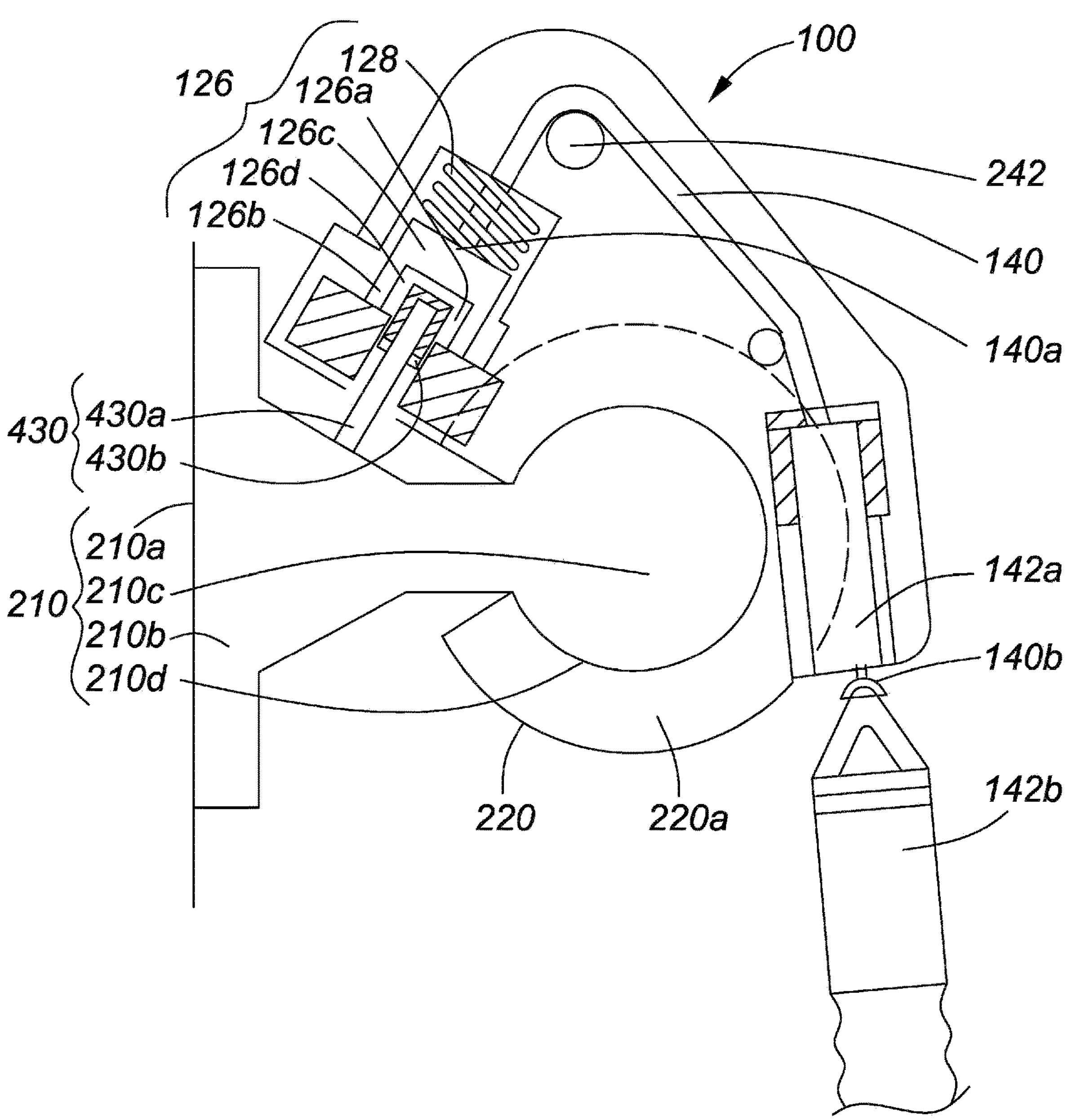
FIG. 5E shows a cross-sectional side view of another variant of the fall control system of FIG. 5A.
Figure 6A:
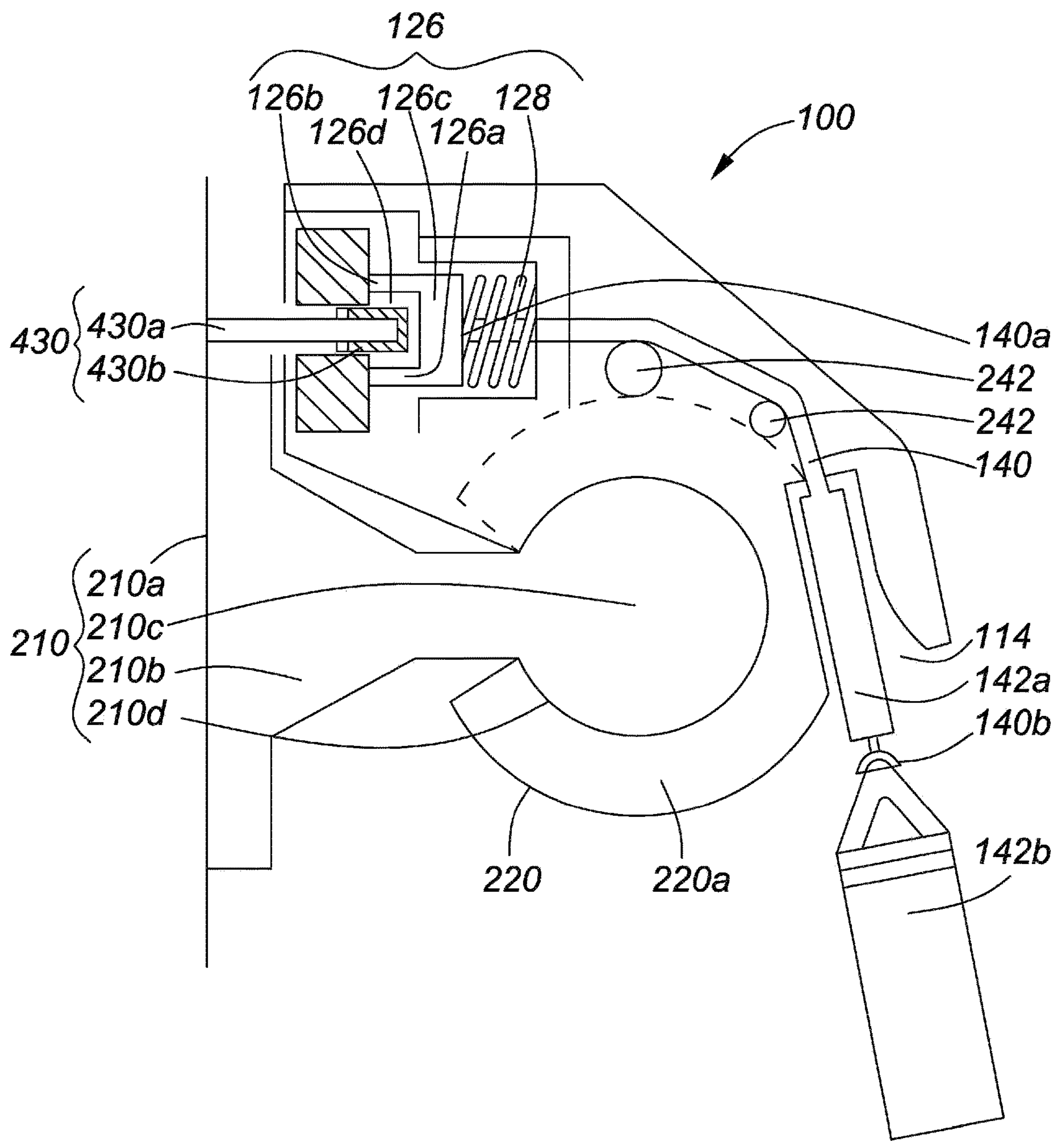
FIG. 6A shows a cross-sectional side view of an example of a fall control system comprising one eddy current brake speed control system.

While the speed controller 126 is depicted in FIG. 5A as oriented parallel to a surface onto which the guide rail 210 is mounted, the orientation of the speed controller relative to the surface onto which the guide rail 210 is mounted may vary as shown for example in FIGS. 5D, 5E and 6A. For example, the speed controller 126 may be oriented perpendicular or obliquely to the surface onto which the guide rail 210 is mounted.

Figure 6B:
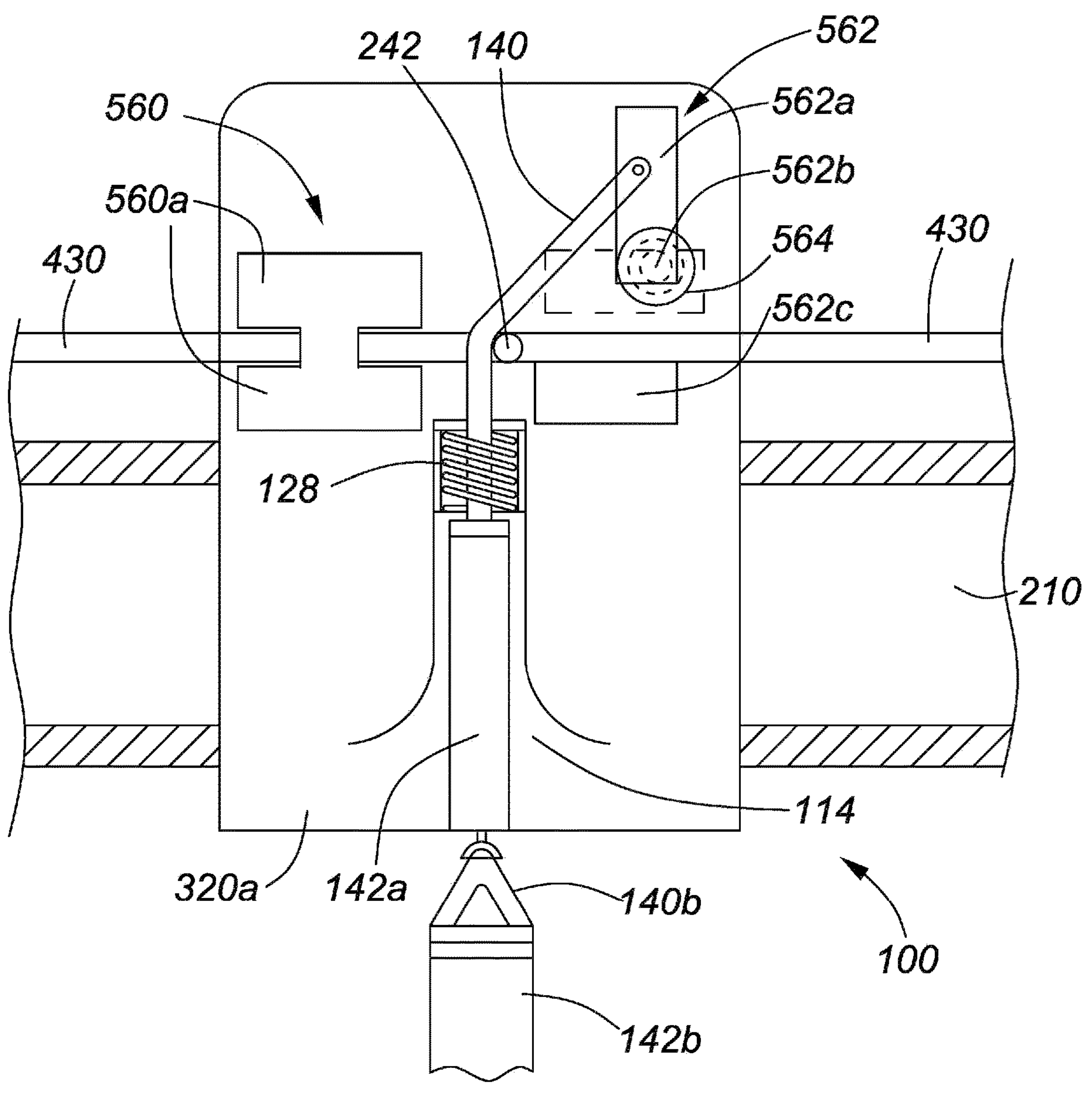
FIG. 6B shows a front view (with protective cover removed) of another variant of a fall control system comprising two eddy current brake speed control system.

FIG. 6B shows another variant of the fall control system 100, wherein the speed control system utilizes multiple eddy-current brakes. In this non-limiting example, two separate eddy-current brakes are shown. One eddy-current brake is always operational and functions as background speed controller 560, that interacts with speed control track 430 and collectively function as a background speed control system (i.e., a background eddy current brake) to limit the maximum walking speed. A second eddy-current brake, speed controller 562, comprises top magnet 562*a*, bottom magnet 562*c* and pivot 562*c*, with the top magnet 562*a* attached to tether 140. Top magnet 562*a* that pivots from a disengaged (first) position (shown in FIG. 6B) to an engaged (second) position (top magnet dotted position FIG. 6B) about pivot 562*b* when the user falls, thereby engaging the speed retarding subsystem as magnet 562*a* interacts with speed control track 430 thereby increasing the effect of the eddy current brake. One or more than one background speed controller (background eddy current brake) 560 may be used, one or more than one speed controller 562 may be used, or a combination of the background speed controller 560 and speed controller 562 may be used. In this example, the background speed control track and the speed control track are the same component.

As in other designs herein described, a retainer 128 provides a retaining force that biases the speed controller 562 of the speed retarding subsystem towards a first position, the retainer 128 located between the trolley body 220*a* and the speed controller 562. A plate or similar part (not shown) may be attached perpendicular to the cable 140 above the retainer 128 that limits the excursion of 140 as it is pulled down against the retainer 128. A second retainer 564, for example a spring, attached to the top magnet 562*a*, about pivot point 562*b*, of the speed control eddy-current brake 562, may be used to provide additional resistance if needed to return the top magnet 562*a* to an upright position as shown in FIG. 6B. The positions of the magnets, top magnet 562*a* and bottom magnet 562*c*, of the speed control eddy-brake as shown in FIG. 6B can be altered so that one or both magnets 562*a* and 562*b* swivel on a horizontal plane, a vertical plane, or a combination of both, to align the poles of the magnets to optimize the electromagnetic drag force relative to the speed control track 430. For example, in the first (disengaged) position, magnet 562*a* does not interact with the speed control track 430 (and only the background speed control system is active which would also include the magnet 562*c* acting on the speed control track 430). Swiveling magnet 562*a* about pivot 562*b*, brings magnet 562*a* into alignment with the speed control track 430 resulting in engagement of the speed controller 562 (second position; dotted in FIG. 6B). In a similar manner bottom magnet 562*c* can be configured to pivot about a pivot point as described for magnet 562*a* and engage speed control track 430 to collectively function as a speed retarding subsystem. The retaining forces, for example of the second retainer (spring) 564, needed to return magnet 562*a* (or 562*c*, or both 562*a* and 562*c*) to the resting position may be of any suitable force as required to separate magnet 562*a* from magnet 562*c* and the speed control track 430, back to the resting (disengaged) position. For example, the force of the second retainer may be from about 5 to 50 pounds of force, or any amount therebetween. When the speed controller 562 is engaged with sped control track 430, the magnet poles of magnets 562*a* and 562*c* align optimally to provide the greatest amount of electromagnetic drag force, thereby slowing the trolley's 220 speed to the fall speed. As described in the previous examples, the maximum walking speed is greater than the maximum fall speed, and the maximum walking speed and the maximum fall speed are both greater than zero.

The background speed controller 560 may also be comprised of one or more magnets 560*a* located within the trolley 320 and they may be positioned on one or both sides of a conductive guide rail 430 upon which the trolley moves. In the example shown in FIG. 6B, one magnet of the background eddy-current brake 560 is positioned within the trolley housing 320*a* and magnet 560*a* is located above and below the guide rail 210, and magnet 562*c* also functions as part of the background speed control system as it positioned to interact with speed control track 430. In an alternative example, the guide rail 210 may be conductive and function as a background speed control track along with the background speed controller 560. If the guide rail 210 functions as a background speed control track, then magnet 560 may comprise one or more than one separate magnets each attached to and positioned within trolley 320 and placed to that they are adjacent to guide rail 210 so as to operate as a background speed control system (functioning as an eddy current brake). Speed controller 562 may be configured to engage speed control track 430 as described above.

Figure 6C:
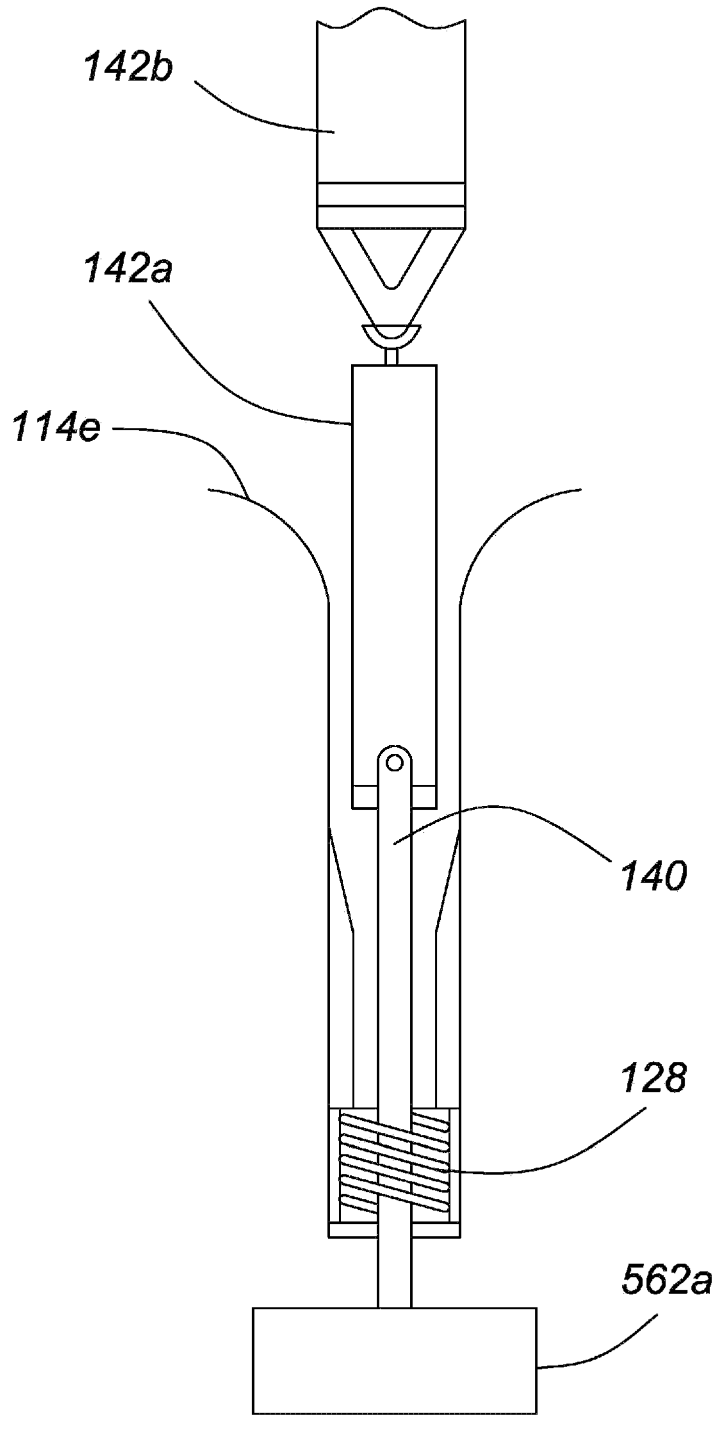
FIG. 6C shows a close-up front view of the fall control system of FIG. 6B.

In order to ensure that a smooth force from the tether 140 is applied to the speed control mechanism 526 during a fall, for example if the user does not fall straight down but rather to the side, the trolley may comprise a funnel like, or funnel shaped opening 114 (see FIG. 6B, 6C). The funnel like opening 114 in the trolley housing 320*a* may be made of a low friction material that would allow a cable, belt, elasticised belt, bungee cord, or cord (as described above) of the tether 140 to slide easily within opening 144, thereby activating the speed control system 526 without snagging or becoming struck within the trolley housing.

With reference to FIGS. 8A to 8D, 9A, 9B, 10A, 10B, 11A and 11B there are provided alternate fall control systems 100 that share a common feature involving the trolley 620 moving in two aspects about guide rail 210. In the first aspect, trolley 620 moves along the length of guide rail 210 in a travelling orientation (in a first direction; indicated by the letter "A"; see FIG. 8A), when in a first position, similar to the previous examples of the fall control systems that have been previously described. When the user is walking along with trolley 620, in a regular manner, up or down stairs or along a flat surface, the trolley 620 is positioned in a travelling orientation about circular guide shaft 210*c*, and tether 140 may pull and rotate trolley 620 upward, in direction opposite to the arrow "B" 670 (shown in FIGS. 8A, 9A, 10A, and 11A). In the second aspect, when in a second position (a falling orientation) trolley 620 rotates about circular guide shaft 210*c* in a rotatable direction (a second direction 670, indicated by the letter "B"; see FIG. 8A). For example, trolley 620 rotates (in a direction "B"; 670) about circular guide shaft 210*c*, of guide rail 210, when tether 140 is pulled in general a falling direction (fall orientation) as indicated by the letter "C" (see FIGS. 9A, 10A, 11A) and activates a speed control system that is described in more detail below. In the second position the minimum speed, when the speed control system (i.e., both the background speed control system and the speed retarding subsystem) is activated is never zero, therefore the person can move (e.g., crawl) up or down the stairs, or along a surface, even when the speed controller is fully engaged. This may be important as a disabled individual, that is unable to move up or down the stairs (as a result of a fall control system that impeded all movement), could potentially become stuck on stairs or floor for several hours or days until help arrived.

After a fall, when the user is resting on the stairs or level surface, the downward force on tether 140 and trolley 620 is significantly decreased in comparison to the forces imparted on the tether and trolley during a fall. As a result, trolley 620 may rotate back to its initial resting position (travelling orientation), releasing pressure between the areas of friction between the components of the trolley and the guide rail and associated components (as described in more detail below), allowing trolley 620 to move more freely on guide rail 210 so that the user may move (e.g., crawl) up or down the stairs or level surface. If desired, small weights (not shown) may be placed within trolley 620 to maintain trolley body 620*a* in the travel orientation, or first position, about cylindrical shaft 210*c* when trolley is stationary, or moving in the travel orientation along guide rail 210.

In the examples presented in FIGS. 8A to 8D, 9A, 9B, 10A, 10B, 11A and 11B, guide rail 210 comprises a body of the guide rail 210*b* and a circular shaft 210*c* with a curved outer surface 210*d*, a mounting surface (or base) 210*a*, and an upper guide rail shoulder 210*g*. The curved outer surface 210*d* of circular shaft 210*c* may interface with trolley 620 via rolling elements 122, or the inner surface of the trolley may slide along the outer surface of the guide rail 210*d* as previously described. Additionally, guide rail shoulders or surfaces 210*g*, 210*h*, 210*i*, 662*a*, and 695 may interface with trolley 620 via rolling elements (e.g., 122), a roller wheel (e.g., onset wheel 662*b*), an offset wheel (e.g., 675), or a surface of the trolley body (e.g., 662*g* or 690) when trolley 620 is rotated about circular guide shaft 210*c* as described below. The use of rolling elements 122 may assist with movement of trolley 620 along a guide rail 210 comprising linear sections as shown in FIG. 1A, or curved sections as shown in FIG. 1B.

Trolley 620 may rotate about the cylindrical guide shaft 210*c* in a clockwise or counter-clockwise direction, depending on which wall the guide rail 210 is placed. The onset wheels, 662*b*, offset wheels 675, and frictional surfaces 210*h* (FIGS. 8A, 9A), 210*i* (FIG. 8A, 11A), 662*a* (FIG. 9A), 690 and 695 (FIG. 9A) in the resting position may be angled slightly away from a true 90° (perpendicular) position, so that when the trolley is rotated the wheels and/or frictional surfaces contacting the opposing surface are in alignment.

As previously described, the guide rail may be formed as one continuous rail, or by a plurality of guide rail sections (not shown) coupled together and may be linear or curved so that they may be fitted against a bearing surface, for example a wall, a ceiling, support posts, wall studs, rafters or overhead beams, within a stair well, a room, a hall or passageway. The guide rail 210 may be made from steel, stainless steel, aluminum, anodized aluminum, copper, nickel, tungsten, zinc, iron, tin, titanium, nichrome, a metal alloy, a polymeric material, or a combination thereof. As an alternative or in addition to rolling elements 122, the outer surface 210*d* of guide rail 210 may be coated in a ceramic, or other low friction material to facilitate movement of trolley 620 along the guide rail 210. The guide rail 210 is manufactured in a manner that when installed to a weight bearing surface, the guide rail can support a weight capacity of a person that may be attached to the guide rail, for example, a person with a weight of from about 20 pounds (10 kg) to about 700 pounds (320 kg), or any weight therebetween, such as a weight of from about 20 (10 kg) to about 400 pounds (185 kg). An example, that is not to be considered limiting, of such a rail-trolley arrangement is a linear bearing system using round shaft technology from PBC Linear (Pacific Bearing Company), for example, Simplicity® 60 Plus® Shafting, and accompanying bearing. However, the components are modified to include the components of the trolley 620 as described herein. In some embodiments, the fall control system may comprise a curvilinear guide rail such as a Rollon® Curviline rail.

Part of the cylindrical or circular shaft 210*c* may be at least partially conductive and non-ferromagnetic as it may function as a background speed control track, as part of the linear eddy current brake as descried in more detail below. For example, a portion of the outer surface of the cylindrical shaft 210*c*, located adjacent (background) magnets 660*a*, 660*b* (see FIGS. 8B, 9A, 9B 10A, 10B, 11A, 11B), may be comprised of a conductive, non-ferromagnetic material, the inner core of the circular shaft 210*c* may be a non-conductive or comprised of a weakly conductive or non-ferromagnetic material, or a combination thereof.

In the travelling orientation there may be a gap between the lower inner surface of trolley 620 and the lower surface (e.g., 662*a*, FIGS. 9A and 10A; or 210*i*, FIG. 11A) of guide rail 210. This gap may be filled using a compressible, resilient plug 685 (see FIG. 8A). Plug 685 may be made from a rubber, a foam, a silicone, or other flexile polymeric material provided that plug 685 can compress and rebound back to its original form during use of trolley 620. When trolley 620 is moving along in the travelling orientation, plug 685 is in an uncompressed state. When trolley 620 is pulled in the general direction "C" and rotated about circular guide shaft 120*c* during a fall (in the fall orientation), then plug 685 will be compressed against the lower surface (e.g., 662*a*, FIGS. 9A and 10A; or 210*i*, FIG. 11A) of guide rail 210. Plug 685 helps keep fingers, and other items, out of the space between the trolley and the guide rail.

A bell like device (not shown) may be installed at either end of guide rail 210 so that when trolley 620 reaches either end of guide rail 210, the trolley may strike the bell, or similar device, to produce a sound that alerts the user that they have reached the end of the guide rail and that they turn around and go in the opposite direction, or remove the safety belt 50 from around their waist, or undo a clip connecting them to tether 140. The bell or similar device would be an added safety feature, acting as a reminder, so that the user does not continue walking when the trolley has come to a complete stop at either end of the guiderail, and avoiding the user being jerked backwards, losing balance, and falling.

When the fall control system 100 is not in use, the trolley 620 may be secured in place at one end of guide rail 210 by coupling a contact 150 (FIG. 8B) to a corresponding component (not shown) located at either end of the guide rail 210. For example, the trolley 620 may be secured in place by any suitable device known in the art, including but not limited to a magnet, a snap clip, a lever, a clasp, a clip, a cord, a hook, and the like.

An adjustable length tether 140, may be as previously described, for example an elasticized cord or belt, a flexible cord or belt, a non-elastic flexible cord or belt, a bungee-type cord, or a combination thereof and may be of any length suitable for attachment to the person and the trolley 620 to permit movement along the guide rail 210. The adjustable length tether 140 may comprise belt 142*a* and elastic cord 142*b* (FIG. 8C), with the belt 142*a* attached to trolley body 620*a* using any suitable connector 144 (FIG. 8C). For example connector 144 may be a swivel connector, a ring connector, a detachable clip, or tether 140, or belt 142*a* may be integrally formed with, or pass through an opening and become wedged within, trolley body 620*a*. The region about the attachment point of tether 140 or belt 142*a* to the trolley body 620*a* may comprise a funnel-shaped opening 114 and this area may be coated with a low friction material to ensure that tether 140 does not snag on trolley body 620*a*. For example, the funnel shaped opening 114 may be covered by TEFLON" (polytetrafluoroethylene; PTFE), ceramic or other low friction material. Alternatively as discussed for other embodiments, the attachment of the tether to the trolley body may comprise a hanger, roller, pulley, spring roller, spring pulley, or a combination thereof.

The funnel shaped opening 114 may comprise an asymmetric profile, with a tighter upper curvature (see for example FIGS. 9A, 10A, 11A), this profile may prevent or limit rotation of trolley 620 about the cylindrical shaft 210*c* toward the user during normal walking, for example, when going up stairs. Keeping the position of tether 140 lower on trolley 620 may keep the trolley from rotating during use in a travelling orientation, where rotational forces acting on the trolley moving along the cylindrical shaft are at a minimum.

Tether 140 may be a wide, thin band, for example, a nylon band at the location of attachment 144 to trolley 620. In the event of a fall, should the user reach up and grab tether 140 at a point within the funnel shaped opening 114, a wide thin band may cause less injury than a small diameter cord or cable that could result in the fingers or other part of the hand become pinched between the tether 140 and the funnel shaped opening 114. The adjustable length tether 140 (or 142*b*, FIG. 8C) may be made from a material is strong enough to support a user during a fall event, and that is partially flexible, for example, allowing for expansion of about 2 to about 5 times the length of the tether. For example, bungee jumping cord has a maximum stretch of 600% at break. This would allow a relatively short tether from the use) to the trolley 620, but allow significant stretch to allow the user to experience a controlled descent upon falling to the floor, stairs, or ground. The length of tether 140 should be customized to the user's size (height and width) and the user's walking style (i.e., walking close to the guide rail, versus farther away). Depending on where the guide rail 210 is installed on the wall and where the tether is configured to attach to the user, the length of the tether may be between about 5 to about 40 inches in length, such as between about 10 inches and about 30 inches in length, or about 12 and about 16 inches in length. With this length, when trolley 620 lags behind the user walking upstairs, or leads the user walking downstairs, the trolley is still close to the user's center of mass. The tether is affixed to a person either directly, or via a harness or a transfer belt (FIGS. 7A to 7E) at a distal second end. A non-limiting example of a suitable transfer belt is a SafetySure® Transfer Belt (available from health suppliers, for example, Healthcare Solutions, MTS Medical Supply, or SCAN Medical). See also the transfer belt optimized for use with this fall control system in FIGS. 7A to 7E (as described herein).

The trolley 620 may be manufactured of any material suitable in the art, for example, but not limited to, a suitable metal, alloy, resilient polymeric material, epoxy resin, fibreglass cloth-fibreglass resin composition, carbon-fibre fibreglass resin composition, fibreglass cloth-epoxy resin composition, carbon fibre cloth epoxy resin composition, and manufactured in a manner that can support a weight capacity of a person that may be attached to the trolley 620, for example, a person with a weight of from about 20 (10 kg) to about 700 pounds (320 kg), or any weight therebetween, such as a weight of from about 20 (10 kg) to about 400 pounds (185 kg).

In the examples presented in FIGS. 8A, 9A, 10A, and 11A, trolley 620 is shown to move along the outer surface 210*d* guide rail 210 via one or more than one roller bearing 122. However, the inner surface of trolley 220 may also slide along outer surface 210*d* of guide rail 110, as previously described above (with reference to FIGS. 3B, 5A-5E, and 6A) through a low resistance contact surface, for example, the inner surface of the trolley body 220 may be made from a low resistance material, for example, TEFLON® (polytetrafluoroethylene, PTFE) or other polymer as would be known in the art that permits the trolley 620 to easily slide along guide rail 210. For example, but not to be considered limiting, self-lubricating bearing elements such as PBC Linear (Pacific Bearing Company) SIMPLICITY® Linear Plain Bearings may be used, and for curvilinear guide rails, a Rollon® Curviline rail may be used. As previously described, trolley 620 may comprise a soft cover 118 (e.g., FIGS. 9A, 10A, 11A) and rounded corners (e.g., FIGS. 9B, 10B, 11B) to protect the user if they encounter trolley 620 during a fall.

The trolley 620 comprises a trolley body 620*a*, a background speed control system and a speed retarding subsystem, a coupled to the trolley body 620*a*. The background speed control system is always engaged and controls the speed of trolley 620 while the trolley is moving along guide rail 120, for example in a first position, or in a travelling orientation. For example, with reference to FIGS. 8B, 9A, 10A, and 11A there are shown several types of background speed control systems that comprise a background eddy current brake. In these examples, the guide rail 210, or a portion of the guide rail, for example the upper and lower portions of circular guide shaft 210*c*, is conductive and functions as a background speed control track. Trolley 620 may comprise one or more than one background magnet, for example 660*a*, 660*b* that engages with the conductive circular guide shaft 210*c* (background speed control track) to form an eddy current brake in a manner similar to the eddy control brakes previously described, where an electromagnetic drag force is created when the magnetic element glides over the non-ferromagnetic surface material, and the magnetic element and non-ferromagnetic surface thereby function to act as a linear eddy current brake.

Figure 8A:
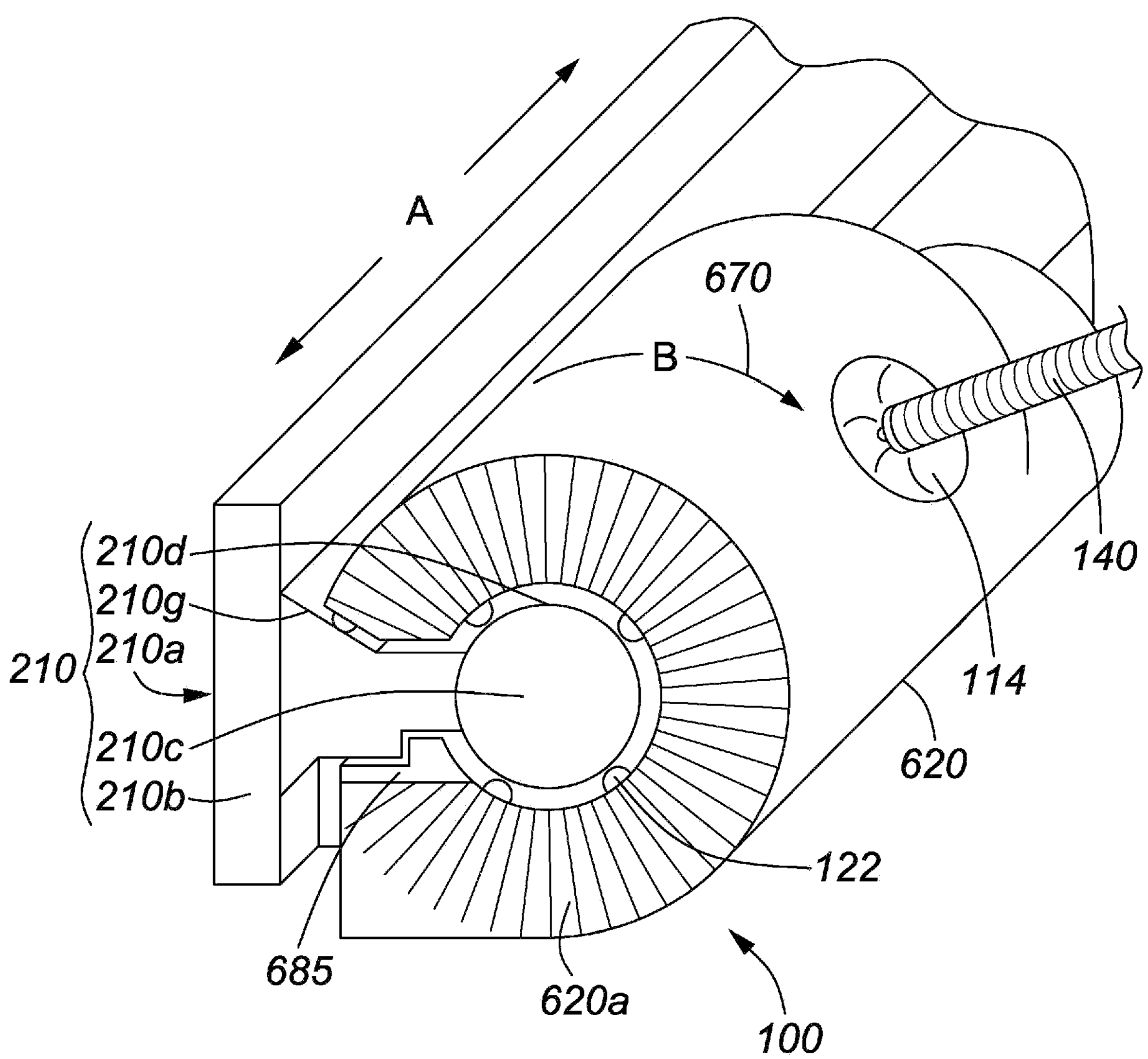
FIG. 8A shows a perspective view of another example of a fall control system as described herein.
Figure 8B:
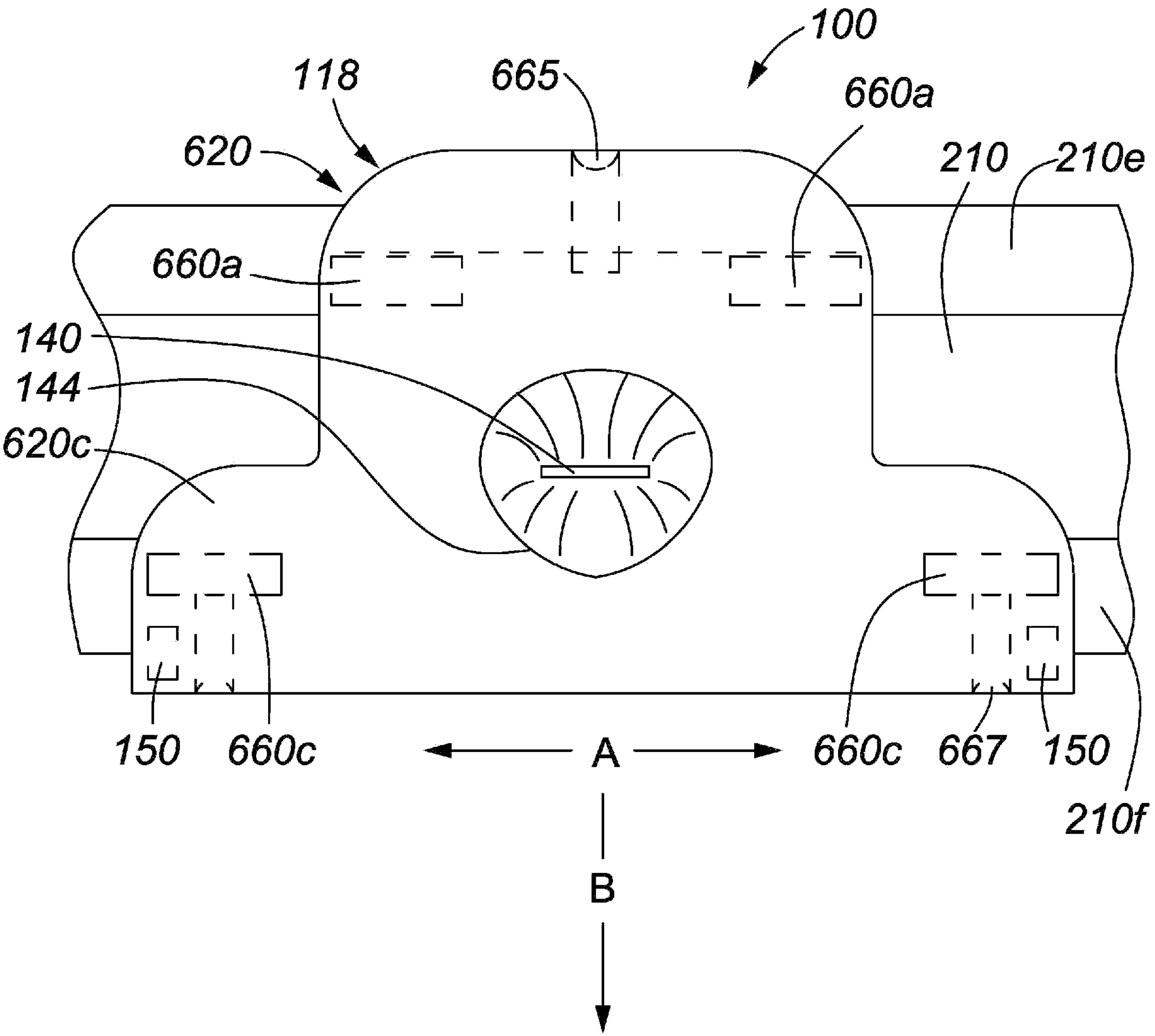
FIG. 8B shows a front view of the fall control system of FIG. 8A.
Figure 8C:
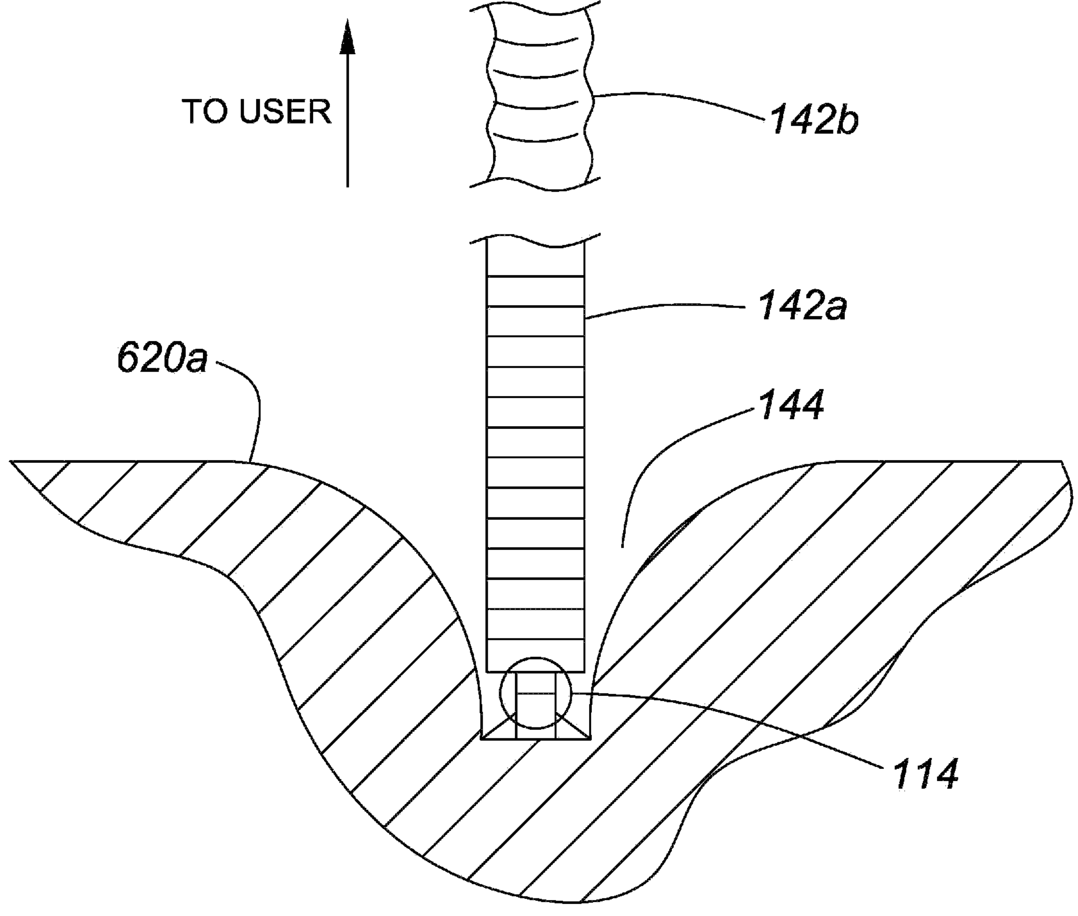
FIG. 8C shows a top view of a detail of the fall control system of FIG. 8B showing an example of tether attachment to the trolley body.
Figure 8D:
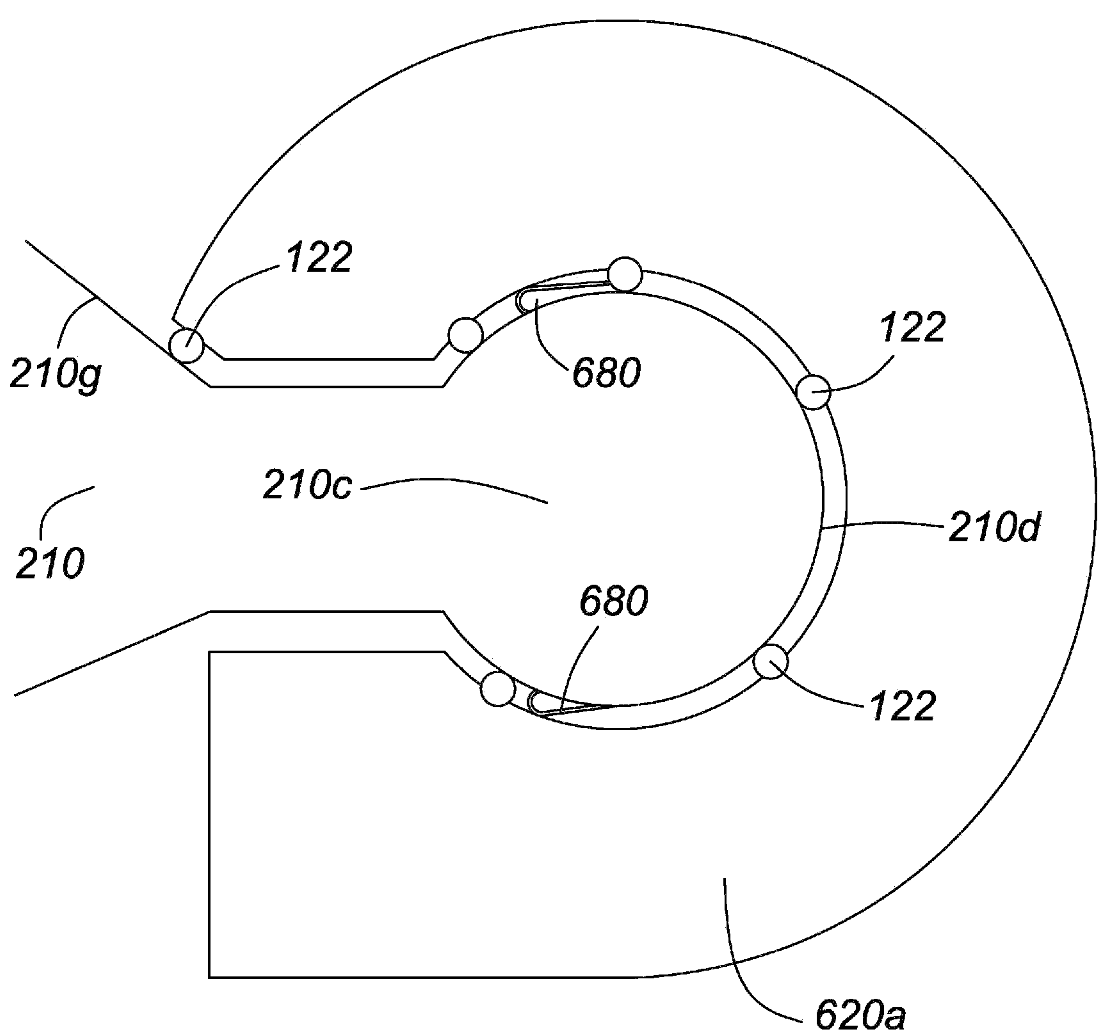
FIG. 8D shows a cross-sectional side view of the trolley and a portion of the guide rail shown in FIG. 8A.

In the example shown in FIG. 8B, trolley 620 comprises a background speed control system comprising one or more than one background magnet 660*a* positioned above a conductive (e.g., comprising a non-ferromagnetic surface material) circular guide shaft 210*c* to act as a background eddy current brake. Similarly, one or more magnets 660*b* may be positioned below conductive circular guide shaft 210*c* to act as a background eddy current brake. However, a separate conductive background speed control track, as previously described, may also be used. As previously described, an electromagnetic drag force is created when the magnet glides over the conductive, non-ferromagnetic surface material functioning as a linear eddy current brake. The strength of the electromagnetic drag force is determined by the position, strength, shape, poles, and size of the magnet and these properties may readily be determined by one of skill.

Background magnets 660*a* and 660*b* may be square, rectangular, curved, arc shaped, or comprise any suitable shape in order to fit within trolley 620 and interact with the background speed control track. For smooth operation, background magnet 660*a* may be positioned symmetrically about trolley 620. The eddy current brake force retards the trolley's speed along guide rail 210 to a maximum walking speed. The linear eddy current brake, by its mechanism of action, reduces the trolley's top speed and does not stop or lock the trolley along the guide rail.

Figure 9A:
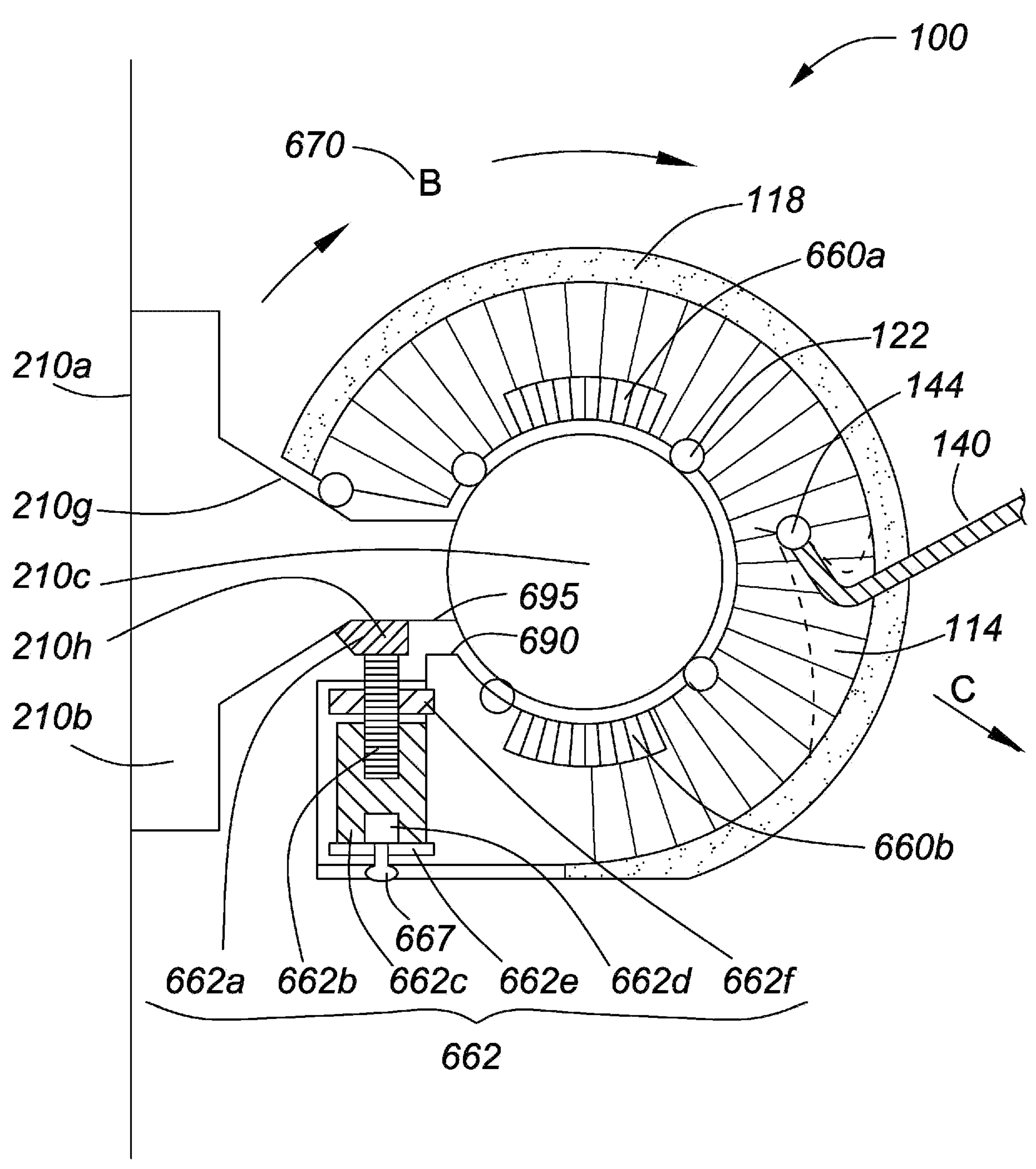
FIG. 9A shows a cross-sectional side view of another example of a fall control system as described herein in the travelling orientation.
Figure 10A:
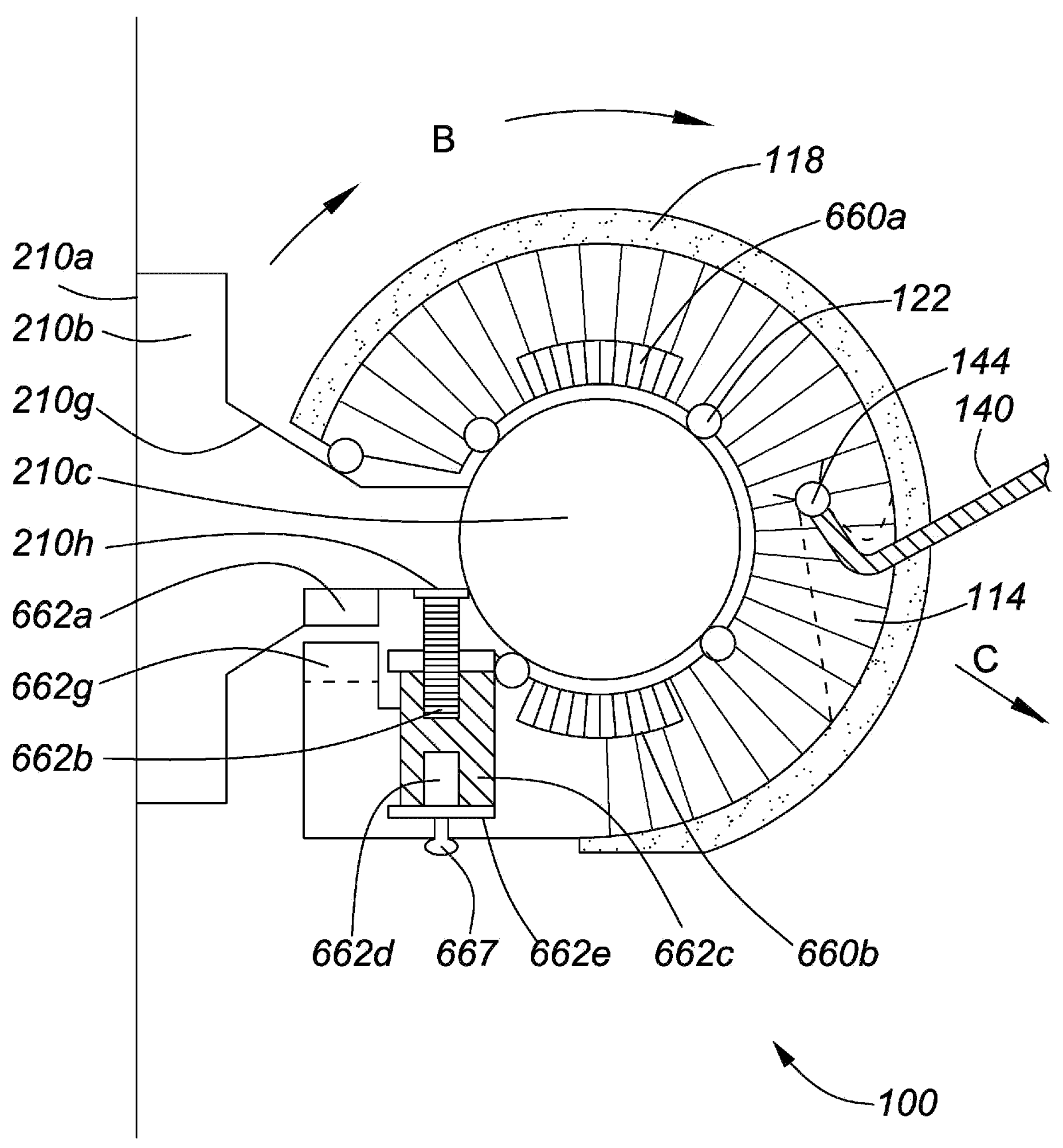
FIG. 10A shows a cross-sectional side view of another example of a fall control system as described herein in the travelling orientation.
Figure 11A:
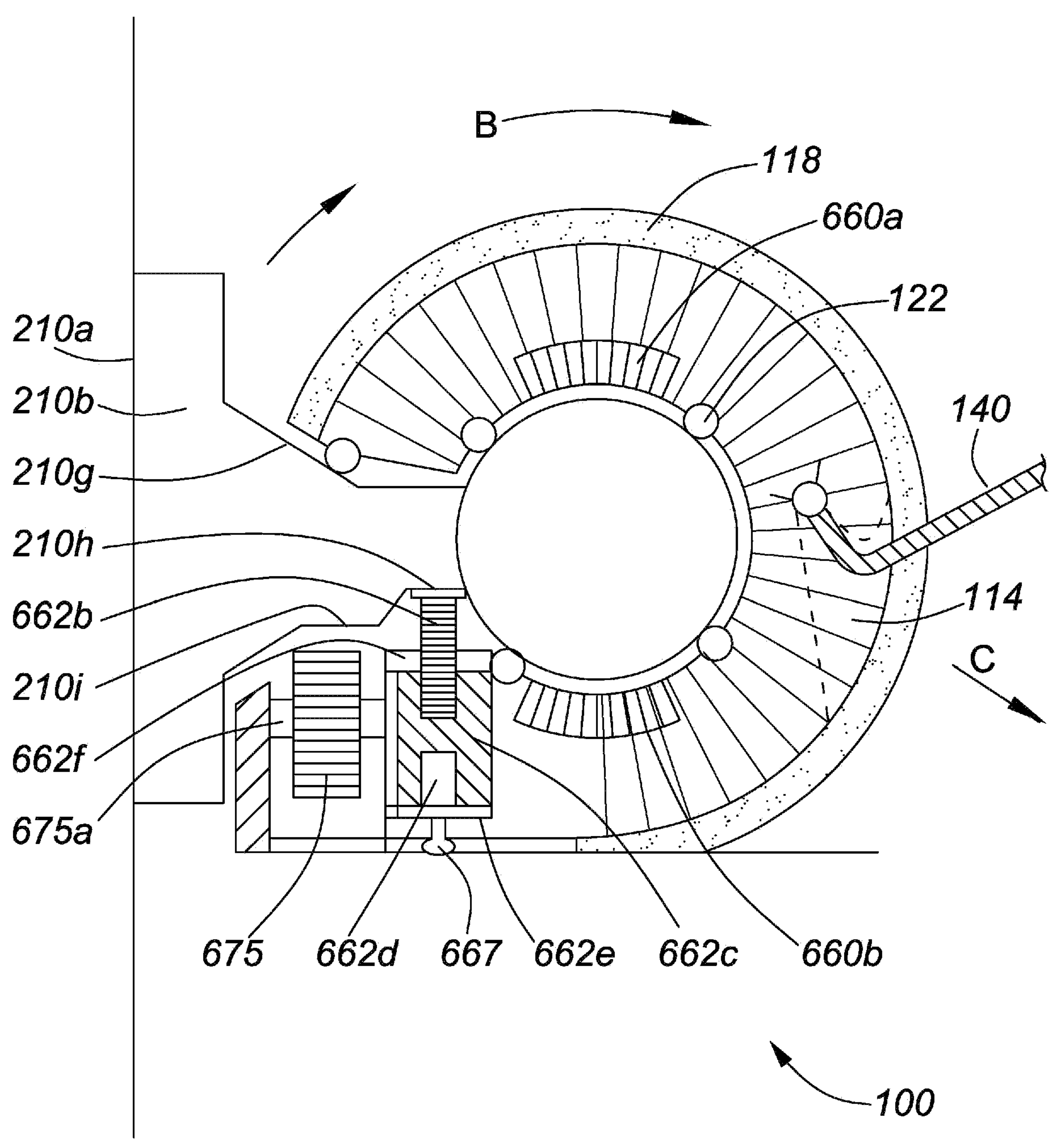
FIG. 11A shows a cross-sectional side view of another example of a fall control system as described herein in the travelling orientation.

The position of background magnet 660*a* may be adjusted by an adjustment plate and screw 665. Additional magnets for example 660*b*, may be used and positioned about circular guide shaft 120*c* as shown in FIGS. 9A, 10A and 11A. A similar adjustment mechanism 667 may be used to adjust position of magnet 660*b*. The position, or distance, of the one or more than one background magnet 660*a* (and/or 660*b*) from the outer curved surface of guide rail 210*d*, may be adjusted using an adjustment screw 665, or 667, or a similar device, to obtain the desired effect of the eddy current brake in controlling a first maximum speed of the movement of the trolley 620 along guide rail 210 that is less that the expected maximum fall velocity of the user in the event of a fall. For example which is not to be considered limiting, the first maximum speed may be of about 5, 6, 7, 8, 9, 10, 11, 12, 13, 14, 15, 16, 17, 18, 19, 20 inches/second, or from 0.5 to 5 km/hr, or any amount therebetween, for example, from about 0.5, 1.0, 1.5, 2.0, 2.5, 3, 0, 3, 5, 4.0, 4, 5, 5.0 km/hr, or any amount therebetween, in order to approximate the range in walking speeds of a person.

In a falling orientation or second position, trolley 620 rotates about circular guide shaft 210*c* and activates the speed retarding subsystem in order to slow movement of the trolley along guide rail to a second maximum for example, but not limited to 1, 2, 3, 4, 5, 6, 7, 8, 9, 10 inches/second, or any amount therebetween. In the example of FIG. 8B, as the trolley body rotates into a second position, one or more than one magnet 660*c* is brought in closer proximity to a conductive portion of guide rail 210 (the speed control track) thereby actuating the eddy current brake in order to slow trolley movement along the guide rail. The conductive portion of guide rail 210 may be located along the circular shaft 210*c* in a location adjacent magnet 660*c* when in the trolley 620 is in the second position, the conductive portion (e.g., comprising a non-ferromagnetic surface material) may be located on the lower guide rail shoulder 210*h*, 210*i*, or both 201*h* and 210*i*, or as described in earlier examples, a separate conductive speed control track may also be used. The location of magnet 660*c* in the second position may be adjusted using one or more than one adjustment mechanism 667 for example, a screw or similar device. The adjustment mechanism 667 may be attached to a plate 220*b* (see for example FIGS. 9A, 10B) so that position of one onset wheel 662*b*, or several onset wheels 662*b*, may be adjusted. The one or more adjusting mechanism 667 may be used to adjust the functionality of trolley 620 in accordance with the user's weight. For example, for a heavier user, plate 220*b* could be raised in order to increase the resistance applied by retainer 662*c* against onset wheel 662*b*, while for a lighter user, plate 220*b* may be lowered to decrease resistance of retainer 662*c*. For multiple users of the same trolley 620 an average setting may be employed. While the adjustment mechanism 667 is shown located at the base of the trolley body, it may be located in any convenient location. The adjustment mechanism 667 may comprise a dial-like device, and in some environments where frequent changes may be required, for example, in a physiotherapy clinic or hospital where patient weights may vary significantly, a larger, more prominent dial may be used.

In order to limit the extent of rotation of the trolley body 620*a* the outer surface of the guide rail may comprise one or more than one longitudinal ridges, or stops, 680 (FIG. 8D) that butt against roller elements 122 thereby restricting rotation or horizontal displacement of the trolley body. Rotation of the trolley body may also be limited by the trolley body pressing against lower guide rail shoulder 210*h*, 210*i*, 662*a* (FIGS. 9A, 10A, 11A) or a trolley body ridge 690 (surface of the trolley body) may butt against a lower abutment surface of the guide rail 695 (second surface of the speed control track) as shown in FIG. 9A, as described in alternative embodiments below. Ridges 680 may prevent the rolling elements 122, if used, from getting wedged against the cylindrical shaft 210*c* when the trolley body 620*a* is forcefully pulled perpendicular to the guide rail. (horizontally displaced), or forcefully pulled at an angle close to perpendicular during a fall. Ridges 680 may be smooth, as in some instances the cylindrical shaft 210*c* of guide rail 210 may be used as a handrail.

Figure 9B:
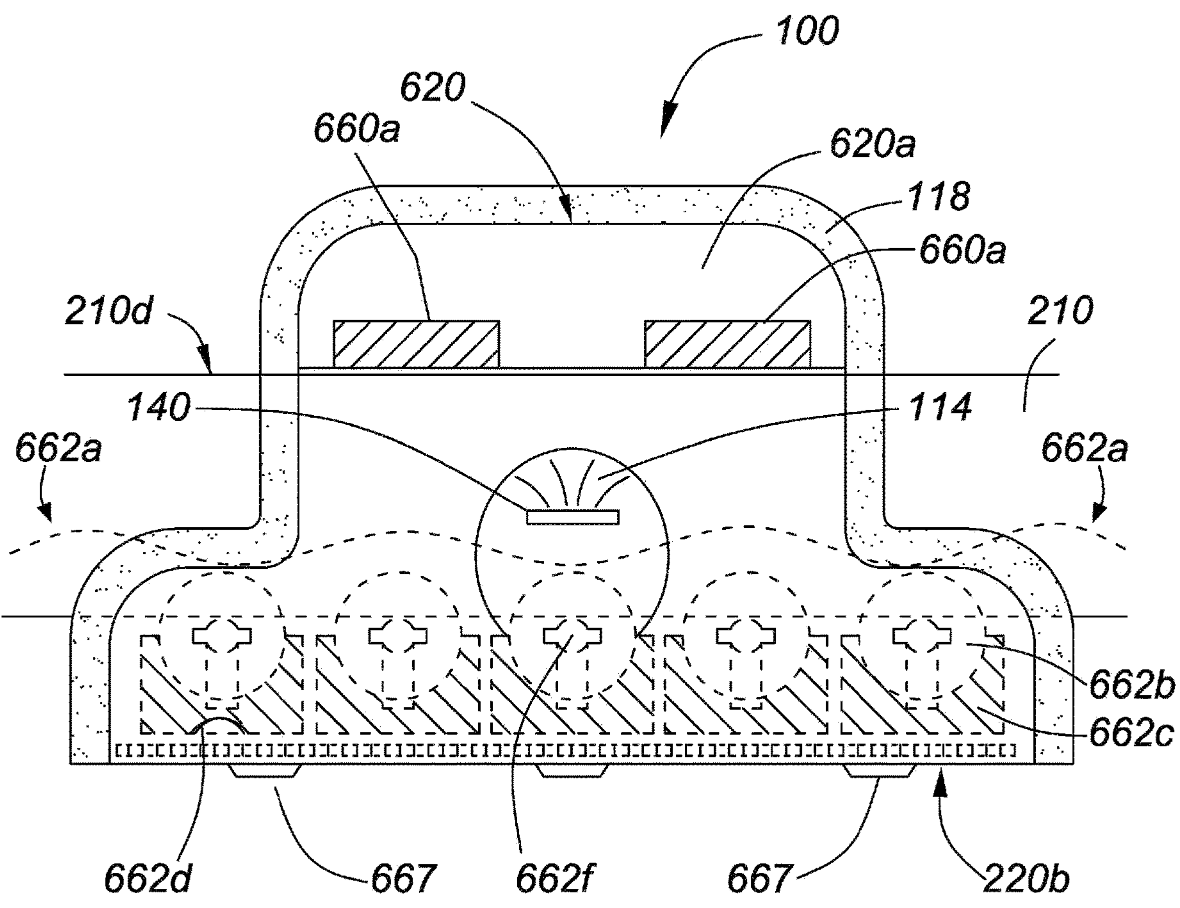
FIG. 9B shows a front view of the fall control system of FIG. 9A in which the speed control track 662*a* is a sinusoidal wave surface.
Figure 9C:
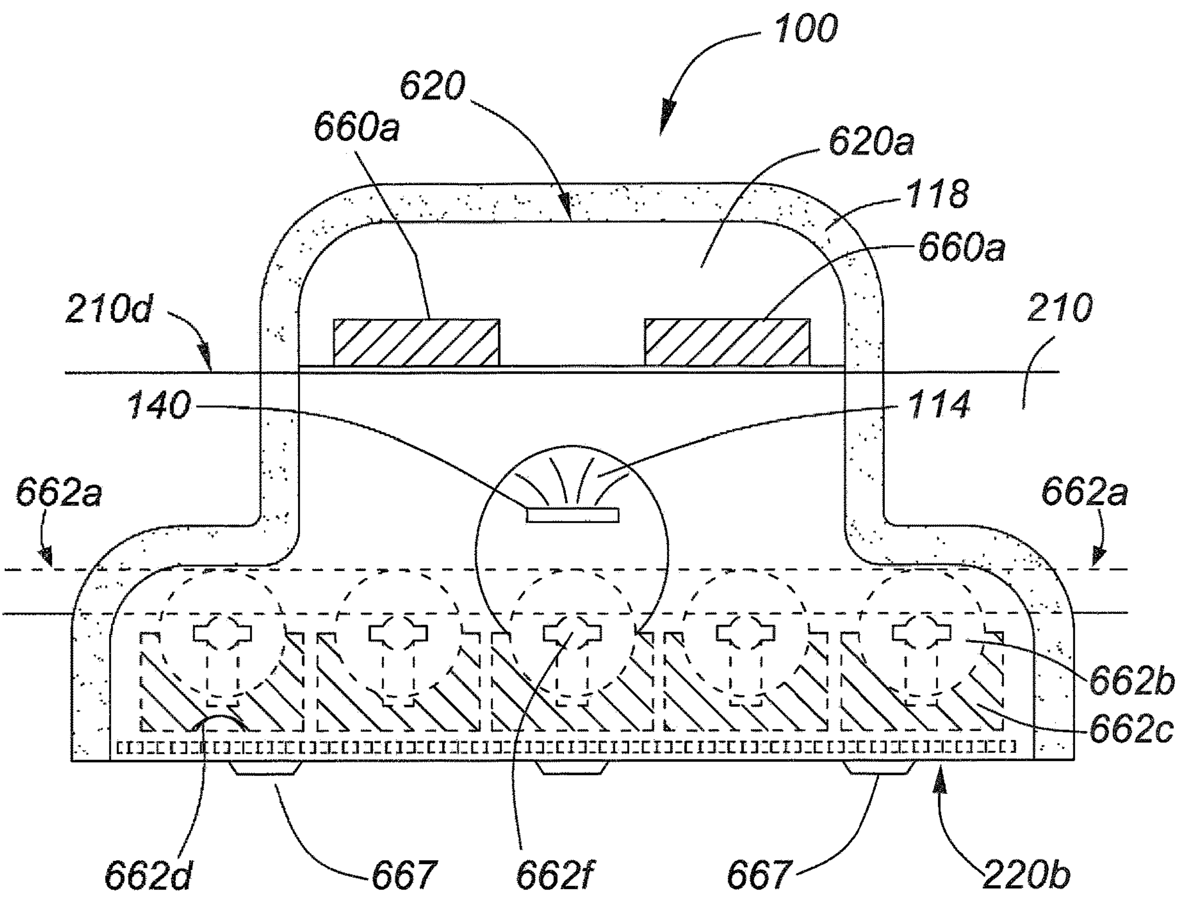
FIG. 9C shows a front view of the fall control system of FIG. 9A in which the speed control track 662*a* is a flat surface.

With reference to FIGS. 9A and 9B there is shown an alternate fall control system 100 comprising similar elements to those as previously described. The user is attached to trolley 620 via tether 140 at linkage 144. Trolley 620 moves along guide rail 210 in a first direction (travelling orientation) using, for example, one or more than one roller element 122. A background speed control system comprising a background eddy current brake comprising one or more than one background magnet 660*a*, 660*b* interacting with a conductive guide rail 210*c* (background speed control track), controls a first maximum speed of the trolley so that it is less that the expected maximum fall velocity of the user in the event of a fall. For example which is not to be considered limiting, the first maximum speed may be from about 5, 6, 7, 8, 9, 10, 11, 12, 13, 14, 15, 16, 17, 18, 19, 20 inches/second, or from 0.5 to 5 km/hr, or any amount therebetween, for example, from about 0.5, 1.0, 1.5, 2.0, 2.5, 3.0, 3.5, 4.0, 4.5, 5.0 km/hr, or any amount therebetween, in order to approximate the range in walking speeds of a person. The strength of the electromagnetic drag force is determined by the position, strength, shape, poles, and size of the magnet and these properties may readily be determined by one of skill. Background magnet 660*a*, 660*b* may be square, rectangular, curved, arc shaped, or comprise any suitable shape in order to fit within trolley 620 and interact with the speed control track. Background magnet 660*a*, 660*b* may be positioned symmetrically about trolley 620.

In this example, guide rail 210 is as previously described, comprises a body of the guide rail 210*b*, a circular shaft 210*c* with a curved outer surface 210*d*, mounting surface (or base) 210*a*, and an upper guide rail shoulder 210*g*. As shown in FIGS. 9A and 9B, the lower guide rail surface 210*h* further comprises an elongate undulating wave-like surface 662*a* with the surface of the undulating wave-like surface 662*a* (first surface of the speed control track), the wave-like surface comprising peaks and troughs relative to the lower guide rail surface 210*h*. The trolley body ridge 690 (surface of the trolley body) may butt against a lower abutment surface of the guide rail 695 (second surface of the speed control track) as shown in FIG. 9A. For example, which is not to be considered limiting, in side view, the undulating surface may describe a sine wave (a curve representing periodic oscillations of constant amplitude) as shown by the dotted line in FIG. 9B. The wave-like speed control track, 662*a*, may also be termed a sine curve speed control track. However, other wave forms or shapes of surface 662*a* may also be used provided that the wave-form is a smoothed wave form permitting onset wheel 662*b* of the trolley, when engaged with the surface of the speed control track 662*a*, to move along guide rail 210 so that trolley 620 does not come to an abrupt stop when the trolley is in the second position. The width of the speed control track 662*a* may approximate the width of onset wheel 662*b* as shown in FIG. 9A. Furthermore, the wave like surface 662*a* of the speed control track, the surface of onset wheel 662*b*, or both, may be angled so that when the trolley is rotated into the second position the onset wheel 662*b* and speed control track 662*a* optimally interfac.

When trolley 620 is in the first position and moves along guide rail 210 in a travelling orientation, one or more of onset wheel 662*b* may touch the "peaks" of the undulating wave-like surface 662*a*, for example as shown in FIG. 9B. However, in this configuration, onset wheel 662*b* does not impart any significant resistance in the travelling orientation and therefore does not participate in slowing movement of the trolley along the guide rail.

If the user falls and pulls the trolley body in the general direction of "C", the trolley body 620*a* rotates about circular guide shaft 210*c* in direction "B" into the second position, thereby engaging the speed retarding subsystem 662 (FIG. 9A). The trolley 620 comprises components as previously described for example with reference to FIGS. 5A and 8B however, the second speed control system 662 comprises a speed control track 662*a* with a wave-like surface that interacts with one or more than one onset wheel 662*b* of trolley 620 when the trolley is rotated about circular shaft 210*c* (in the second position, or a falling orientation). The undulating waves of the speed control track 662*a* are designed to act as "speed bumps" to retard forward or reverse movement of the one or more than one onset wheel 662*b*, thereby retarding movement of the trolley 620 along guide rail 210. In the examples shown in FIGS. 9A, 9B, 10A, 10B, 11A, 11B there may be 1, 2, 3, 4, 5, 6, 7, 8, 9, 10 or more onset wheels 662*b*, offset wheels 675, or deformable onset wheels, the number of wheels being selected to ensure effective speed reduction of trolley 620 along guide rail 210 when in the second position (falling orientation). Furthermore, the first surface of the speed control track 662*a*, the surface of the trolley body 690, and the second surface of the speed control track 695 may each be selected from a flat surface and a wave-like surface, as described herein.

Figure 11B:
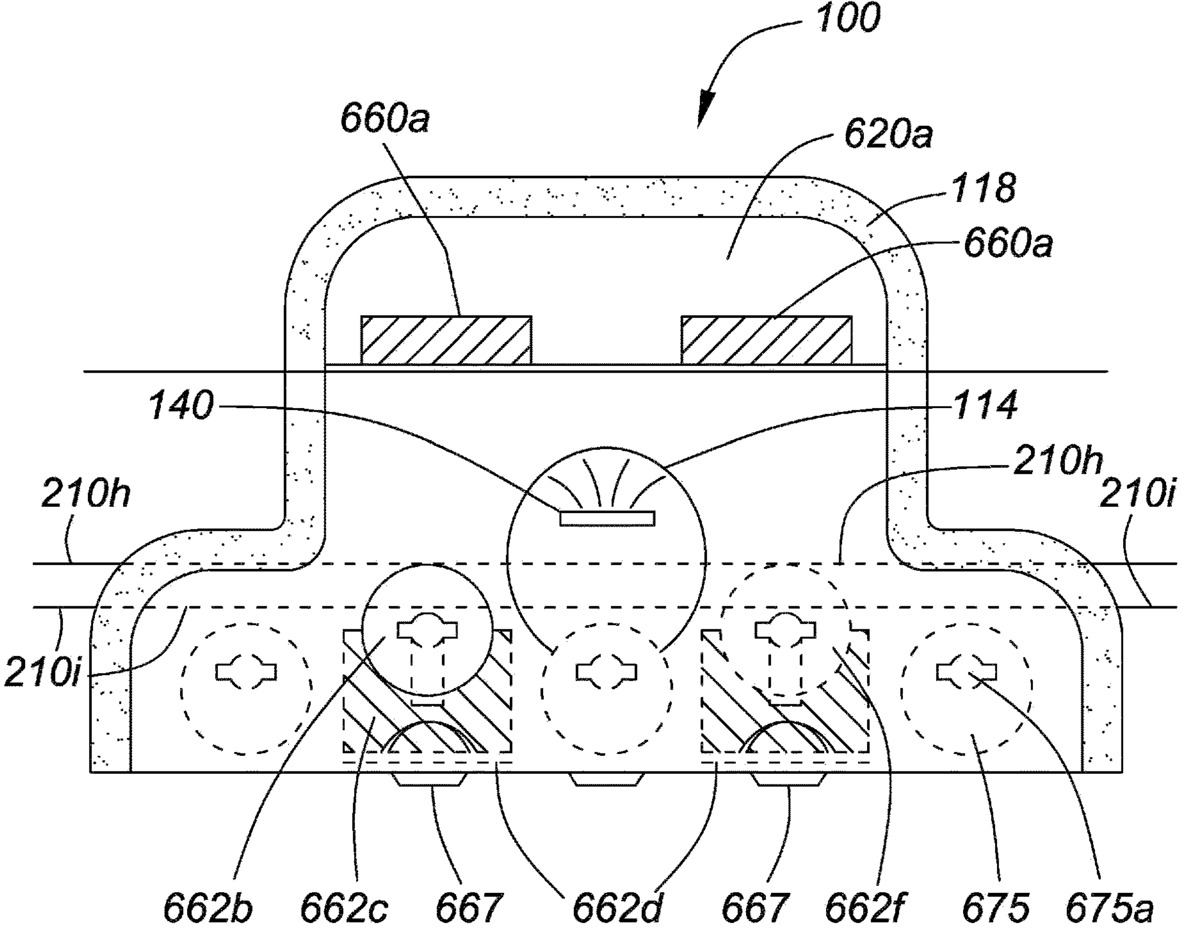
FIG. 11B shows a front view of the fall control system of FIG. 11A.
Figure 12A:
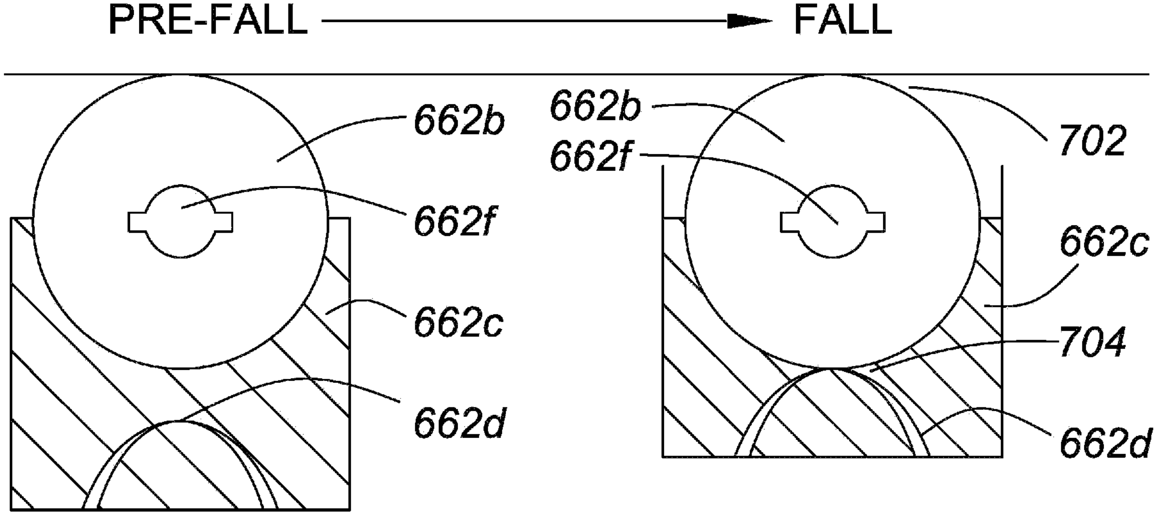
FIG. 12A shows a front detail view of the wheel assemble of the speed control system as described herein in a pre-fall, or an un-compressed state. In this view retainer 662*c* is separating the wheel (onset wheel) 662*b* from the leaf spring 662*d*.
Figure 12B:
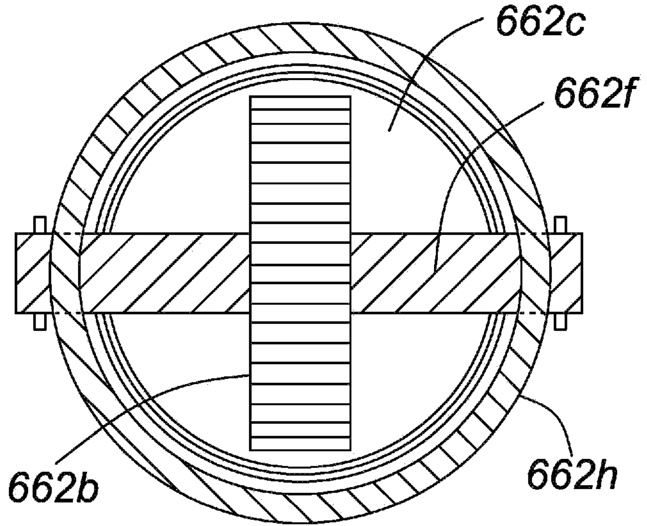
FIG. 12B shows a front detail view of the wheel assemble of the speed control system as described herein during a fall or in a compressed state. In this view retainer 662*c* is compressed and wheel (onset wheel) 662*b* is pressed against an upper contact point 702 of the guide rail, and a lower contact point 704 or the leaf spring 662*d*.
Figure 12C:
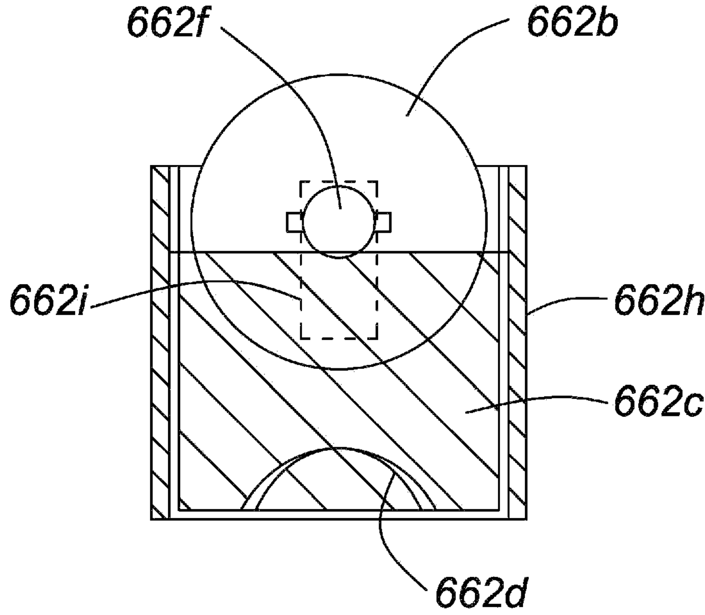
FIG. 12C shows a front detail view of the wheel assembly of the speed control system as described herein in a pre-fall, or an un compressed state.

Onset wheel 662*b* and axel 662*f* sit atop a retainer 662*c* which biases wheel 662*b* towards the lower guide rail surface 210*h* (also see FIG. 12A). Onset wheel 662*b* and retainer are placed within housing 662*h* (FIGS. 12B, 12C). Wheel 662*b* is able to move from the first position (or pre-fall position) as shown in FIG. 12A (left-hand panel) to a second position (compressed or fall position; FIG. 12A, right-hand panel). When onset wheel 662*b* moves to the second position, for example, when onset wheel 662*b* is pressed against lower guide rail surface 210*h*, at 702 (of the undulating wave-form surface of the speed control track 662*a*), retainer 662*c* is compressed so that axel 662*h* travels within slot 662*i*. When one or more than one onset wheel 662*b* engages the wave-like surface 662*a*, they impart a speed control effect to trolley 620 by pressing against the "peaks" the "troughs", or both the "troughs" and "peaks" of the wave-like surface of the speed control track 662*a*. The wheel should be of sufficient diameter so that when retainer 662*c* is fully compressed, the housing 662*h* does not contact the wave-form or level surface. In the second position, with the speed retarding subsystem engaged, trolley 620 may only migrate along guide rail 210 when the compression force of each of retainer 662*b* is overcome, thereby permitting the associated onset wheel 662*b* to move past a trough or peak of the sine curve speed control track 662*a*. The combined resistance of the background speed control system (background eddy current brake) and all of the retainers 662*c* housed within trolley 620 when in their most compressed state, and biasing onset wheel 662*b* presses against the lower guide rail surface 210*h*, 210*i*, the speed control track 662*a*, or a combination thereof (see FIGS. 9A, 9B, 10A, 10B, 11A, 11B), that is, the force required to compress all retainers 662*c* so that onset wheels 662*b* reach their respective positions on the lower guide rail surface or speed control track when the trolley is in the fall orientation, should be less than the force generated by the user when he or she falls so that the speed controller system may be properly activated. When engaged, the second speed control system slows movement of the trolley along guide rail to a second maximum for example, but not limited to 1, 2, 3, 4, 5, 6, 7, 8, 9, 10 inches/second, or any amount therebetween. In the second position, trolley 620 may or may not to come to a full stop. In the event it does come to a full stop, the braking mechanisms described herein should not limit the user (while still attached to the trolley) from moving (e.g., crawling) up or down the stairs, or across a level surface.

Also within housing 662*h* is a second retainer 662*d* that may interact with wheel 662*b*, at 704, when onset wheel 662*b* is in the second position. In this manner, onset wheel 662*b* may frictionally engage the second retainer 662*d*, at point 704, further slowing movement of trolley along the guide rail.

Second retainer 662*d* may be a flexible leaf spring, a U-shaped part with a radius the same or larger than the radius of onset wheel 662*b*, made of a resilient material. As the trolley 620 returns towards its travelling orientation or resting position, the second retainer 662*d* decompresses and returns to its pre-fall configuration, and onset wheel 662*b* is allowed to roll again freely. The amount by which the onset wheel 662*b* deforms the second retainer 662*d* to increase friction without totally locking the wheels can be readily determined. The top surface of the second retainer 662*d* can be metal, rubber, a sandblasted surface, or some other surface material to increase friction. In alternative embodiments (not shown) onset wheel 662*b* may be a deformable wheel, which may be used without retainers 662*c* and/or 662*d*. In this manner, when the trolley is in the falling orientation (second position), the deformable onset wheel is pushed against the speed control track and deforms resulting from the force applied by the user such that the radius of the onset wheel is reduced and deformed wheel acts as an offset wheel, thus frictionally engaging the speed control track and further slowing movement of trolley along the guide rail. The wheel, when deformed, also allows the trolley surface 690 to contact the guide rail surface 695 (speed control track), further slowing the trolley. As the trolley 620 returns towards its travelling orientation or resting position, the onset deformable wheel would decompress and return to its pre-fall configuration, and onset wheel is allowed to roll again freely. The deformable wheel may be made of a resilient material such as a polymeric material or a rubber material that can change its shape when a moderate pressure, from about 10 to about 500 lbs, or any amount therebetween (e.g., the weight of a falling human being) is applied to the material.

The placement of the onset wheel 662*b* and housing 662*h* within trolley 620 and relative to the undulating wave-form surface 662*a* may be adjusted using adjustment mechanism 667. In order to avoid hitting onset wheel 662*b* against surface 662*a* during a hard fall and potentially damaging the second speed control system, the trolley body 620*a* may comprise ridge 690 that buts against a lower abutment surface 695 of the guide rail when trolley is rotated in direction "B".

In the example of the fall control system 100 presented in FIGS. 9A, 9B, in the event of a fall, the trolley 620 rotates clockwise or counter-clockwise around the cylindrical shaft 210*c* and brings into contact one or more than one onset wheel 662*b* with the (sine curve) speed control track 662*a*; or offset wheel 675 (FIGS. 11A, 11B) with lower guide rail surface 210*i* and engaging the speed retarding subsystem, the trolley body 620*a* rotation results in a forceful point of contact between the wheels and the respective guide rail surface which causes significant friction, thereby helping to slow the trolley 620 along guide rail 210. The solid contact of wheel and/or guide rail surfaces coming together assists in keep the forces acting on the wheels constant, irrespective of the users weight. In the pre-fall state, one or more onset wheels 662*b* lightly contact or smoothly glide over the outer crests of the speed control track 662*a*. When the user falls, and the trolley rotates all the wheels make contact with the speed control track 662*a*. In the event that the user suffers a downward fall towards the stairs or level surface, the trolley body 620*a* rotates clockwise or counter clockwise on its long axis on the circular guide shaft 210*c*, pushing the spring loaded onset wheel(s) 662*b* further into the speed control track 662*a*, thereby engaging all the wheel(s) 622*b* into the speed control track 662*a*, significantly slowing down, but not completely stopping, the trolley 620. The amplitude of the sine curve (i.e., the height of the crest and troughs of the sine curve/wave) and the optimal frequency of oscillations (distance between troughs or crests) of the speed control track 662*a* can be determined by experimentation to optimize the functionality of the fall control device 100, so that the trolley is significantly slowed in the event of a fall, but does not become stuck, preventing the user, still attached to the trolley, from moving (e.g., crawling) up or down the stairs.

Figure 10B:
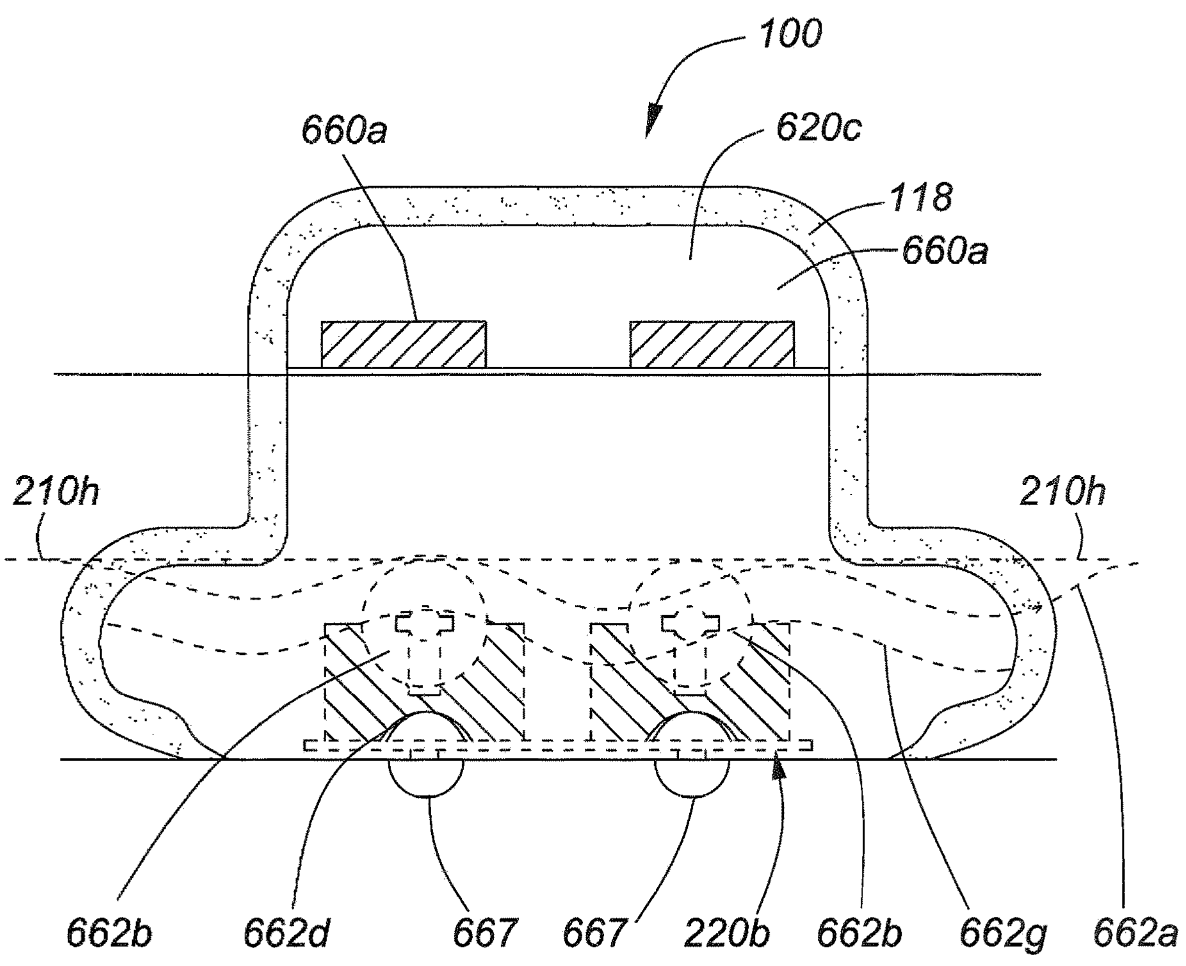
FIG. 10B shows a front view of the fall control system of FIG. 10A.

With reference to FIGS. 10A and 10B there is shown an alternate fall control system 100 comprising similar elements to those as previously described. The user is attached to trolley 620 via tether 140 at linkage 144. Trolley 620 moves along guide rail 210 in a first direction (travelling orientation), for example, using one or more than one roller element 122. A background speed control system comprising a background eddy current brake comprising one or more than one background magnet 660*a*, 660*b* interacting with a conductive guide rail (background speed control track, comprising for example a non-ferromagnetic surface material) 210*c*, or as described in earlier examples, a separate conductive background speed control track, controls a first maximum speed of the trolley is less that the expected maximum fall velocity of the user in the event of a fall. For example which is not to be considered limiting, the first maximum speed may be from about 5, 6, 7, 8, 9, 10, 11, 12, 13, 14, 15, 16, 17, 18, 19, 20 inches/second, or from 0.5 to 5 km/hr, or any amount therebetween, for example, from about 0.5, 1.0, 1, 5, 2.0, 2.5, 3.0, 3.5, 4.0, 4.5, 5.0 km/hr, or any amount therebetween, in order to approximate the range in walking speeds of a person. The strength of the electromagnetic drag force is determined by the position, strength, shape, poles, and size of the magnet and these properties may readily be determined by one of skill. For example, background magnet 660*a*, 660*b* may be square, rectangular, curved, arc shaped, or comprise any suitable shape in order to fit within trolley 620 and interact with the speed control track. Background magnet 660*a*, 660*b* may be positioned symmetrically about trolley 620.

Guide rail 210 is as previously described, comprising body of the guide rail 210*b*, circular shaft 210*c* with a curved outer surface 210*d*, mounting surface (or base) 210*a*, and an upper guide rail shoulder 210*g*. As shown in FIGS. 10A and 10B, the lower guide rail surface 210*h* comprises two portions, a first portion that comprises a flat surface (first surface of the speed control track) that is in contact with onset wheel 662*b* when trolley 620 is in the first (travelling orientation) or second (rotated) position, and a second portion comprising an elongate sine curve speed control track 662*a* comprising an undulating wave-like surface (second surface of the speed control track). The surface of the speed control track comprises peaks and troughs relative to the lower guide rail surface 210*h*. For example, which is not to be considered limiting, in side view, the wave-like surface of the speed control track may describe a sine wave as shown by the dotted line 662*a* in FIG. 10B. However, other wave forms or shapes of the surface of speed control track 662*a* may also be used provided that the wave-form is a smoothed wave form permitting a corresponding trolley wave-like surface 662*g* of trolley 620, when engaged with the speed control track 622*a*, to move along guide rail 210 so that trolley 620 does not come to an abrupt stop when the trolley is in the second position. A flat surface on the body of the trolley may also be used to engage the wave-like surface of the speed control track. Preferably, if a flat surface of the trolley body is used, then the flat surface is of a size that engages and continuously presses against the wave-like surface and does not glide over the peaks of the wave-like surface (i.e., a surface shorter the peaks or the troughs). The width of the each of the first and second (speed control track 662*a*) portion of the lower guide rail surface 210*h* may approximate the width of onset wheel 662*b* and the width of trolley wave-like surface 662*g* (as shown in FIG. 10A). Friction is the primary mechanism responsible for slowing the trolley when the trolley wave like surface 662*g* comes into contact with the guide rail 662*a*.

As described with reference to FIGS. 9A and 9B, onset wheel 662*b* and axel 662*f* sit atop retainer 662*c* which biases onset wheel 662*b* toward the lower guide rail surface 210*h* as shown in FIGS. 10B and 12A. Wheel 662*b* and retainer are placed within housing 662*h* (FIGS. 12B, 12C). Onset wheel 662*b* is able to move from the first position (or pre-fall position) as shown in FIG. 12A (left-hand panel) to a second position (compressed or fall position; FIG. 12A, right-hand panel), with axel 662*h* traveling within slot 662*i*. Second retainer 662*d* may interact with onset wheel 662*b*, at 704, when wheel 662*b* is in the second position, so that onset wheel 662*b* may frictionally engage the second retainer 662*d*, at point 704, further slowing movement of trolley along the guide rail. The placement of the onset wheel 662*b* and housing 662*h* within trolley 620 and relative to the lower guide rail surface 210*h* may be adjusted using adjustment mechanism 667.

When trolley 620 is in the first position and moves along guide rail 210 in a travelling orientation as shown in FIG. 10B, onset wheels 662*b* are in contact with lower guide rail surface 210*h*, while the trolley wave-like surface 662*g* does not contact the “peaks” of the undulating wave-like form surface 662*a*. In this configuration, onset wheel 662*b*, and trolley wave-like surface 662*g* do not impart any significant resistance and they do not participate in slowing movement of the trolley along the guide rail.

If the user falls and pulls the trolley body in the general direction of “C”, the trolley body 620*a* rotates about circular guide shaft 210*c* in direction “B” into the second position, and activates the speed retarding subsystem comprising trolley wave-like surface 662*g* that engages the wave-like surface of the speed control track 662*a*. Furthermore, if trolley body 620*a* is fully rotated during a fall, and onset wheel 662*b* is pressed against lower guide rail surface 210*h* so that retainer 662*c* is fully compressed (and/or so the onset wheel is deformed, if a deformable wheel is used), onset wheel 662*b* may engage surface 662*d* at point 704 (see FIG. 12A, right hand side) further slowing the movement of trolley 620 along guide rail 210 and in this configuration, functioning as part of the speed retarding subsystem. The combined resistance of the background speed control system (background eddy current brake) and all of the retainers 662*c*, if used, housed within trolley 620 when in their most compressed state and biasing onset wheel 662*b* against the lower guide rail surface 210*h*, 210*i*, the (sine curve) speed control track 662*a*, or a combination thereof (see FIGS. 9A, 9B, 10A, 10B, 11A, 11B), that is, the force required to compress all retainers 662*c* or deform onset wheels 662*b* so that onset wheels 662*b* reach their respective positions on the lower guide rail surface or speed control track when the trolley is in the fall orientation, should be less than the force generated by the user when he or she falls so that the speed controller system may be properly activated. When engaged, the speed retarding subsystem slows movement of the trolley along guide rail to a second maximum for example, but not limited to 1, 2, 3, 4, 5, 6, 7, 8, 9, 10 inches/second, or any amount therebetween. In the second position trolley 620 may or may not to come to a full stop. In the event trolley 620 does come to a full stop, the speed control system described herein should not limit the user (while still attached to the trolley) from moving (e.g., crawling) up or down the stairs, or across a level surface.

In the fall control system 100 just described (with reference to FIGS. 10A and 10B), in the event of a fall, the trolley 620 rotates around the circular or cylindrical shaft 210*c* towards the user, bringing into contact the trolley wave-like surface 662*g* on the trolley 662*g* with the corresponding (sine curve) speed control track 662*a* on the guide rail 210. The friction created by the two surfaces rubbing against each other helps to slow down movement of the trolley 620 along guide rail 210. The solid points of contact resulting from the fall orientation of the trolley would keep any frictional forces constant, irrespective of the user's weight. The material of the trolley wave-like surface 662*g* and the (sine curve) speed track 662*a* can be the same material, or different materials. One or both surfaces can be, for example, a smooth metal, or to increase the friction, one or both surfaces can be a hard rubber, a polymeric material, or a material, for example a metal, a rubber or a polymeric material, that is sandblasted to increase friction. Alternatively, a replaceable brake pad (analogous to a car brake pad) can be used on one or both surfaces, with the surfaces being wave-like or flat. Examples of brake pad materials may include, but are not limited, to non-metallic materials (e.g., comprising a combination of various synthetic substances bonded into a composite, principally in the form of cellulose, aramid, polyacrylonitrile (PAN), and/or sintered glass), semi-metallic materials (e.g., comprising synthetic materials mixed with flaked metals), and/or ceramic materials (e.g., comprising clay and porcelain bonded to copper flakes and filaments) combined with an appropriate binding agent, for example, phenol formaldehyde resin, and optionally a friction material, such as graphite or zirconium silicate. This may be advantageous in a commercial setting (i.e., physiotherapy gym) where the speed control system may be activated several times a day, resulting in one or more braking surfaces needing to be replaced.

An alternate fall control system 100 is provided with reference to FIGS. 11A and 11B. This fall control system comprises similar elements to those as previously described, with the user attached to trolley 620 via tether 140 at linkage 144, and trolley 620 moving along guide rail 210 in a first direction (travelling orientation), for example, using one or more than one roller element 122. The fall control system 100 comprises a background speed control system comprising a background eddy current brake comprising one or more than one background magnet 660*a*, 660*b* interacting with a conductive portion (e.g., a non-ferromagnetic surface material) of guide rail 210*c* (background speed control track), or as described in earlier examples, a separate conductive background speed control track, to control a first maximum speed of the trolley is less that the expected maximum fall velocity of the user in the event of a fall. For example which is not to be considered limiting, the first maximum speed may be of about 5, 6, 7, 8, 9, 10, 11, 12, 13, 14, 15, 16, 17, 18, 19, 20 inches/second, or from 0.5 to 5 km/hr, or any amount therebetween, for example, from about 0.5, 1.0, 1.5, 2.0, 2.5, 3, 0, 3.5, 4.0, 4.5, 5.0 km/hr, or any amount therebetween, in order to approximate the range in walking speeds of a person. The strength of the electromagnetic drag force is determined by the position, strength, shape, poles, and size of the magnet and these properties may readily be determined by one of skill. For example, background magnet 660*a*, 660*b* may be square, rectangular, curved, arc shaped, or comprise any suitable shape in order to fit within trolley 620 and interact with the speed control track. Background magnet 660*a*, 660*b* may be positioned symmetrically about trolley 620.

Guide rail 210 is as previously described, comprising body of the guide rail 210*b*, circular shaft 210*c* with a curved outer surface 210*d*, mounting surface (or base) 210*a*, and an upper guide rail shoulder 210*g*. As shown in FIGS. 11A and 11B, the lower guide rail surface 210*h* may comprises two surfaces, a first surface 210*h* that comprises a flat surface that is in contact with onset wheel 662*b* when trolley 620 is in the first (travelling orientation), and second (fall orientation; trolley rotated) position, where a second surface comprising a second flat surface 210*i*, analogous to a speed control track, and engages offset wheel 675 (see FIG. 11B). Offset wheel 675 is offset with respect to axel 675*a* so that when wheel 675 rotates about axel 675*a*, an outer surface of the wheel circumscribes an eccentric path, and when engaged with the speed control track collectively function as a speed retarding subsystem. When offset wheel 675 engages with second offset surface 210*i*, movement of trolley 620 is reduced since rotation of wheel about axel 675*a* requires additional effort in order to roll along the speed control track 210*i*. When offset wheel 675 is in contact with the speed control track 210*i*, the trolley 620 does not come to an abrupt stop.

As described with reference to FIGS. 9A, 9B, 10A, and 10B, onset wheel 662*b* and axel 662*f* sit atop retainer 662*c*, which biases wheel 662*b* toward the lower guide rail surface 210*h* as shown in FIGS. 11B and 12A and/or onset wheel 662*b* may be deformable. Onset wheel 662*b* move from the first position (or pre-fall position) as shown in FIG. 12A (left-hand panel) to a second position (compressed or fall position; FIG. 12A, right-hand panel), and in doing so, second retainer 662*d*, if used may interact with, and frictionally engage, wheel 662*b*, at 704, and/or the deformable wheel 662*b* if used is deformed, further slowing movement of trolley 620 along the guide rail. The placement of the onset wheel 662*b* and housing 662*h* within trolley 620 and relative to the lower guide rail surface 210*h* may be adjusted using adjustment mechanism 667.

When trolley 620 is in the first position and moves along guide rail 210 in a travelling orientation as shown in FIG. 11B, onset wheels 662*b* are in contact with lower guide rail surface 210*h*, while the offset wheels 675 do not contact the speed control track 210*i*. In this configuration, offset wheel 675, and speed control track 210*i*, do not participate in slowing movement of the trolley along the guide rail, and retainer 662*c*, if used, acting on onset wheel 662*b* helps maintains the trolley in the travelling orientation.

If the user falls and pulls the trolley body in the general direction of "C", the trolley body 620*a* rotates about circular guide shaft 210*c* in direction "B" into the second position, and activates the speed retarding subsystem system comprising offset wheel 675 engaging speed control track 210*i*. Furthermore, if trolley body 620*a* is fully rotated during a fall, and onset wheel 662*b* is pressed against lower guide rail surfaced 210*h* so that retainer 662*c* is fully compressed (and/or onset wheel 662*b* is deformed), and onset wheel 662*b* may engage surface 662*d* at point 704 (see FIG. 12A, right hand side) further slowing the movement of trolley 620 along guide rail 210. In this configuration, onset wheel 662*b* is functioning as part of the speed retarding subsystem. The combined resistance of the background speed control system (background eddy current brake) and all of the retainers 662*c* housed within trolley 620 when in their most compressed state and biasing onset wheel 662*b* against the lower guide rail surface 210*h*, speed control track 210*i*, 662*a*, or a combination thereof (see FIGS. 9A, 9B, 10A, 10, 11A, 11B), that is, the force required to compress all retainers 662*c* and/or deform all wheels 662*b*, so that onset wheels 662*b* reach their respective positions on the lower guide rail surface or speed control track when the trolley is in the fall orientation, should be less than the force generated by the user when he or she falls so that the speed retarding subsystem may be properly activated. When engaged, the speed retarding system slows movement of the trolley along guide rail to a second maximum for example, but not limited to 1, 2, 3, 4, 5, 6, 7, 8, 9, 10 inches/second, or any amount therebetween. In the second position, trolley 620 may or may not to come to a full stop. In the event it does come to a full stop, the speed control system described herein should not limit the user (while still attached to the trolley) from moving (e.g., crawling) up or down the stairs, or across a level surface.

The offset wheels (off center of rotation wheels) 675 act in an analogous manner as the "speed bumps" of speed control track 662*a*, with the friction of the two surfaces (wheel 675 and speed control track 210*i*), when in contact, slowing down movement of trolley 620 along guide rail 210, without causing the trolley to lock up completely. Also contemplated is the use of offset wheels 675 comprising a gear (spline) that connect the one or more of the offset wheels 675 with one or more onset center of rotation (regular) guide wheels that comprise a mating gear/spline (not shown). In this variation, both sets of wheels would rotate in opposite directions, so that when engaged when trolley 620 is in a fall orientation, the offset wheels 675 would lock with the guide wheels and prevent any significant rotation of any of the wheels until the user stood back up. The user standing back up would relieve pressure from the retainer 662*c* (compression springs) under each of the guide wheels (as described with reference to FIGS. 12A to 12C). Alternatively, a third gear wheel (between the two gear wheels just described) may be added which would result in both the offset center wheels 675 and the on-center of rotation wheels travelling in the same direction in the event of a fall, but the on center of rotation wheels would be significantly slowed due to the slower speed of the offset center of rotation wheels, resulting from their offset center of rotation.

In the fall control systems described above with reference to FIGS. 8A to 8D, 9A, 9B, 10A, 10B, 11A, 11B, and 12A to 12C, the speed retarding subsystem may comprise any combination of onset wheel(s) 662*b*, with or without retainers 662*c*, offset wheels 675, and speed control tracks 662*a* and 662*g*, in order to optimize functionality of the fall control system 100. Furthermore, where the trolley 620 comprises one or more than one onset wheel 662*b* that is biased by retainer 662*c*, the retainer 662*c* may be a resilient material for example, a resilient rubber material, a polymeric material, a metal spring, a polymeric spring, for example the retainer may be a compression spring that is round, oval, rectangular or other shape. The ends of the springs may have any suitable configuration for example a closed, square, or double closed end. The retainer may also comprise a resilient, compressible, rubber tube that when compressed permits onset wheel 662*b* to interface with second retainer 662*d*.

In the event of a fall, when the person is resting on the stairs or level surface, the downward force on the tether connecting the user to the trolley is significantly decreased in comparison to the forces through the tether during a fall; with less compression of the springs under the wheel(s), the trolley is allowed to rotate back fully or partially to its initial resting position, releasing pressure between the areas of friction between the trolley and external surface (or between the wheel(s) and the external speed control track), allowing the trolley to move more freely on the circular rail, moving with the user as he or she moves (e.g., crawls) up or down the stairs.

Figure 13A:
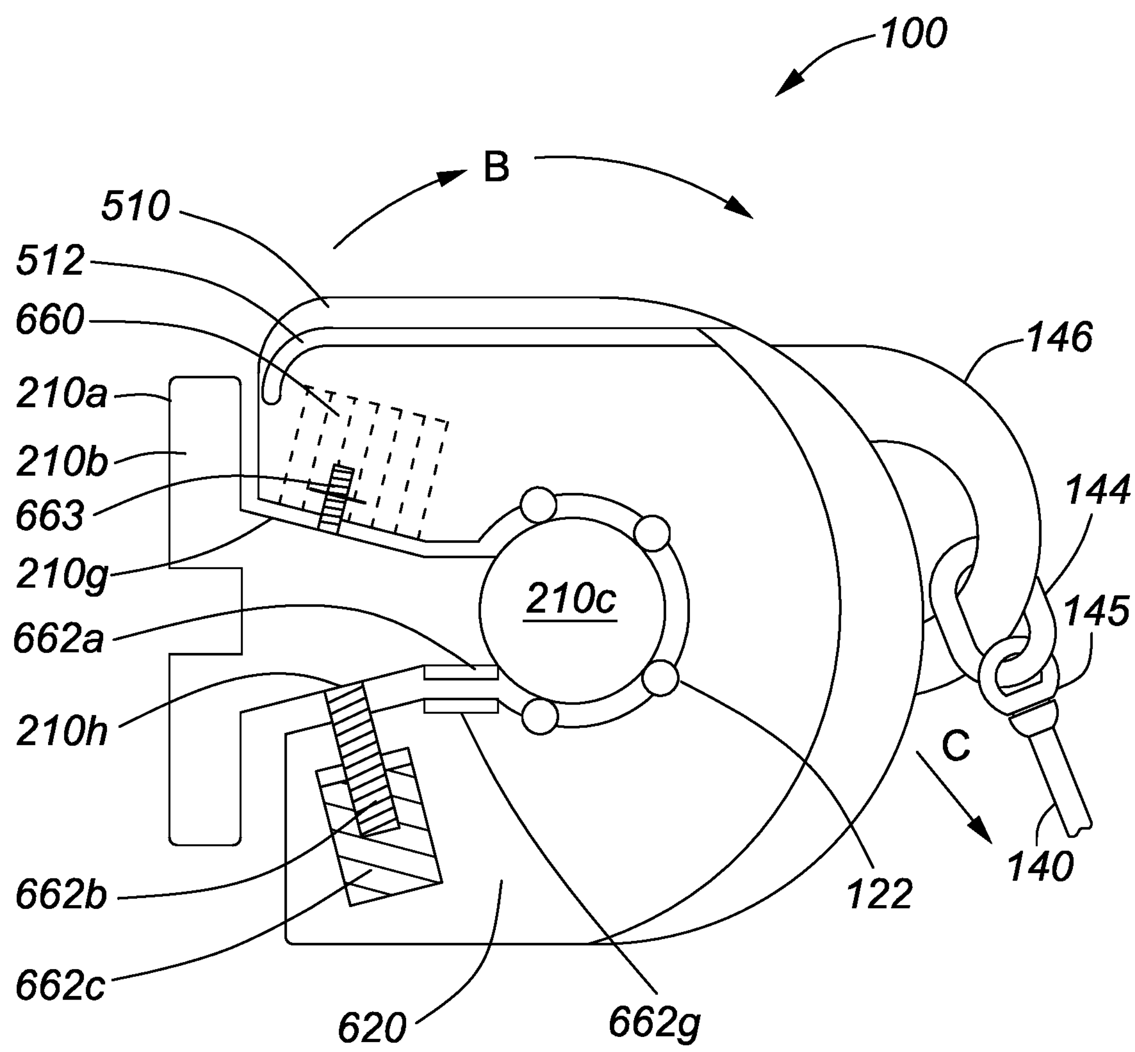
FIG. 13A shows a cross-sectional side view of another example of a fall control system as described herein in the travelling orientation, with background magnets 660 interacting with the upper guide rail shoulder 210*g* as viewed from line A-A in FIG. 13B.
Figure 13B:
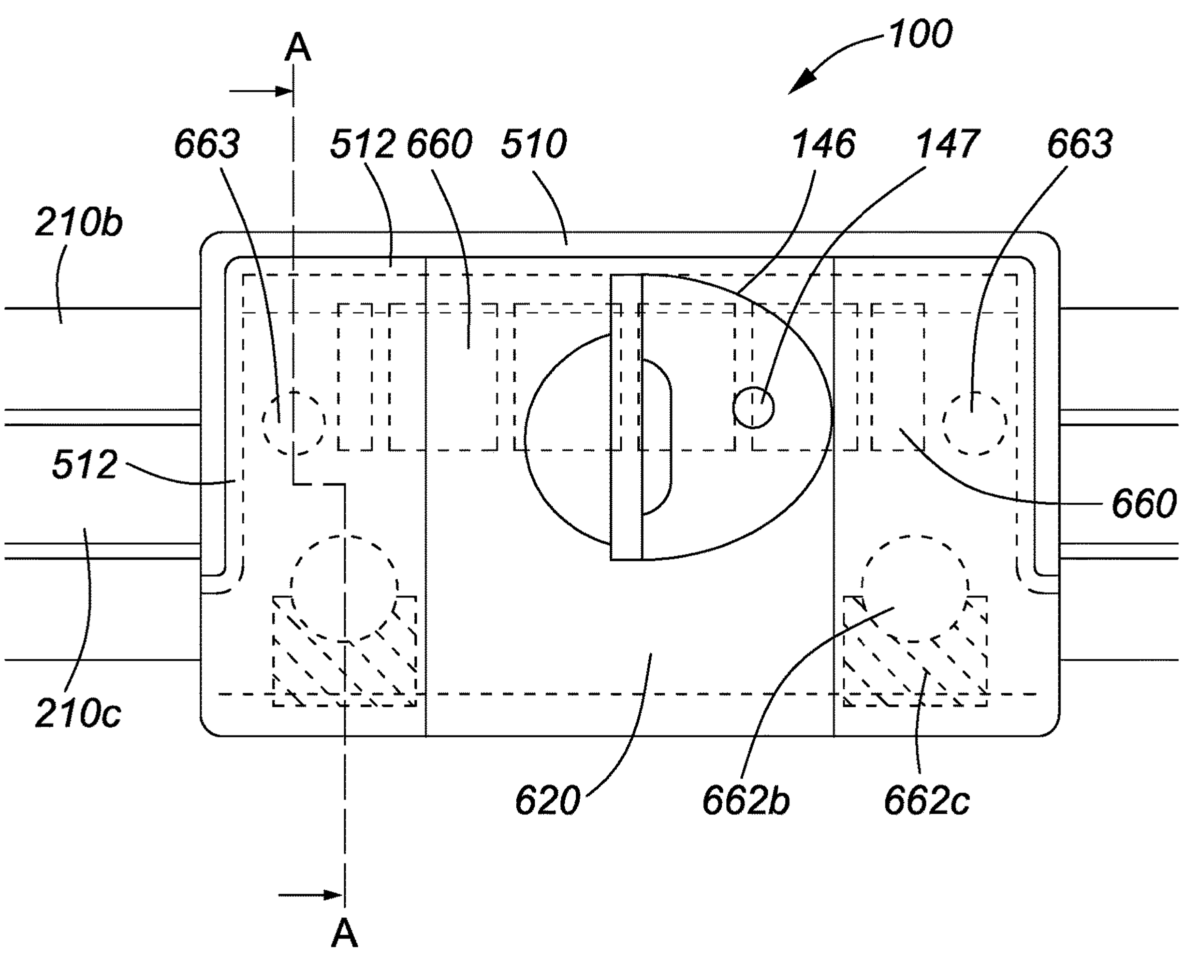
FIG. 13B shows a front view of the fall control system of FIG. 13A.
Figure 13C:
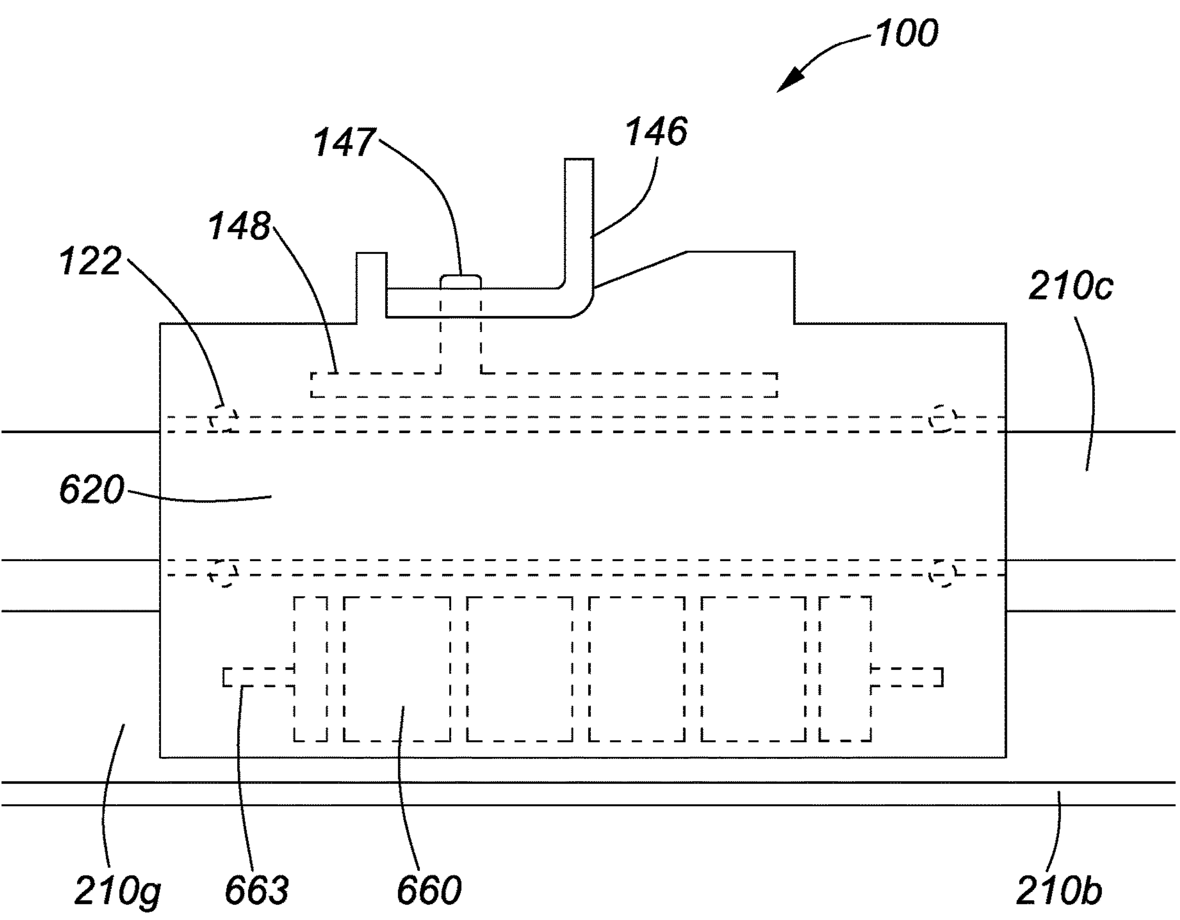
FIG. 13C shows a top view of the fall control system of FIG. 13A.

With reference to FIGS. 13A to 13C there is shown an alternate fall control system 100 comprising similar elements to those as previously described. Trolley 620 moves along guide rail 210*c* in a first direction (travelling orientation) using, for example, one or more than one roller element 122 positioned between the trolley 620 and the guide rail shaft 210*c*. A background speed control system comprising one or more than one background magnet 660 for interacting with the conductive upper guide rail shoulder 210*g* (background speed control track) to form an eddy-current brake, controls a first maximum speed of the trolley so that it is less that the expected maximum fall velocity of the user in the event of a fall. The strength of the electromagnetic drag force is determined by the position, strength, shape, poles, and size of the magnet and these properties may readily be determined by one of skill. The one or more background magnets 660 may be square, rectangular, curved, arc shaped, or comprise any suitable shape in order to fit within trolley 620 and interact with the upper shoulder of the guide rail 210*g* (background speed control track).

Figure 14A:
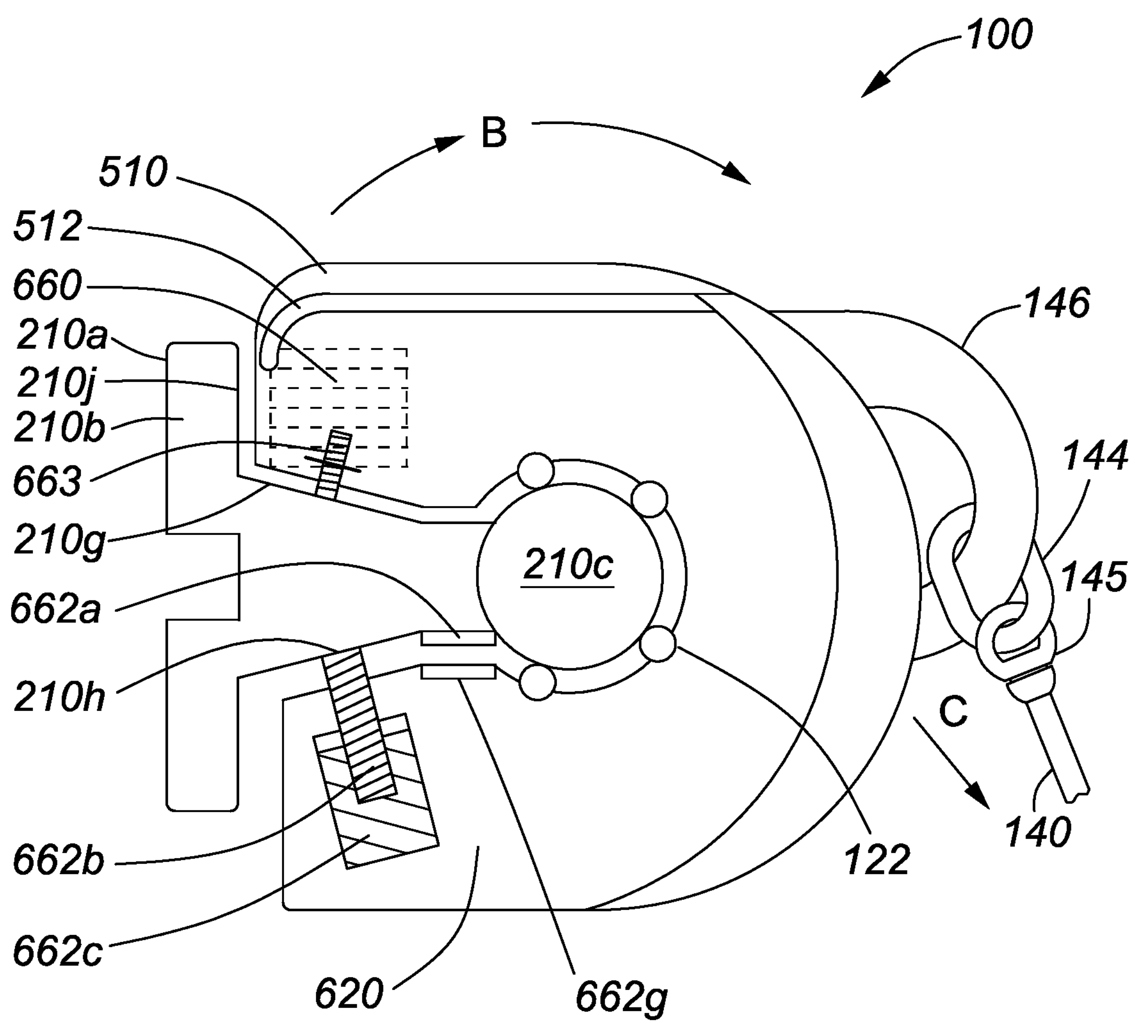
FIG. 14A shows a cross-sectional side view of another example of a fall control system as described herein in the travelling orientation similar to FIG. 13A except with background magnets 660 interacting with the upper guide rail side 210*j*.
Figure 14B:
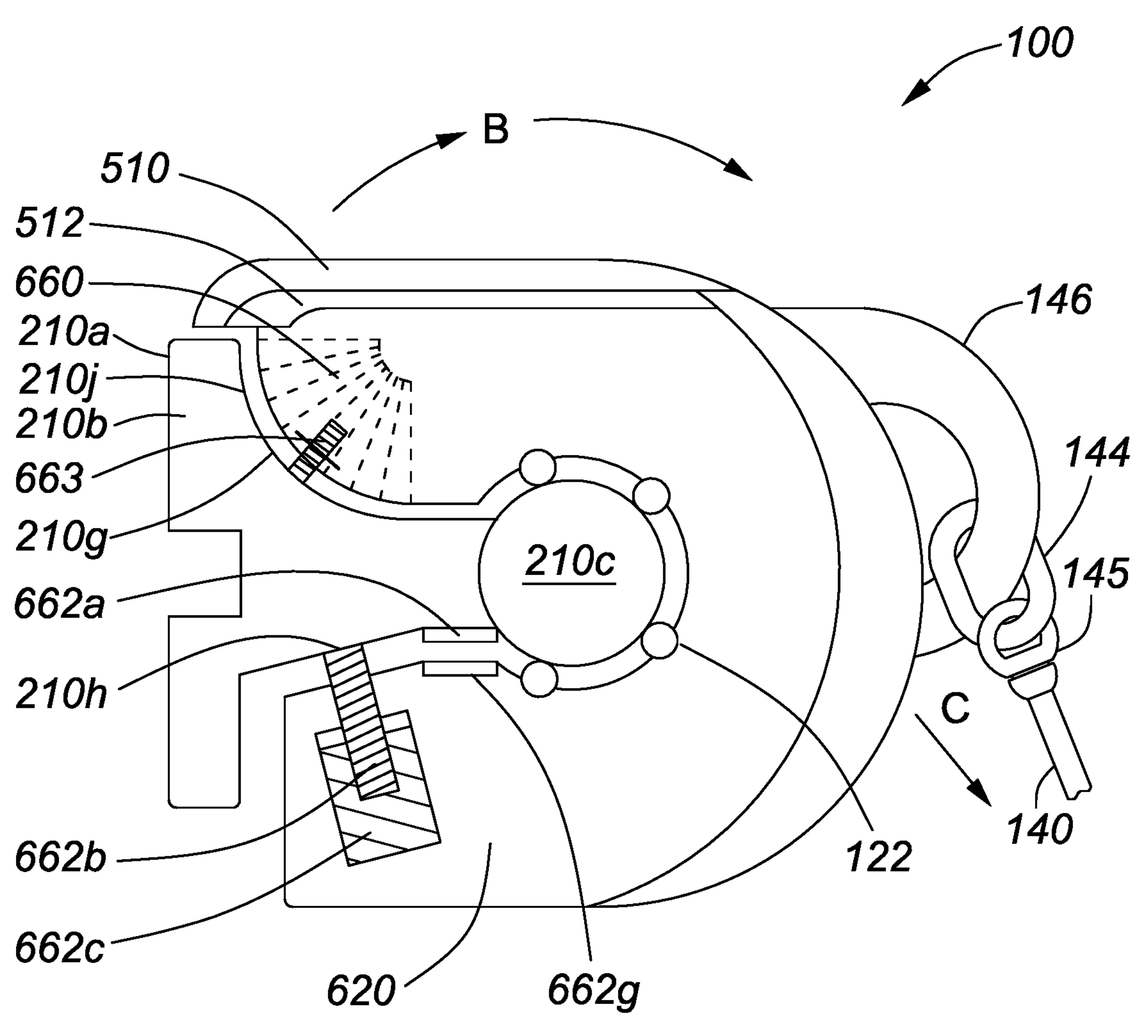
FIG. 14B shows a cross-sectional side view of another fall control system as described herein similar to FIGS. 13A and 14A, except with background magnets 660 interacting with both the upper guide rail shoulder 210*g* and guide rail side 210*j*.

FIGS. 14A and 14B show alternate fall control systems similar to the embodiment shown in FIGS. 13A-13C, except in FIG. 14A the one or more than one background magnets 660 are positioned to interact with a conductive side portion of the guide rail 210*j*. In FIG. 14B, the upper guide rail shoulder 210*g* and guide rail side 210*j* are combined and form an arc or concave surface and the one or more than one (arc-shaped) background magnets 660 are positioned to interact with both the upper shoulder 210*g* and side of 210*j* of the guide rail, which are both conductive. Alternative shapes for the upper guide rail shoulder 210*g* and side 210*j* and corresponding background magnet(s) are envisaged. For example, the upper guide rail shoulder 210*g* and side 210*j* may be convex and the background magnet(s) may be concave. Alternatively, background magnet(s) may have any suitable shape (profile) to conform to the conductive surfaces of both the upper guide rail shoulder 210*g* and upper guide rail side 210*j*. Alternatively, the guide rail surfaces 210*g* and 210*j* and background magnets may be of any shape (profile) to interact and function as a background speed controller.

In the embodiments shown in FIGS. 13A-13C and 14A-14B, the guide rail 210 is as previously described and comprises a body of the guide rail 210*b*, a circular shaft 210*c* with a curved outer surface 210*d* (e.g., see FIG. 8A), mounting surface (or base) 210*a*, an upper guide rail shoulder 210*g* and guide rails side 210*j*. As shown in FIGS. 13A, 14A and 14B, the lower guide rail shoulder comprises a first speed control track 210*h* and a second speed control track 662*a*. As discussed in previous embodiments, the first 210*h* and second 662*a* speed control tracks may be flat or may comprise a wave-like surface. For example, which is not to be considered limiting, in front view (e.g., see FIG. 10B), the wave-like surface may describe a sine wave (a curve representing periodic oscillations of constant amplitude). The wave-like speed control tracks, 210*h*, 662*a*, may also be termed a sine curve speed control track. However, other wave forms or shapes of surface 210*h*, 662*a* may also be used.

The wheel 662*b* of the trolley may be an onset wheel, a deformable onset wheel, or an offset wheel for interacting with the flat or wave-like surface of the first speed control track 210*h*. The trolley body surface 662*g* may comprise a flat or wave-like surface for interacting with the flat or wave-like surface of the second speed control track 662*a*. The width of the first speed control track 210*h* may approximate the width of wheel 662*b*, and the width of the second speed control track 662*a* may approximate the width of the trolley surface 662*g*, as shown in FIG. 13A. Furthermore, the flat or wave like surface 210*h* of the speed control track and the surface of wheel 662*b*, may be orientated relative to each other so that when the trolley is rotated into the second position, the wheel 662*b* and speed control track 210*h* optimally interface. The second speed control track 662*a* and the surface of the trolley body 662*g* may both be flat surfaces, may both be wave-like surfaces, or the second speed control track 662*a* may be a flat surface and the surface of the trolley body may be a wave-like surface and vice versa. For example a flat surface having a narrow width, equal to or less than the length of the crest or trough of the wave-like surface, so that the flat surface is able to sufficiently contact the wave-like surface. In embodiments where both the second speed control track 662*a* and the surface of the trolley body 662*g* are both wave-like, the wave form of the second speed control track 662*a* may be any form permitting a corresponding wave-like surface on the body of the trolley 662*g*, when engaged with the speed control track 622*a*, to move along guide rail 210 so that trolley 620 does not come to an abrupt stop when the trolley is in the second position. If a flat surface of the trolley body 662*g* and a wave-like surface of the second speed control track 662*a* is used or vice versa, then the flat surface is of a size that engages and continuously presses against the wave-like surface and does not glide over the peaks of the wave-like surface (i.e., the flat surface is shorter than the length of the peaks or the troughs). Friction is the primary mechanism responsible for slowing the trolley when the surface of the trolley comes into contact with the second speed control track. As described herein, the surfaces of the first speed control track 210*h*, the second speed control track 662*a* and the surface of the trolley body 662*g* may be made of the same or different material, and may be a material such as metal, sandblasted metal, rubber, sandblasted rubber, polymeric material, and sandblasted polymeric material. Alternatively, one or both the surface of the first speed control track, second speed control track and the surface of the trolley comprise a brake pad. Examples of brake pad materials may include, but are not limited, to non-metallic materials (e.g., comprising a combination of various synthetic substances bonded into a composite, principally in the form of cellulose, aramid, polyacrylonitrile (PAN), and/or sintered glass), semi-metallic materials (e.g., comprising synthetic materials mixed with flaked metals) and/or ceramic materials (e.g., comprising clay and porcelain bonded to copper flakes and filaments) combined with an appropriate binding agent, for example, phenol formaldehyde resin, and optionally a friction material, such as graphite or zirconium silicate. The friction between the first speed control track and the wheel 662*b* and between the second speed control track and the surface of the trolley causes slowing of the trolley, or causes the trolley to stop temporarily.

Similarly to other embodiments described herein, in use if the user falls and pulls the trolley body in the general direction of "C" (see FIGS. 13A and 14A), the trolley body 620 rotates about circular guide shaft 210*c* in direction "B" into the second position (falling orientation), thereby engaging the speed retarding system comprised of: (1) onset, deformable onset or offset wheel 662*b* and the first speed control track 210*h*; and (2) the second speed control track 662*a* and the surface of the trolley body 662*g*. The overall braking of the speed controller mechanism activated in the falling orientation, is sufficient to stop or temporarily stop movement of the trolley along the guide rail.

As discussed above, the trolley 620 can contain one or more than one wheel 662*b* interacting with the first speed control track 210*h*, which may be onset, deformable or offset. If the wheel is an onset wheel, then the retainer 662*c* biases the wheel 662*b* toward the first speed control track 210*h*. The retainer 662*c* may be any suitable biasing member, for example but not limited to a leaf spring, a compression spring, or a rubber or other resilient polymeric material. Alternatively as discussed in previous embodiments, wheel 662*b* may be a deformable wheel (e.g., without the retainer 662*c*).

As shown in FIGS. 13A-13C and 14A, one or more secondary wheels 663 may also be included within the trolley body to travel along the upper guide rail shoulder 210*g*, or side 210*j*, or combination of both, to allow the trolley 620 to glide smoothly on the upper guide rail's conductive surface and keep the magnets at an optimal distance from the conductive surface of the guide rail.

As shown in FIGS. 13A and 13B, magnetic fields may be "shielded" from the user by protective coverings 512 and 510. Protective covering 512 may be a ferromagnetic metal or alloy (i.e., steel) covering that wraps around the top and upper sides of the trolley, covered by an insulating (non-magnetic) material 510 (e.g., plastic). In embodiments where the trolley body is made of a ferromagnetic material, then an insulating (non-magnetic) material such as plastic or aluminum may underlie protective covering 512. Alternatively, as described with reference to FIGS. 2 and 9-11, a single protective covering may be used, e.g., a foam covering. The protective coverings 510 and 512 in FIGS. 13A-C, FIGS. 14A and 14B may be used for any embodiment of the fall control system described herein.

As previously described and shown again in the embodiments of FIGS. 13A-C, 14A and 14B the user is attached to the trolley 620 via tether 140 at linkage 144. In FIGS. 13A-C, 14A and 14B a hanger 146 is securely attached to the front of the trolley. Attachment options for the anchor can include welding, bolting, and/or riveting the hanger 146 to a metal post 147 as shown in FIGS. 13B and 13C, with the post extending into the trolley to a metal plate 148 (see FIG. 13C). The post 147 and metal plate 148 may be one solid piece, or two separate pieces. The plate 148 and post 147 help to securely anchor the hanger 146 to the trolley 620. The tether 140 is securely attached to the hanger 146, for example, by a ring or carabiner 144. An option that allows for rotation of the tether is a 360-degree swivel connection 145 as similarly described herein. Alternatively, carabiner 144 may have a swivel connection to the tether which may eliminate the need for swivel connection 145. The other end of the tether 140 attaches to the user at one or more points, such as to one or more points on a transfer belt that circles the upper pelvis/lower abdomen, or to one or more points on a full body fall arrest harness. The tether 140 can have a flexible component, such as an elastomeric or bungee cord like material. The guide rail, 210 with the guide rail shaft 210*c* containing the trolley 620 may be positioned along a wall 801 (e.g., FIG. 18A), above waist height of the user, such as above shoulder height. However, the guide rail 210 may be placed at waist height of the user, at a height between the waist and shoulder of the user, or above shoulder height of the user. The tether 140 may attach directly to the user, or indirectly via a transfer belt or harness at a single attachment point or multiple attachment points. The user attachment mechanisms shown in FIGS. 13A-13C, FIGS. 14A 14B and 17A may be used for any embodiment of the fall control system described herein.

Figure 17B:
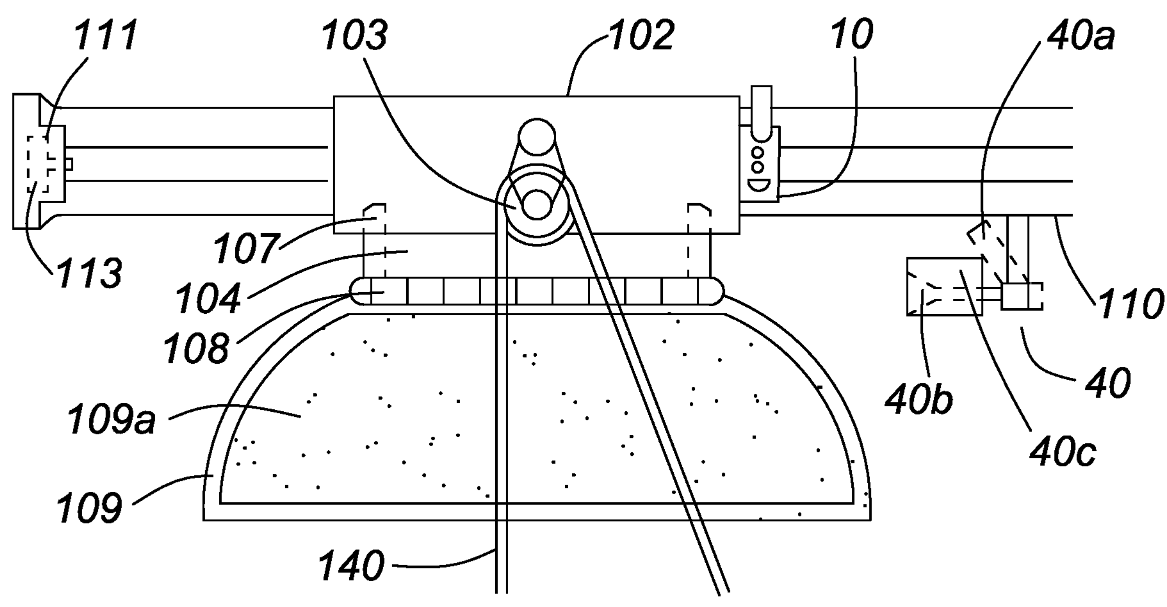
FIG. 17B shows a front view of the fall control system of FIG. 17A, with the pad removed.

Alternative mechanisms for attaching the user to the trolley 620 will be known in the art. FIGS. 14C-14G show examples of attachment mechanisms and alternatives to hanger 146 shown in FIGS. 13A and 14A, and may be used in conjunction with any embodiment described herein. The embodiments shown in FIG. 14C-14G may contain one or more than one arm 121 attached to the trolley body at a proximal end 121*a* of the arm 121, one or more than one cable 123 attached to the trolley at a distal end 121*b* of the arm 121, one or more than one biasing member 129 (e.g., a spring, or other resilient member), one or more than one pulley 103, and one or more than one tether guide 125. The arm 121 positions the attachment of the tether 140 away from the trolley 620, and therefore may be sized appropriate such that the user is attached to the trolley at a suitable distance away from the wall. It is envisioned that a combination of the different elements described in FIGS. 14C-14G (i.e., arms, cables, springs, pulleys, tether guides) could be used in different configurations to form alternate embodiments. For example, the pulley 103 may be rotationally attached to the distal end of arm 121*b* perpendicular to the longitudinal axis of the trolley body as shown in FIG. 14F, or rotationally attached to the distal end of arm 121*b* so that the pulley lies in the same plane of the longitudinal axis of the trolley body, as shown in FIG. 17B. For very heavy users, the option exists to use two or more trollies on the guide rail so that the user's weight is spread out over the two or more trollies, and the tether from the user could connect to both trollies on the same guide rail. In this embodiment, one or more than one of the trollies may comprise a speed controller and/or a background speed controller. Some embodiments may comprise an external power source to assist the user to move the trolley (or trollies) along the elongate guide rail. In some embodiments, an external power source (e.g., a battery-powered remote control train) may push or pull the trolley (or trollies) to meet the user, or a second user, at the opposite end of the guide rail.

Figure 14C:
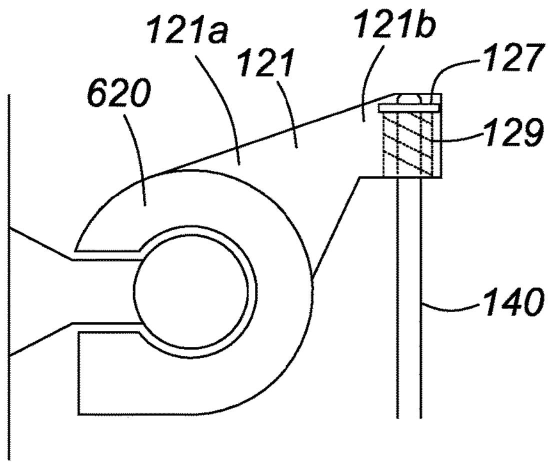
FIGS. 14C, 14D, 14F and 14G show cross-sectional side views of fall control system embodiments similar to FIGS. 13A and 14A, except having alternative hanger 146 arrangements.

In the embodiment shown in FIG. 14C, the arm 121 may be solid and may contain a biasing member 129, for example a spring or a resilient rubber member at a distal end of the arm (121*b*). The top of the tether 140 is attached to an attachment plate 127 above the biasing member 129, such that the biasing member 129 biases the attachment plate 127 away from the arm. The biasing member 129 provides a cushioning effect for the user in the event of a fall.

Figure 14D:
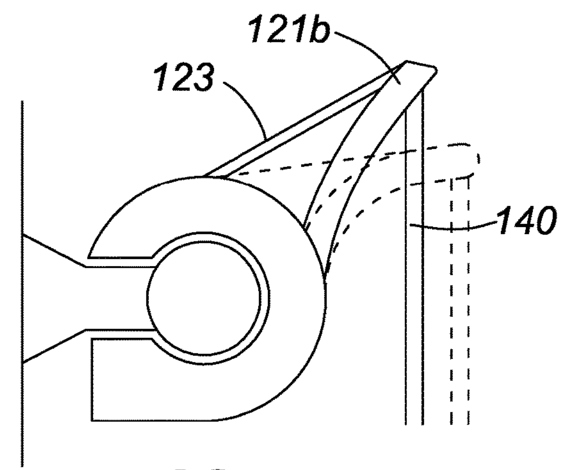
Figure 14E:
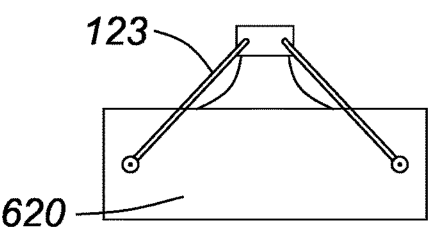
FIG. 14E shows a top view of the embodiment shown in FIG. 14D.
Figure 14F:
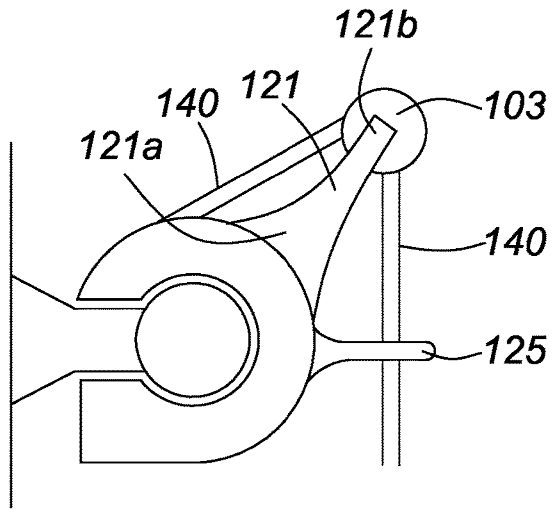

The embodiment shown in FIG. 14D illustrates a flexible arm 121. The flexible arm 121 may comprise a material such as carbon fiber, Graphene, or some other strong yet flexible material known in the art. One or more than one cables 123 provide structural support for the arm 121. The dotted lines in FIG. 14D represent the position of the arm 121, cables 123, and tether 140 when the trolley 620 is in a falling orientation. The tether 140 is attached to the end of the arm 121. A possible configuration for the cable(s) 123 is illustrated in FIG. 14E (top view). In alternative embodiments, cable 123 may be attached to a solid non-flexible vertical arm 121.

In the embodiment shown in FIG. 14F, a pulley 103 is positioned at the end of the arm 121 and the tether 140 passes overtop of the pulley 103 to attach at the mid or rear of the trolley 620. A solid, semi-rigid, or tether guide 125 contains an opening at the end farthest away from the trolley 620 that allows the tether 140 to pass through. The tether guide 125 may comprise a spring, a resilient rubber member, or some other flexible material known in the art. The tether guide 125 may keep the upper section of the tether 140 at the trolley's midline so when the user ambulates, the trolley 620 follows the user more closely. The end of the tether guide 125 may allow the tether to breakaway (e.g., rubber ring with a slot in it) so that in the event of a hard fall, the tether 140 may be pulled away from the tether guide 125 without breaking the tether guide 125.

Figure 14G:
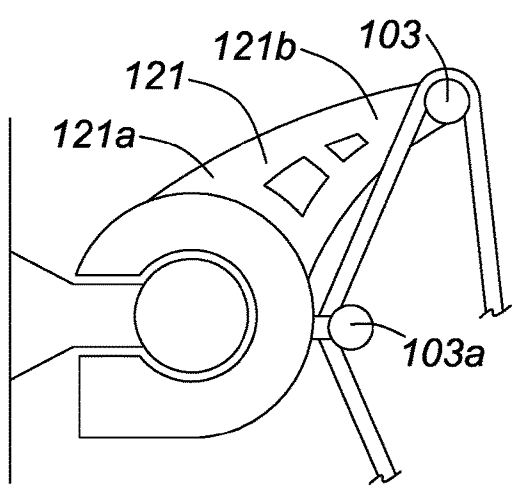

In the embodiment shown in FIG. 14G, a pulley 103 is located at the end of the arm 121 on a side surface, with another pulley 103*a* located at or near the front edge of the trolley (i.e., the edge facing the user). As illustrated, the tether 140 passes over the two pulleys 103, 103*a*, providing two separate points of attachments to the user. For example, the upper attachment may be connected to the upper aspect of the user's body (e.g., upper back), and the lower attachment may be connected to the lower aspect of the user's body (e.g., the lower back). In alternative embodiments. (not shown), the pulley system shown in FIG. 17B may be used.

Figure 15A:
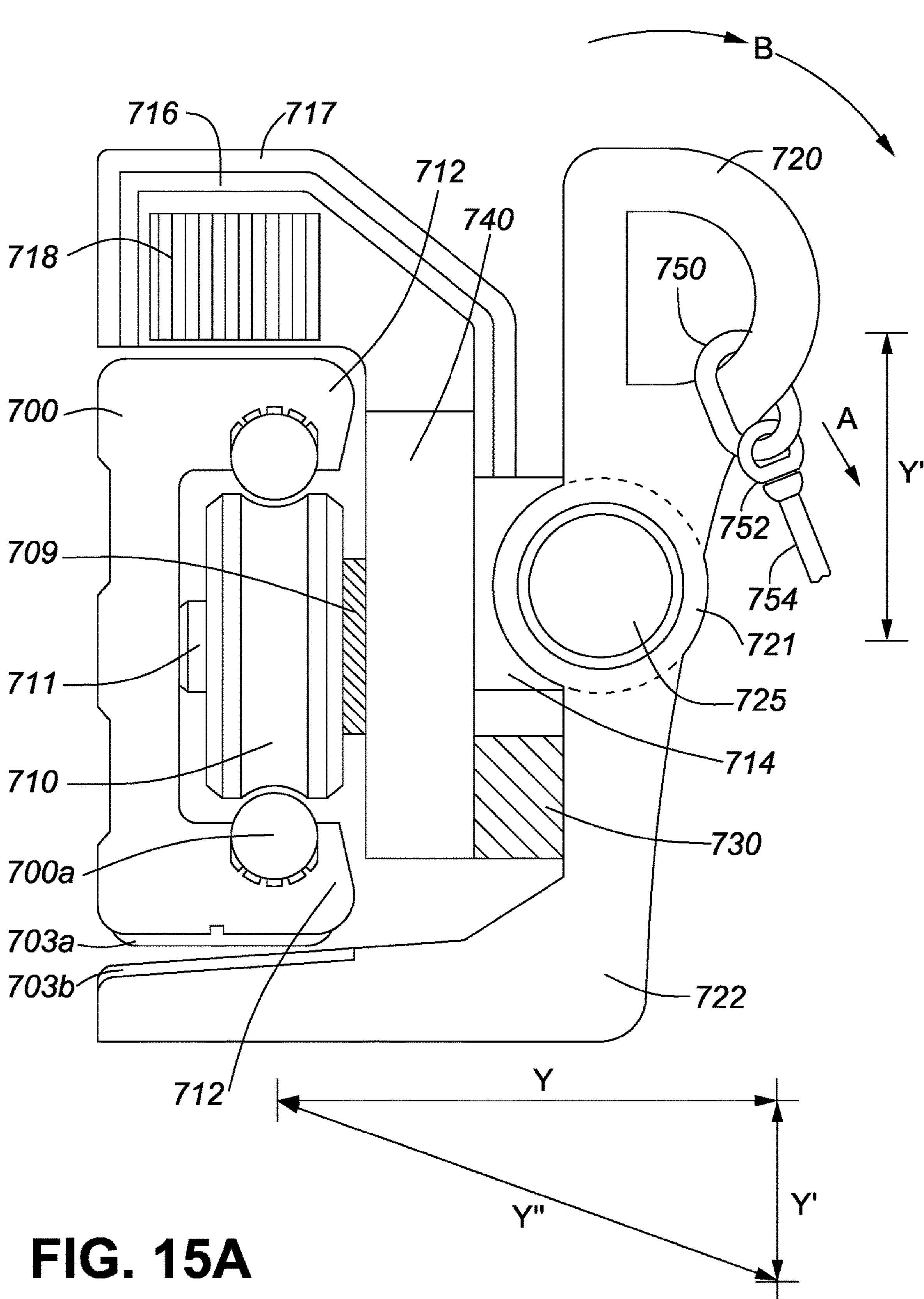
FIG. 15A shows a cross-sectional side view of another example of a fall control system as described herein in the travelling orientation, the trolley comprising a braking arm 722 rotatable about a circular shaft 725 as viewed from line A-A in FIG. 15B.
Figure 15B:
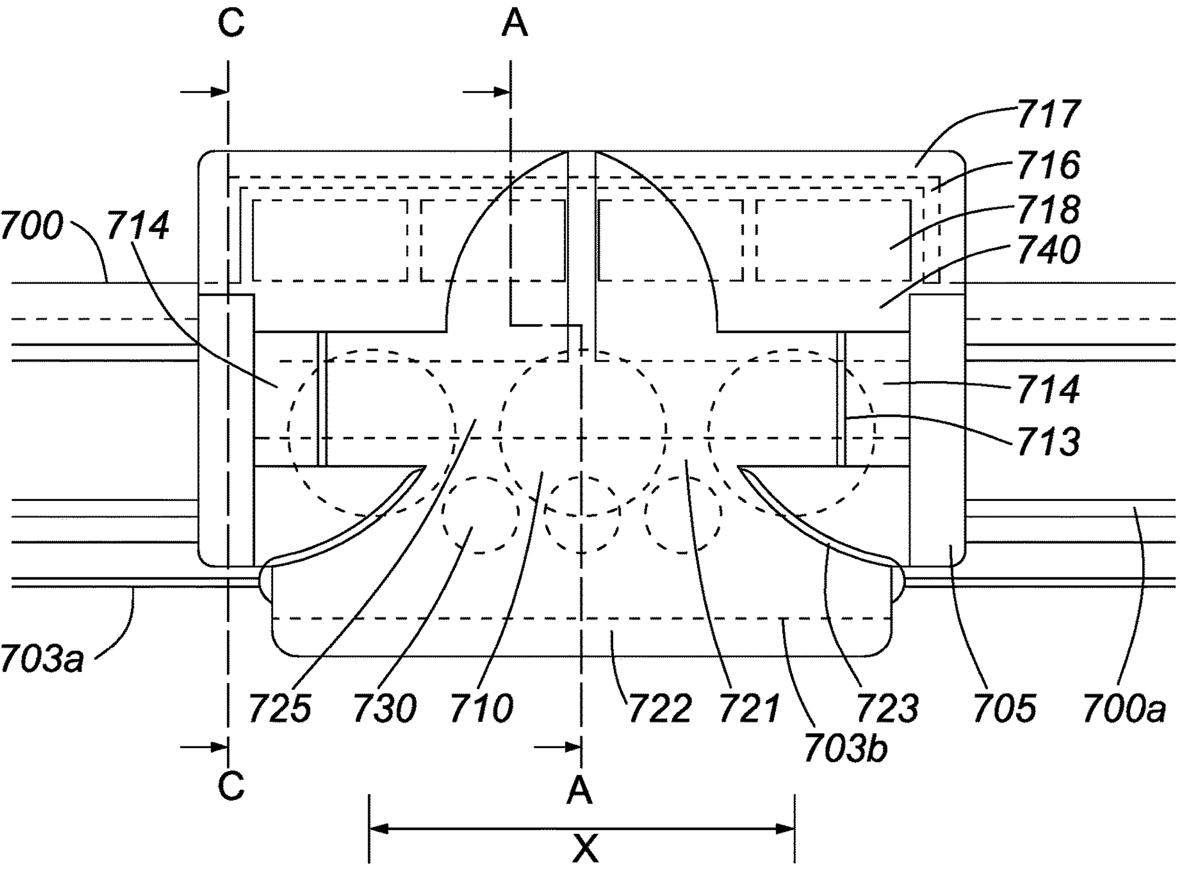
FIG. 15B shows a front end view of the fall control system of FIG. 15A.

With reference to FIGS. 15A and 15B there is shown an alternate embodiment of the speed control system. The fall control system shown in FIGS. 15A and 15B comprises a rectangular elongate guide rail 700 (analogous to 110 in FIGS. 2, 3A and 4) extending along an axis, with a trolley 740 comprising two or more rollers 710 to allow the trolley 740 to move along the guide rail 700, for example, along guide rail track 700*a*. Guide rail track 700*a* may comprise cylindrical rods or other analogous members to help maintain rollers 710 within the guide rail 700. The guide rail 700 further comprises a speed control track 703*a* for interacting with a surface 703*b* of the braking arm 722 of the trolley when the trolley is in the falling orientation.

Figure 15C:
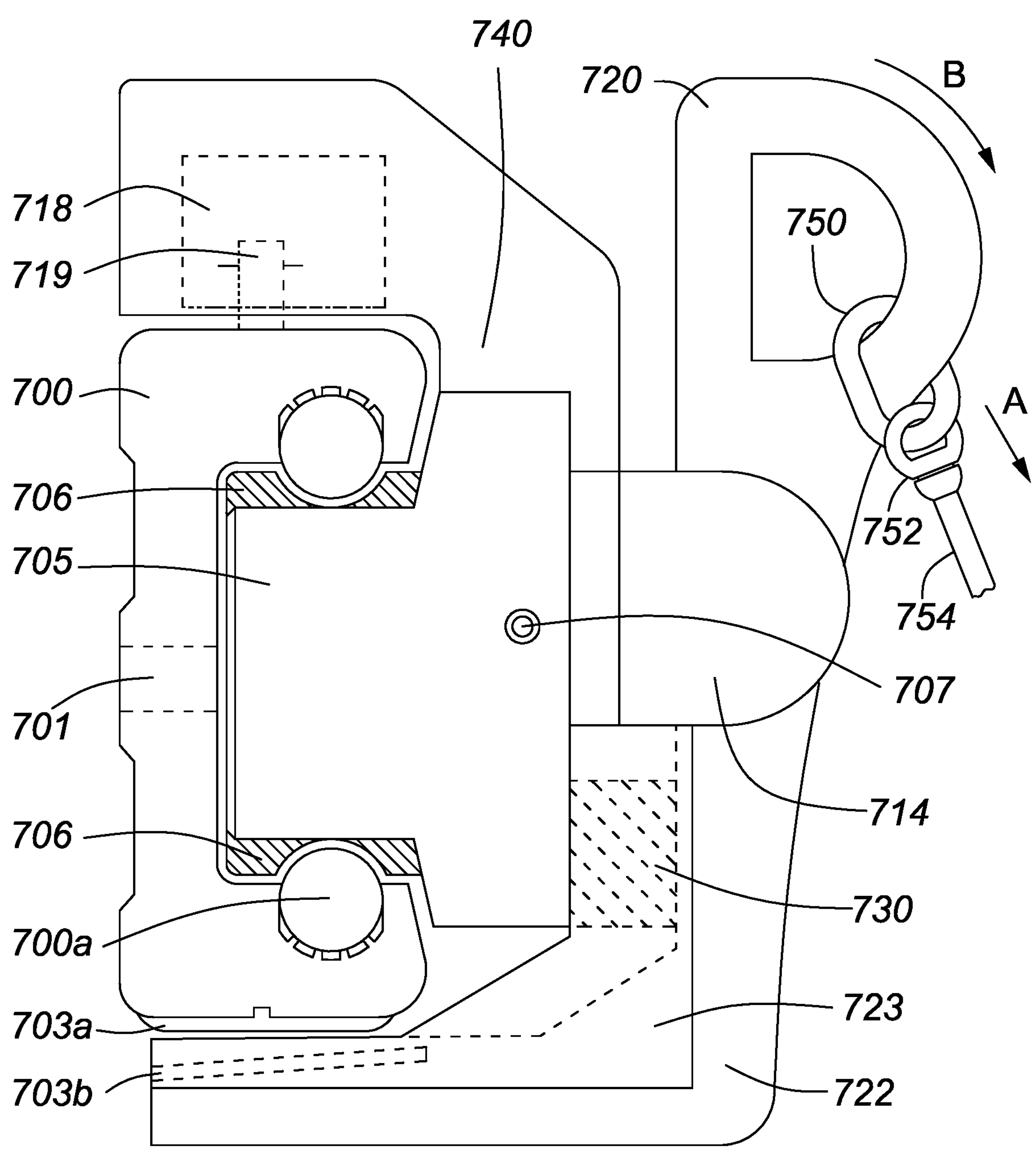
FIG. 15C shows a cross-sectional side view of the fall control system of FIGS. 15A and 15B as viewed from line C-C in FIG. 15B.

As illustrated in the non-limiting example shown in FIGS. 15A-C, the guide rail 700 has inset cylindrical rods (or guide rail track) 700*a* on which the rollers of the trolley having concave travelling surfaces ride. Alternatively, the rollers 710 can have a convex travelling surface for travelling along a guide trail track or rods 700*a* with a concave surface, or the rollers 710 can have another shaped travelling surface for riding on an alternative track, e.g., non-cylindrically shaped rods. A low friction sliding element 711 (e.g., Teflon®) between the rollers 710 and guide rail 700 may be used to prevent the rollers from becoming inwardly displaced or jammed with high axial pressures exerted against the front of the trolley 740. Alternatively, the upper and lower outer edges 712 of elongate guide rail 700, with or without a low friction element 711, may overhang the rollers 710 to prevent the outward displacement of the rollers 710 from the guide rail 700 in the event of a fall (e.g., analogous to the overhang of 110*d* in FIGS. 2, 3A and 4). Alternatively, the two or more rollers 710 in FIG. 15A can be replaced with a trolley body that rides inside an elongate guide rail on multiple smaller rollers, wheels, or ball bearings, as illustrated in FIGS. 2, 3A and 4. The trolley body 740 may be attached to the rollers 710 by any connection mechanism known in the art. The trolley body may be spaced from the guide rail using a spacer 709, which also connects the trolley body to the rollers 710.

The elongate guide rail 700 may be attached to a wall via a connecting mechanism (e.g., a screw, bolt, concrete fastener or other fastening mechanism) through multiple spaced rail holes 701 (e.g., see FIG. 15C). The fall control system may further comprise a tether 754 attached to the trolley at a first end via hanger 720. The tether 754 may be securely attached to the hanger 720, for example, by a ring or carabiner 750. The tether may have an elastic component. The other end of the tether is attached to the user, such as to a transfer belt that circles the upper pelvis/lower abdomen, or to a full body fall arrest harness. The tether may be attached to the user at one or multiple attachment points (for example, as shown in FIGS. 1A and 17A). A 360-degree swivel connection 752 may be used for rotation of the tether with the carabiner. The guide rail 700 containing the trolley 740 may be above waist height of the user, such as above shoulder height as shown in FIG. 17A. However, the guide rail 700 may be placed at waist height of the user, at a height between waist and shoulder of the user, or above shoulder height of the user.

The trolley body 740 may comprise various components, including, but not limited to, the one or more background magnets 718, a cylindrical shaft 725 (attached to the main body of the trolley 740 in one or more locations at fixed capped ends 714), a braking arm 722 incorporating a hanger 720 in an upper portion of the braking arm, a braking arm contact surface 703*b* in a lower portion of the braking arm, a middle cylindrical surround 721 through which the braking arm rotates around the cylindrical shaft 725, and one or more than one biasing member 730, for example, compression spring(s), rubber insert(s), or a biasing member comprised of a resilient material that biases the braking arm surface 703*b* of the trolley away from the guide rail surface 703*a*. In the event of a fall, if the user falls and pulls the trolley body in the general direction of "A", a downward force pulling on the tether causes the hanger 720 and braking arm 722 to rotate ("B") around the cylindrical shaft 725. Thus, the braking arm 722 pivots about an axis (of the cylindrical shaft 725) parallel to the axis of the elongate guide rail 700, causing the braking arm 722 to move in a plane perpendicular to the elongate guide rail 700. If the force applied exceeds a threshold force of the biasing member 730, the braking arm 722 is moved from a first position (travelling orientation) to a second position (falling orientation) compressing the biasing member 730 (e.g., spring) and causing the braking arm contact surface 703*b* to contact the first speed control track 703*a* of the lower guide rail.

The material selected for 703*a* and 703*b* can be the same or different, and may be a material such as metal, sandblasted metal, rubber, sandblasted rubber, polymeric material, and sandblasted polymeric material. Alternatively, one or both the surface of the first speed control track 703*a* and the surface of the trolley 703*b* comprise a brake pad. Examples of brake pad materials may include, but are not limited, to non-metallic materials (e.g., comprising a combination of various synthetic substances bonded into a composite, principally in the form of cellulose, aramid, polyacrylonitrile (PAN), and/or sintered glass), semi-metallic materials (e.g., comprising synthetic materials mixed with flaked metals), and/or ceramic materials (e.g., comprising clay and porcelain bonded to copper flakes and filaments) combined with an appropriate binding agent, for example, phenol formaldehyde resin, and optionally a friction material, such as graphite or zirconium silicate. Alternatively, surfaces 703*a* or 703*b* can be the same material as the rail 700 and braking arm 722. The friction of surface 703*a* against surface 703*b* causes slowing of the trolley 740, or causes the trolley to stop temporarily. Surfaces 703*a* and 703*b* can be flat surfaces or wave-like surfaces, or a combination thereof, as described with reference to other embodiments described herein.

As discussed for other embodiments, the trolley body 740 in FIGS. 15A-15C may comprise a "shield" around the background magnets 718 to help redirect the magnetic fields away from the user. For example, in the embodiment shown in FIGS. 15A-15C, a ferromagnetic plate 716 (e.g., steel) is overlaid by an insulating material 717 (e.g., plastic). If the body of the trolley 740 housing the magnets is ferromagnetic material (e.g., steel), then an insulating (non-magnetic) layer such as plastic or aluminum should be added between the metal 716 and the magnet 718.

As shown in FIGS. 15B and 15C, a flexible shield 723 (e.g., plastic, rubber or nylon bristles) is attached to the outer ends of the lower portion of the braking arm 722. The flexible shield 723 helps prevent the user's fingers or other body parts from getting stuck, pinched, or jammed between the moving surfaces of the trolley and guide rail in the travelling or falling orientation. FIG. 15C shows an optional rolling element 719, which may be a wheel, roller, ball bearing or equivalent feature that maintains a suitable distance between the guide rail 700 and the one or more than one background magnets 718 and allows smooth movement of the trolley 740 with respect to the guide rail 700.

As shown in FIG. 15C, a wiper 706 may be attached to an end plate 705 of the trolley 740, the end plate 705 secured with a fastener 707 to the trolley body 740, helps to keep the guide rail track or rods clear of debris. The wiper can be made of any suitable material, including, but not limited to bristles, high density open or closed foam, and be housed within a molded plastic casing with spring-load to maintain contact between the wiper 706 and the surface(s) of rail 700. The wiper may be oil filled, or filled with another lubricating substance. As shown in FIG. 15B, one or more than one low friction rings 713 made of a low friction material (e.g., Teflon™) can be inserted between the fixed capped ends 714 of the cylindrical shaft 725, and the middle cylindrical surround 721 and the cylindrical shaft 725 to allow smooth rotation of the braking arm 722.

Figure 16A:
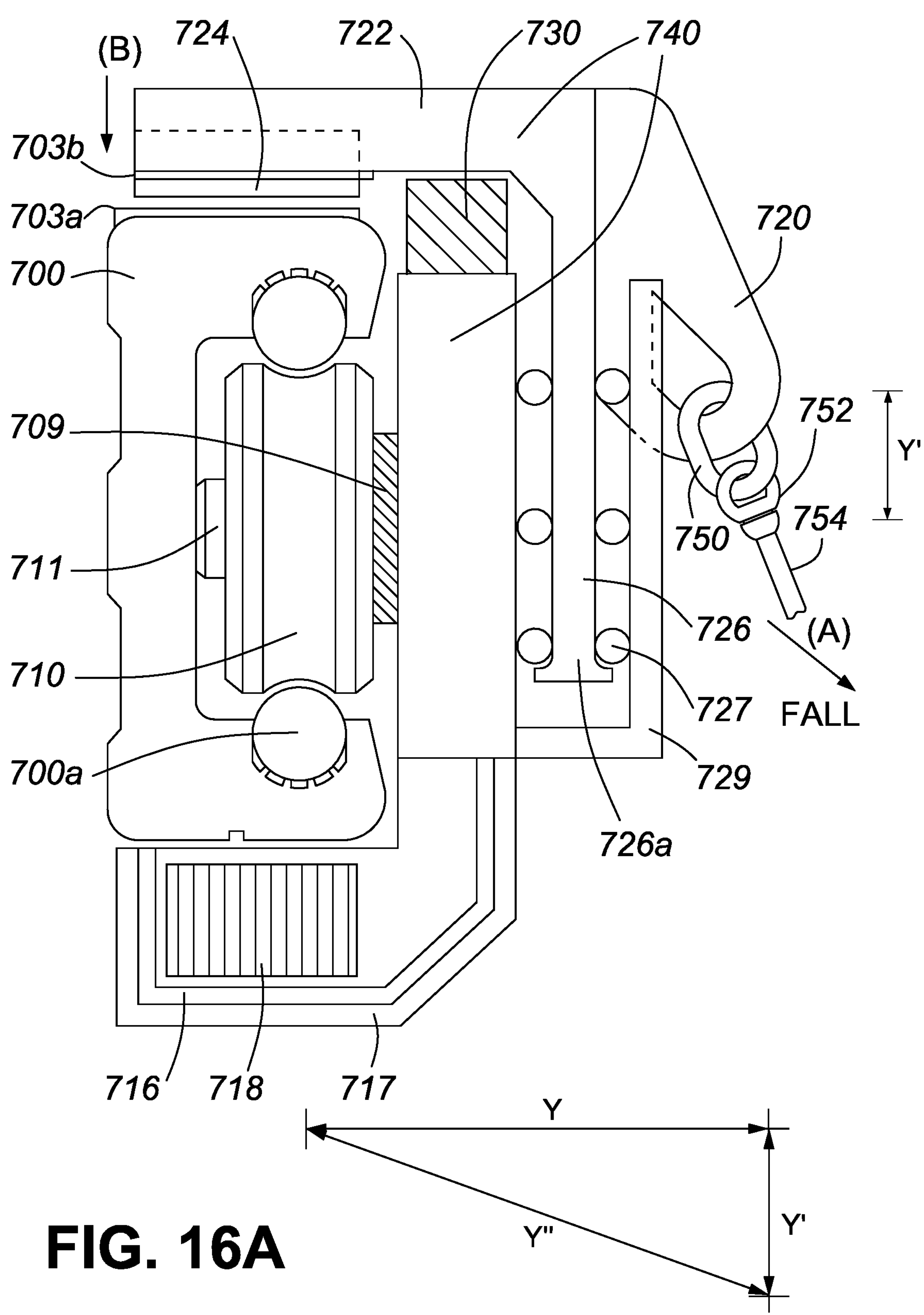
FIG. 16A shows a cross-sectional side view of another example of a fall control system as described herein in the travelling orientation, the trolley comprising a braking arm 722 as viewed from line A-A in FIG. 16B.

As in previously described embodiments, the fall control system may comprise a background speed control system comprising a background eddy current brake comprising one or more than one background magnet 718 interacting with a surface of guide rail 700 which is conductive (background speed control track) for controlling a first maximum speed of the trolley so that it is less that the expected maximum fall velocity of the user in the event of a fall. The background magnet 718 may interact with any suitable surface of the guide rail 700, for example, an upper surface of guide rail, as shown in FIG. 15A, or a lower surface of the guide rail as shown in FIG. 16A. The one or more background magnets 718 may be square, rectangular, curved, arc shaped, or comprise any suitable shape in order to fit within trolley 740 and interact with the upper surface of the guide rail (background speed control track).

Figure 15D:
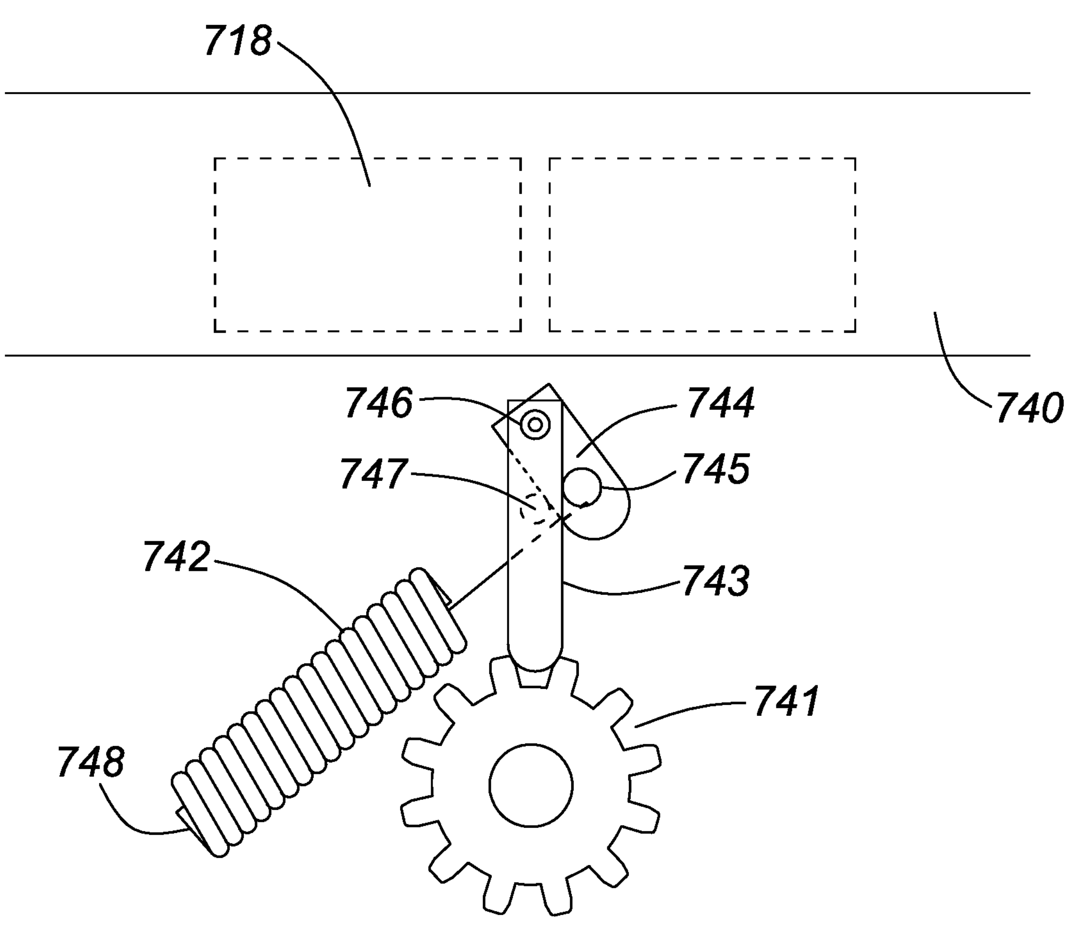
FIG. 15D shows a partial back view of a fall control trolley with the wheels removed having an alternative background speed control system comprising a gear wheel and a swing arm. The remaining components of the trolley body have been removed for clarity.
Figure 15E:
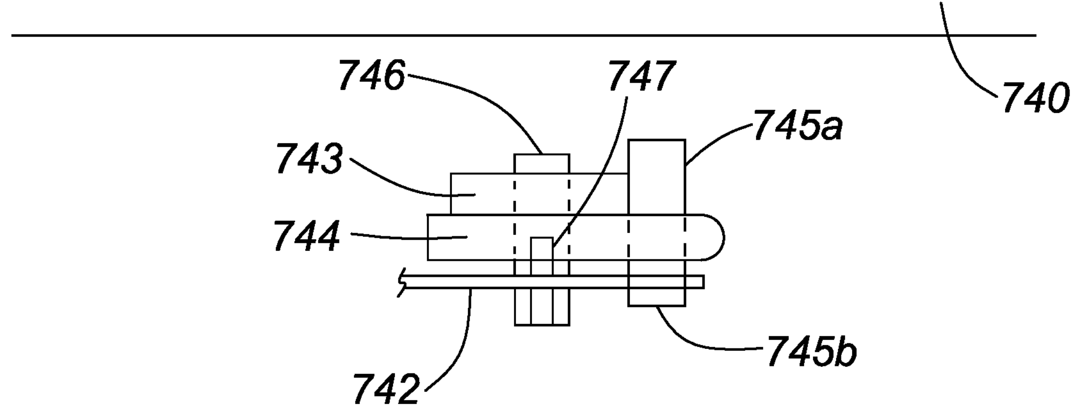
FIG. 15E shows a partial bottom view of the swing arm of FIG. 15D (without gear wheel 741).

Alternatively, or in addition to, the background speed control system may comprise any other mechanism for controlling the speed of the trolley along the guide rail in the travelling orientation. An alternative background speed controller is shown in FIGS. 15D and 15E. Features of the background speed controller are shown in isolation from a back side view of the trolley 740 in FIG. 15D, and from a partial bottom view in FIG. 15E. In this example, the background speed controller comprises a gear wheel 741, a biasing device 742, for example an extension spring, coil spring, elastic cord and the like, swing arm 743, and a post plate 744 with post 745. The gear wheel 741 is analogous to gear wheel 124 in FIGS. 2A and 3A. The axle for the wheels or rollers 710 may go through the center of gear wheel 741, so that the gear wheel 741 may rotate freely about a rotatable attachment to the trolley 740. The swing arm 743 and post plate 744 both pivot through an attachment 746, for example a pin that is anchored to a surface of the trolley 740.

The gear wheel 741 and swing arm 743 may create unidirectional wheel rotation resistance in a direction when the user is descending stairs but not when the user is ascending stairs. With reference to FIG. 15D, when gear wheel 741 (and connected wheel or roller 710, not shown) rotate clockwise (e.g., in this example, when the user is moving from left to right and descending stairs), the gear wheel 741 contacts the bottom of the swing arm 743, pushing it against the post 745, and contacting the post 745 at its proximal end 745*a* relative to the trolley (FIG. 15E). Post 745 is biased towards the swing arm 743 e.g., by a biasing device 742, for example, an extension spring that is under tension. In this non-limiting example, the spring 742 is anchored by an attachment point 748 to the trolley 740 and the opposite end is attached to the distal end of the post 745*b*. Tension on the post 745 by the biasing device 742 ultimately results in more resistance, arising from the swing arm 743 pressing against the gear wheel 741, causing slowing of the wheel or roller 710 on the guide rail 700. If the biasing device 742 is an extension spring, then minimal movement and deflection of the swing arm 743 and spring 742 is desired to increase the lifespan of the extension spring. Alternatively, other embodiments could use compression springs, die springs, disc springs, coil springs or leaf springs, or elastic cord placed in alternate locations relative to the gear wheel 741 and post plate 745. The gear wheel background speed controller may be active when descending the stairs, but not when ascending the stairs, so there is no resistance and the user can more easily move up the stairs. For example, when the user is ascending stairs, the roller 710 and connected gear wheel 741 turn counter-clockwise (with reference to FIG. 15D; with the user moving from right to left), causing the gear wheel 741 to push the bottom end of the swing arm 743 to the left, thereby moving the swing arm 743 away from the post 745 on the post plate 744, resulting in no appreciable resistance against the gear wheel 741. In this example, the post 745, held under tension by the extension spring 742, is prevented from pushing the swing arm 743 out of contact with the gear wheel 741 by a stopper or pin 747. The background speed controller can be applied to one or more than one of rollers 710. If the gear wheel background speed controller is used on more than one wheel or roller 710, then the teeth of the gear wheels for each wheel or roller 710 may be orientated so that they are out of sync (with respect to the timing of their contacting their relative swing arms 743) so that the combined braking mechanism on two or more rollers results in an overall more uniform resistance of trolley movement.

Different configurations of the gear wheel teeth 741 and bottom of the swing arm 743 from that illustrated in FIG. 15D are also envisaged and could be used to enhance the braking mechanism. For example, as an alternative to the gear wheel and swing arm background speed controller shown in FIGS. 15D and 15E, a bearing or bushing in the roller 710 known in the art that causes wheel resistance when turning in one direction, but not the opposite direction may be used. It is contemplated that the gear wheel 741 may be used alone as a background brake, or in addition to another background brake, e.g., an eddy brake.

Figure 16B:
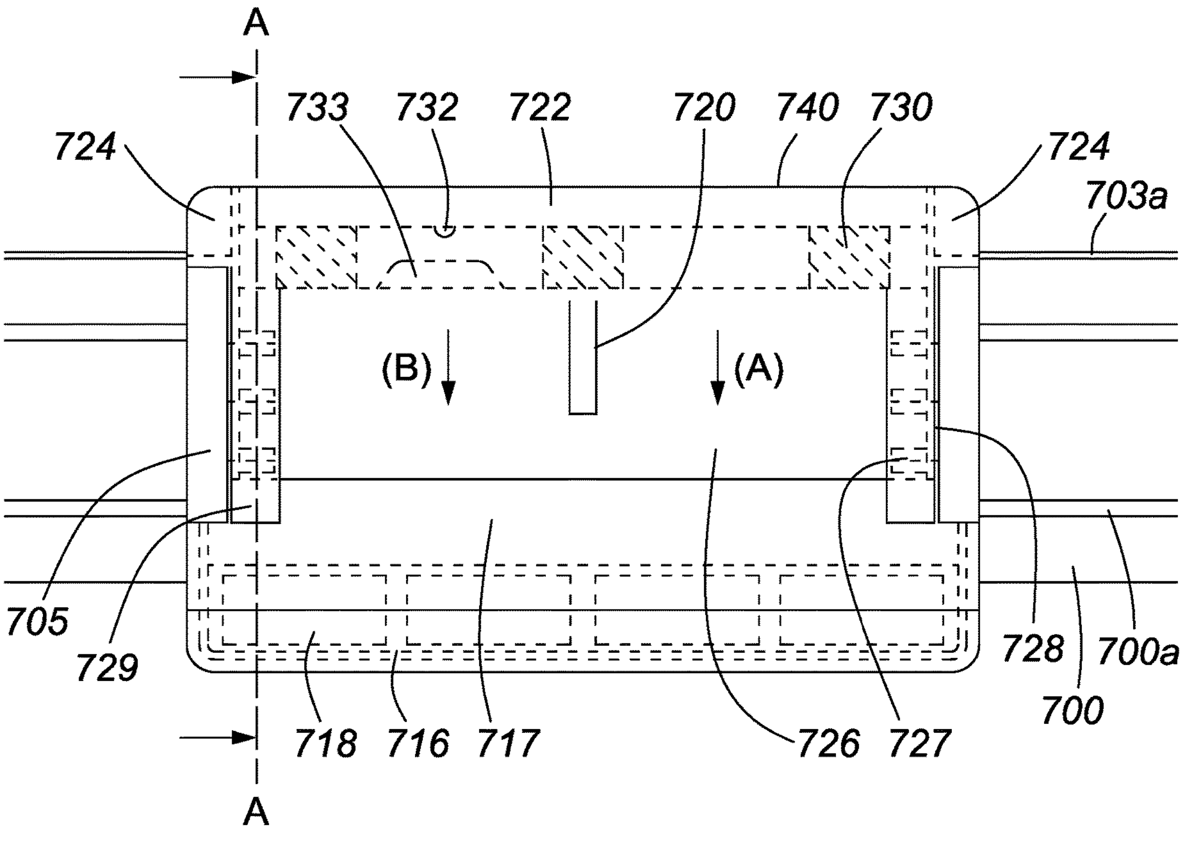
FIG. 16B shows a front end view of the fall control system of FIG. 16A with the braking arm in the travelling orientation.

FIGS. 16A and 16B show an alternate fall control system similar to the fall control system shown in FIGS. 15A-15C, except that the background magnets 718 interact with the conductive surface at the bottom of the guide rail 700, and the braking arm 722 with braking arm surface 703*b* interacts with the opposing speed control track at the top of the guide rail 703*a*.

The trolley body 740 may be attached to the rollers 710 via any suitable connection mechanism e.g., an axel and may comprise a spacer 709. The trolley 740 comprises different parts, including, but not limited to, one or more background magnets 718, a braking arm 722 and braking arm plate 726, and one or more than one biasing member 730, for example compression spring(s), rubber insert(s), or a biasing member comprised of a resilient material, that biases the braking arm surface 703*b* away from the upper guide rail speed control surface 703*a*.

In the embodiment shown in FIGS. 16A and 16B, the braking arm plate 726 is located within a guiding bracket 729 sandwiched by rolling elements 727. The rolling elements 727 can be wheels, rollers, ball bearings, or other types of rolling elements known in the art. The rollers can be made of steel, rubber, or nylon, for example. The rolling elements 727 within the two guiding brackets 729 may be attached to the trolley body 740 by one or more axles or by other means to allow the braking arm plate 726 to ride smoothly within the channel defined by guiding bracket 729, in the event of a fall. Thus, the braking arm plate 726 is slidable in a plane parallel to the elongate guide rail 700. The braking arm plate 726 may comprise a stoppered end 726*a*, for example, a flared end, extending pins or other similar device that ensures the braking arm plate 726 is sandwiched between the rolling elements 727 and cannot be pulled up and out of the trolley.

In the event of a fall where the trolley moves from a travelling to a falling orientation, a downward force pulling on the tether "A" causes the braking arm 722 to move down. If the force applied exceeds a threshold force of the biasing member (for example, compression spring(s)) 730, the braking arm 722 is moved from its biased first position (travelling orientation) to a second position (falling orientation) where the biasing member 730 is compressed causing the braking plate 726 to move downwards within the guiding bracket 729 by means of the rolling elements 727, causing the surface of the braking arm 703*b* to contact the adjacent surface 703*a* of the upper guide rail (the speed control track). The material selected for 703*a* and 703*b* can be the same or different, and may be a material selected from a group consisting of: metal, sandblasted metal, rubber, sandblasted rubber, polymeric material, and sandblasted polymeric material; or, both the second surface of the speed control track and the surface of the trolley of the speed controller comprise a brake pad. Examples of brake pad materials may include, but are not limited, to non-metallic materials (e.g., comprising a combination of various synthetic substances bonded into a composite, principally in the form of cellulose, aramid, polyacrylonitrile (PAN), and/or sintered glass), semi-metallic materials (e.g., comprising synthetic materials mixed with flaked metals), and/or ceramic materials (e.g., comprising clay and porcelain bonded to copper flakes and filaments) combined with an appropriate binding agent, for example, phenol formaldehyde resin, and optionally a friction material, such as graphite or zirconium silicate. Alternatively, surfaces 703*a* or 703*b* may be the same material as the rail 700 and braking arm 722. The friction of 703*a* against 703*b* causes slowing of the trolley, or causes the trolley to stop temporarily. Surfaces 703*a* and 703*b* can be flat surfaces or wave-like surfaces.

It has been found that the embodiment shown in FIGS. 16A and 16B has minimal axial and radial forces, and minimal moments of force on the trolley body 740, the trolley wheels 710, and the guide rail track 700*a* in a falling orientation, since more forces are transmitted through the braking arm 722 to the top of the guide rail. The top of the guide rail may be firmly attached at to the wall at multiple points.

The bottom edge of the braking arm plate 726*a* may be enlarged as illustrated in FIG. 16A to prevent the braking arm from being pulled up and out of the trolley by an upward (vertical) force. As the speed control surface 703*a* is on the top of the rail in the embodiment in FIG. 16, it is important that the top of the rail be free of debris, which could hinder the braking mechanism from working properly. For example, a sweeper 724 (similar to the wipers 706 shown in FIG. 15A) may be used at the top surface ends of the braking arm 722 to clear away debris from the top of the guide rail 700. The sweeper 724 may be composed of stiff nylon bristles, rubber, felt, or another suitable flexible material that would sweep away debris to prevent debris from getting stuck between surfaces 703*a* and 703*b*. The flexible sweeper 724 may compress in the falling orientation, allowing the braking arm surface 703*b* to contact the guide rail braking surface 703*a*.

FIG. 16B also illustrates the option for a warning device 733, for example a bell, buzzer or other alarm-like device on the trolley 740 (or in another convenient location on the trolley) that would alert family or medical personnel that the user had fallen and may require assistance. As described above, when the braking arm 722 moves down vertically in the falling orientation, a metal striker 732 strikes or activates the warning device 733 resulting in an alarm, for example an alert call, a buzzing or a ringing noise. For example, a battery-powered buzzer may be used, or a battery-powered electronic chip that is Wi-Fi enabled to alert family members inside or outside the home that the user had fallen. If a bell 733 is used, the striker 732 may have a flexible base to allow for optimal contact of surfaces 703*a* and 703*b* and prevent damage to the bell.

Similarly to the embodiment shown in FIG. 15, a "shield" is attached to the trolley 740, surrounding the magnets 718 to help redirect the magnetic fields away from the user. The shield comprises a ferromagnetic plate 716 (i.e., steel) overlaid by an insulating material 717 (e.g., plastic). If the body of the trolley 740 housing the magnets 718 is made of a ferromagnetic material, then an insulating (non-magnetic) layer such as plastic or aluminum may be added between the metal 716 and the magnet 718.

Features of other embodiments may also be incorporated into the fall control device as shown in FIG. 16. For example, the flexible shield 723 shown in FIGS. 15B and 15C may be attached to the outer surfaces of the braking arm plate 726 and guiding brackets 729. The flexible shield helps prevent the user's fingers or other body parts from getting stuck, pinched, or jammed between the moving surfaces of the braking arm plate 726 and the trolley body 740 or guiding brackets 729 in the travelling or falling orientation. In some embodiments, the fall control systems shown in FIGS. 15A-15C and 16A-16B may not comprise rollers or wheels 710 and may comprise alternative means for allowing movement of the trolley 740 along the guide rail 700. For example, the guide rail 700 and trolley 740 may comprise a plain bearing. In embodiments comprising a plain bearing, to reduce friction and improve movement of the trolley along the guide rail, a smooth, low friction surface, for example, self-lubricating bearing elements such as PBC Linear (Pacific Bearing Company) SIMPLICITY® Linear Plain Bearings may be used. In some embodiments, the fall control system may comprise a curvilinear guide rail such as a Rollon® Curviline rail.

As described herein, the embodiments shown in FIGS. 13-16 may comprise a single speed controller, i.e., without a background speed control system. For example, if the fall control system is used in a location where the guide rail of the fall control system is positioned horizontally with respect to the floor, then fall control system may only require the (primary) speed controller that is activated during a fall event by the user, and the background speed control system may be omitted. As described in more detail below, FIG. 18E provides an example of a fall control system that only comprises a speed control system (and no background speed control system).

FIG. 17A illustrates a user with a walker using a fall control device on a level surface. The trolley 102 (or trolley 220, 320, 620, 740 or 880) moves along elongate guide rail 110. The guide rail 110 may be at or above the user's shoulder height and may be placed higher on the wall, near the ceiling if desired. In use, the user may wear a harness with a tether attached to the trolley at a hanger, roller, pulley, or spring/roller, or spring/pulley combination as described herein. FIG. 17A shows the tether (140) having two points of attachment to the user, but the option for one point, or more than two points, of attachment also exists. Two or more separate tethers may be attached to the hanger on the trolley, or as illustrated in FIGS. 17A and 17B, the tether may be a cord 140 (e.g., a nylon band (belt), an elastic or non-elastic cord) that can go around a roller or pulley 103 that is attached to the trolley 102. A thin flexible padded flap (not shown) may overlay the hanger, or pulley, to prevent injuries to the user. The tether or cord 140 may be adjusted (e.g., pulled tight) using a buckle or other attachment known in the art for a customized length, depending on the user's height and posture. The pulley (or roller) 103 may be on a swivel, to allow the user to change directions once they reach the end of the guide rail 110 without the tether or cord(s) 140 becoming tangled or twisted. An option exists to insert a biasing member 129 (see FIG. 14C), for example a spring, rubber insert or other resilient insert (capable of accepting loads expected from a falling human) between the trolley 102 and the pulley (or roller) 103 that provides an elastic component to the attachment, so that in the event of a fall, there is a less abrupt stop for the user.

In the embodiment shown in FIG. 17A, a pad 105 is placed between the user and the wall. The pad 105 may be similar to a fitness mat or crash mat to help prevent injuries in the event that the user fell against the wall or handrail 115. In some embodiments of the fall control system, the entire wall below the guide rail may be padded and/or any wall handrail 115 may be replaced (FIG. 17A) with a foam handrail. However, the use of the moving lightweight foam pad 105 is a less expensive option and may be more aesthetically pleasing. The pad 105 may be attached to upper bracket 104 and lower bracket 109 that are attached to the trolley 102 that moves with the user. The upper bracket 104 may be attached to the bottom of the trolley (closer to the front of the trolley body so the pad rides away from the wall), using any attachment means 107, for example, via a bolt (FIG. 17B) or some other fastening device known in the art. In order to ensure that the pad is distanced from the wall, elongate attachment means 107 may be used. The upper bracket 104 can be rigid or semi-rigid and may be attached to a lower bracket 109 via a flexible attachment 108, for example, a hinge. The pad 105 which may comprise a rigid or semi-rigid upper backing (for lateral stability) can be permanently attached to lower pad bracket 109; or alternatively the pad 105 may be a removable pad, whereby an upper back portion 105*a* of the pad 105 is removably attached to portion 109*a* of the lower pad bracket 109. The removable attachment may be for example but not limited to, a hook and loop fastener (e.g., Velcro™), magnets, button fasteners, turn button fasteners, push button fasteners, press snap fasteners, spring-loaded clips, or a similar attachment known in the art. If the pad 105 is removably attached to lower bracket 109, this would permit the pad 105 to break-away from the lower pad bracket 109 thereby avoiding tearing of the pad 105 in the event of high or significant downward forces, or prevent damage from vandalism from someone trying to hang on, or pull down on the pad 105, Preferably, the pad 105 would not rest against the wall, but it would be positioned away from the surface of the wall so that it would glide easily and smoothly over handrail 115 and other wall objects that may be present on the wall.

The pad 105 may have a low friction, durable backing such as nylon, ripstop nylon, other ripstop material, abrasion resistant fabric or material (for example comprising Kevlar™ or carbon weave, e.g., from Armortex™), to permit repetitive gliding over the handrail 115. The pad 105 may have one or more creases or folds (for example, horizontal fold 106*a* and/or vertical fold 106*b*), so that the pad 105 may bend during use, and when the user or therapist is finished with the fall control device, the pad 105 may be easily folded. Additionally, the lower section of the pad 105 may fold against the upper portion of the pad 105 so that with the lower half of the pad 105 tucked up behind the upper half, this would allow individuals to use the handrail 115 when the fall control device was not in use. The fall control device comprising pad 105 could also be used on stairs, and if desired, a hole or cut-out at or near the center of the pad 105 could allow the user to hold the handrail 115 while ascending and descending the stairs. It is contemplated that pad 105 may be used in combination with any of the fall control systems described herein.

Alternatively, the pad may comprise a built-in handrail or ledge at a standard height from the floor, constructed, for example, of a dense contoured foam connected to, or part of, the pad that the user grasps while walking. Alternatively, the bracket 104 may be placed on the top surface of the trolley. This would allow the pad to extend to, or higher than, the elongate guide rail to cover (glide over) part of the guide rail adjacent to the side end(s) of the trolley, and/or cover most of the trolley facing the user (except for an opening for the tether attachment) to protect the user from directly striking the trolley or guide rail in the event of a fall towards the wall. A small padded flap can overhang the trolley's tether attachment site to also reduce the chance of injury. For added stability, the pad may also be attached to the elongate guide rail via one or more smaller "mini trollies" that passively glide along the same guide rail as the trolley, with the "mini trollies" travelling at a distance from one or both ends of the trolley.

As illustrated in FIG. 17B, to prevent damage to the end of the trolley, especially on falls on stairs, a resilient bumper 111, for example a rubber bumper, a compressible spring, or similar cushioning material can cushion the impact between the end of the trolley 102 and the end of the guide rail 110. Alternatively, the resilient bumper can be attached to the trolley ends, which may be advantageous to prevent trolley damage if more than one trolley is used on the same elongate guide rail.

Built into the resilient bumper 111 there may be a warning device 113. The warning device 113 may be detachable and may comprise a spring-loaded pin or tab that is biased away from the warning device 113, and passes through an opening in the resilient bumper 111. When the user reaches the end of the rail 110, the trolley 102 hits the spring-loaded pin or tab, which activates a warning device, for example a bell or a small battery powered buzzer or similar device, that alerts the user that they have reached the end of the guide rail 110 and need to stop and/or turn around. Alternatively, an earlier warning device 40 (FIG. 17B) can be placed just below, or above, the guide rail 110 on the wall at a distance away from the end of the guide rail to allow earlier warning for the user to stop and/or turn around. For example, the early warning device 40 may be positioned near to the end of the guide rail, for example, approximately 12 or more inches from the end of the guide rail 110. In some embodiments, the early warning device 40 may comprise a bell or buzzer, attached to the wall above or below the guide rail 110. The early warning device 40 may comprise a rotating lever arm 40*a* attached by a spring-loaded hinge-like mechanism to a spring-loaded piston (rod) 40*b*. The spring loaded piston rod enters a chamber 40*c* containing a bell, a buzzer, or warning device at the end of the piston. As described below, the early warning device 40 would only sound with the trolley 102 going in one direction, but the early warning device 40 could be flipped upside down in the installation process, with the rotating lever arm 40*a* mounted in the opposite direction to allow the early warning device 40 to be used at the opposite end of, or above, the guide rail 110. In the example shown in FIG. 17B, the trolley 102 is moving from the right to the left and would hit the rotating lever arm 40*a*, moving it to the left against the outer edge of 40*c* until the trolley 102 passed. The pressure of 40*a* against the outside edge of 40*c* creates a lever effect, pulling the rod 40*b* out of the chamber 40*c*. When the trolley 102 has passed, rotating lever arm 40*a* springs back to an upright vertical position, the piston or rod 40*b* moves quickly into the chamber 40*c*, striking a bell or buzzer. When the trolley 102 returns, traveling from left to right in FIG. 17B, the lever arm 40*a* moves to the right, but does not pull out the piston 40*b*, and therefore does not activate the early warning device 40.

Conceivably the fall control device can be used in a hospital or other facility settings where it may be unsupervised at times. To decrease the risk of vandalism or injures to those not authorized or trained in its use, a toggle clamp 10 (FIG. 17B) (also known in the art as an "action clamp") may be used to prevent movement of the trolley 102 on the guide rail 110. The toggle clamp 10 is attached to one end of the trolley 102 for example by a bolt. By moving the toggle clamp 10, a hard or semi-flexible tip (e.g., rubber or plastic) presses down firmly on the guide rail 110, preventing movement of the trolley 102. An option exists to lock down the toggle clamp 10 with a key, or a pin with a unique shaped end, that when inserted, unlocks the toggle clamp 10, allowing the trolley 102 to move freely along the guide rail 110.

Figure 17C:
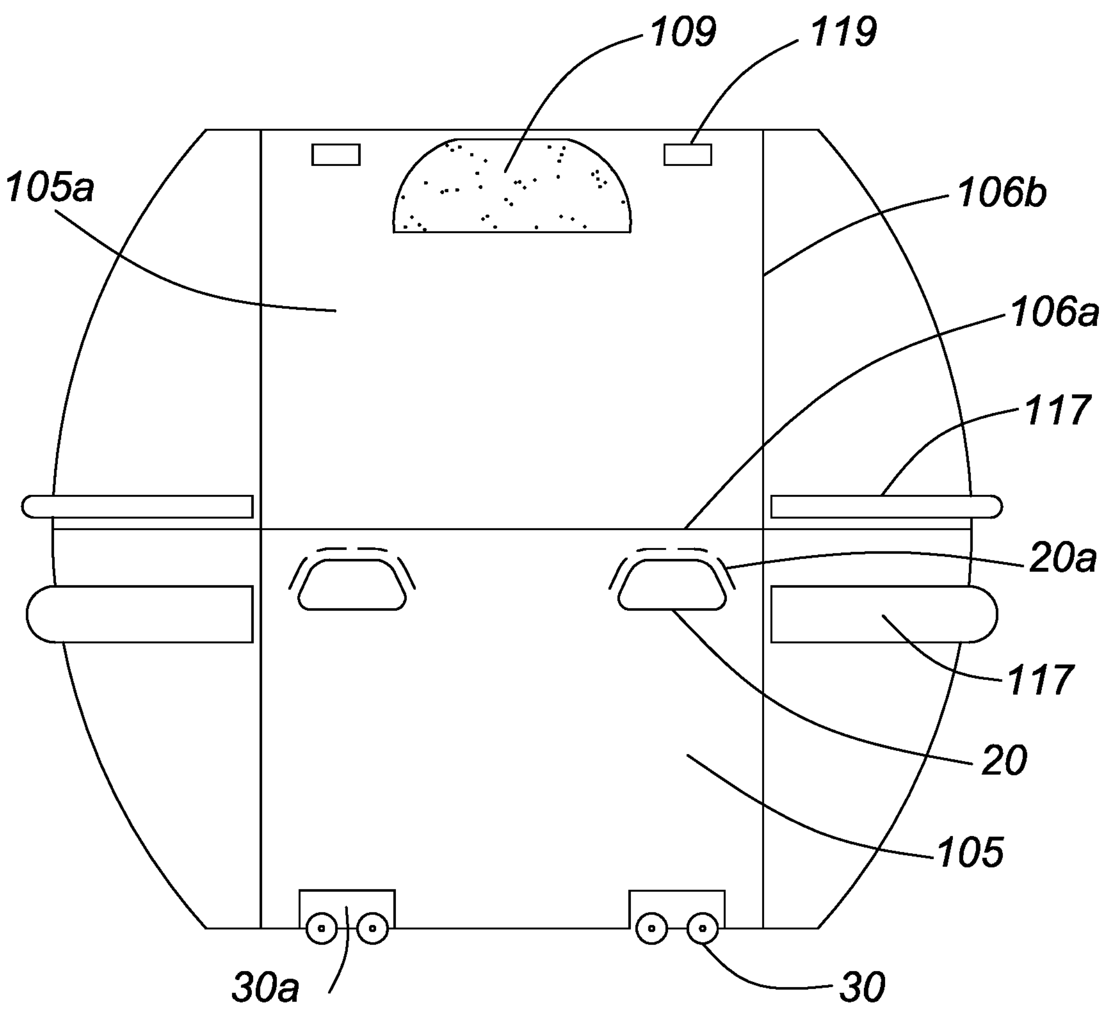
FIG. 17C shows a rear view of the pad 105 of a fall control system similar to the fall control system of FIG. 17A, with wheels 30.

In other embodiments similar to FIGS. 17A and 17B, the pad 105 may extend nearly to, or completely to the floor and may comprise one or more than one pad wheel 30 (FIG. 17C) that allows the pad 105 to ride smoothly across the floor. The one or more than one pad wheel 30 may be on one or more carriage 30*a* attached at the or near the lower edge of the pad 105. For example, as shown in FIG. 17C (backside view of the pad), the pad 105 comprises two carriages 30*a* each having two pad wheels 30 attached at or near the lower edge of the pad 105. In some embodiments, the carriage 30*a* and pad wheels 30 may be on the rear side of the pad 105 as illustrated in FIG. 17C (i.e., the side furthest from the user) to prevent the user from tripping or getting caught on the wheels 30. The pad 105 may comprise magnets 119 that may interact with the carriage 30*a* and pad wheels 30 when the pad 105 is folded to more securely hold the bottom half of the pad 105 when it is not in use. One or more than one rigid, semi-rigid, or flexible, vertical, horizontal, or angled deflectors 117 may be attached at the rear and/or side of the pad 105 to allow the pad 105 to deflect more easily off walls, railings, handrails, or other objects on the wall and to prevent the pad 105 from getting stuck. The pad 105 may comprise holes 20 to allow a user to hold onto the handrail, for example, but not limited to, in a bathroom environment. The holes 20 may also comprise a padded flap 20*a* attached to the pad's front 105 above the holes 20. For example, in the event of a fall, if the user's hand were to come off the hand rail 115, the padded flap 20*a* would fall down, covering the hole 20, preventing the user from striking a body part on the hand rail 115.

FIGS. 18 and 19 illustrate a trolley design that allows the trolley 880 to travel on a curved rail in any direction. It is anticipated that the embodiments illustrated in FIGS. 18 and 19 would have the capability to navigate substantially tighter curves (corners) that the previous embodiments described herein, an advantage in environments such as bathrooms, and U and L shaped staircases. The curved guide rail may comprise a system such as Rollon® Curviline. The Rollon® Curviline system uses curvilinear rails (constant or variable radius) with a trolley having radial ball bearing rollers. However, other curved guide rail systems may also be used.

Figure 18A:
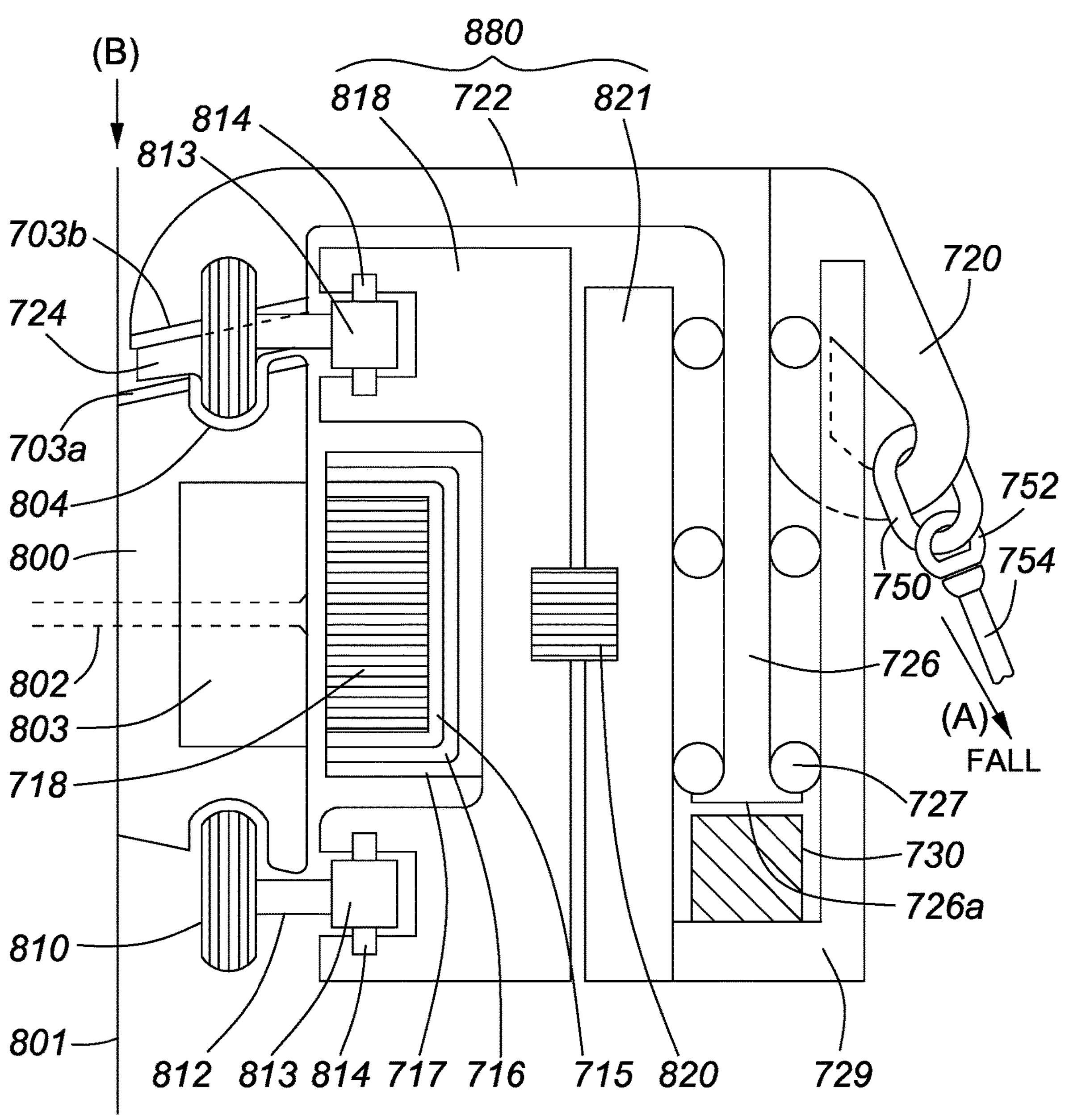
FIG. 18A shows a cross-sectional side view of another example of a fall control system as described herein in the travelling orientation for use on a curved guide rail as viewed from line A-A in FIG. 18D.
Figure 18B:
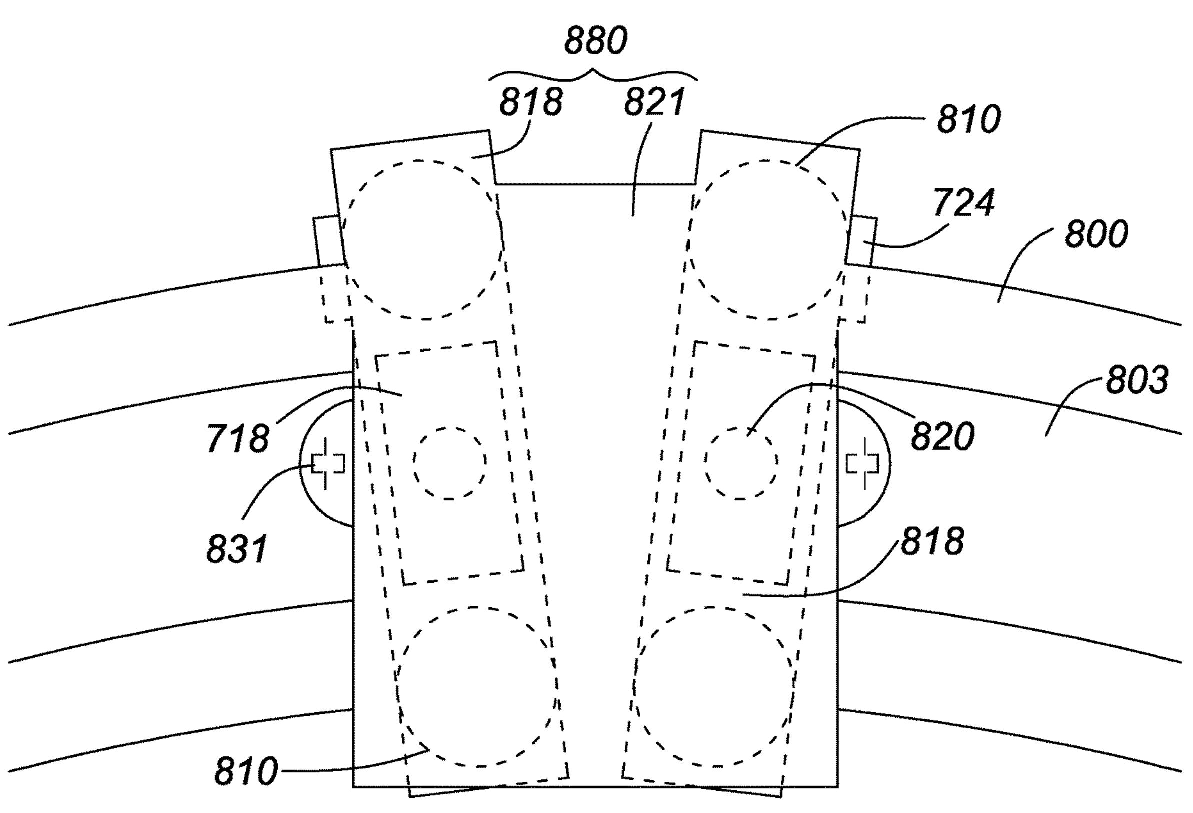
FIG. 18B shows a front view of the speed control system of FIG. 18A (speed controller 726, 729, 722, 720 not shown).
Figure 19A:
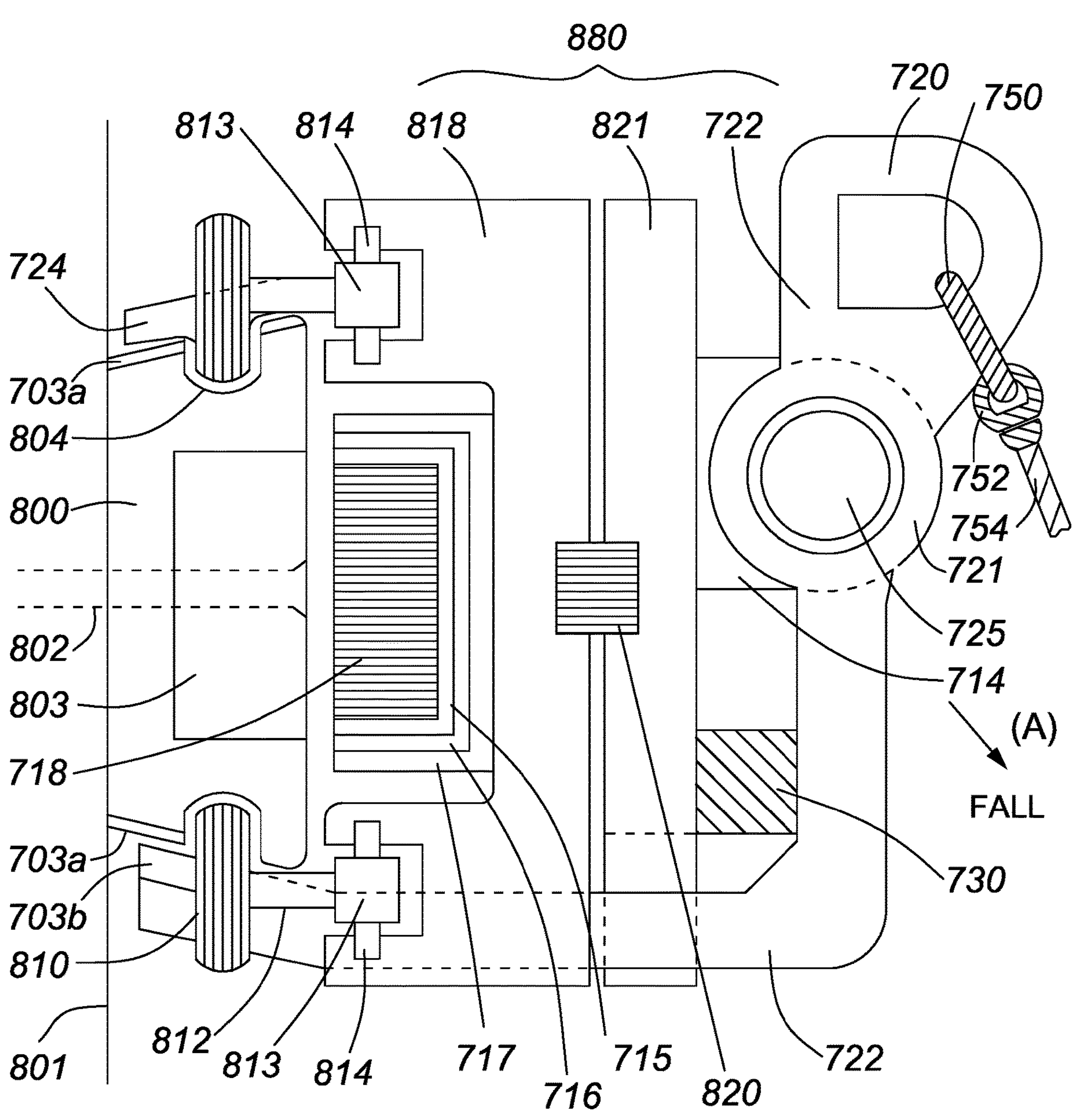
FIG. 19A shows a cross-sectional side view of another example of a fall control system as described herein in the travelling orientation for use on a curved guide rail as viewed from line A-A in FIG. 19B.

FIGS. 18A, 18B and 19A illustrate a rail system based on a curved track system, for example, but not limited to, the Rollon® Curviline system that allows for movement of the trolley 880 along a constant or variable radius curved guide rail 800, as well as a straight guide rail. The trolley 880 may comprise at least two pairs of wheels (e.g., four wheels) 810 riding in raceways (concave depressions) 804 on the guide rail 800. However, additional numbers of wheels may be used, for example, 4, 5, 6, 7, 8, 9, 10 or more wheels, depending on the size of the wheels and the size of the trolley. The guide rail 800 may be attached to the wall 801 via a screw or bolt 802 or another fastening device. Each pair of wheels 810 may be attached to a swivel arm 818, with each swivel arm 818 rotatable about an axis 820, for example using pivot bolt, or other similar connection between the swivel arms 818 and the top plate 821. The swivel arms 818 are able to pivot, allowing the wheels 810 to follow, in addition to a straight rail, a constant or variable radius curved guide rail 800. FIG. 18B illustrates how the wheels 810 would function on a curved track with the swivel arms 818 moving to allow the wheels 810 to follow the curve. Two flexible sweepers 724 at each end of the swivel arms 818 may be present to clear the raceways 804 and the top of the guide rail 800 of any debris to allow for smooth movement of the wheels 810 and ensure a firm braking motion in the event of a fall (described below). Small holes (not shown) may be drilled in the bottom of the raceways 804, exiting at the bottom of the guide rail 800 to allow drainage of water, so that the fall control system could be used on the walls in a bathroom, including the shower.

Figure 18C:
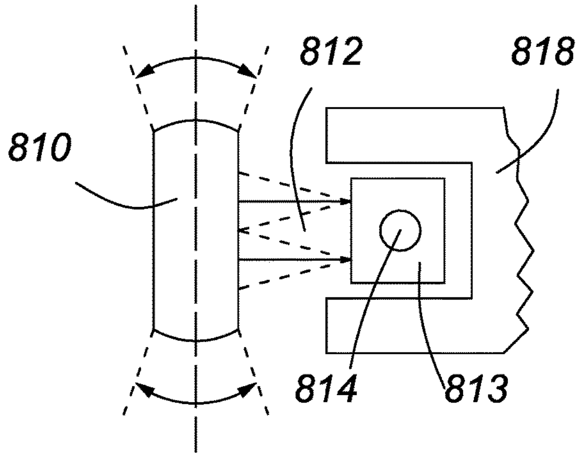
FIG. 18C shows a top enlarged, partial view of one of the wheel assemblies of FIG. 18A.

However, the above described curved rail system only allows the trolley to move in one plane; for example, it would not allow the trolley 880 to follow the walls on an L or U-shaped staircase with a landing in between the flights of stairs. To overcome this problem, the fall control device shown in FIGS. 18 and 19 may comprise an additional wheel attachment assembly (see FIG. 18C) that allow the wheels 810 to independently (and passively) turn right or left (in the direction of the arrows in FIG. 18C). This allows the trolley 880 to navigate curves right, left, as well as up or down. As shown in FIG. 18C, wheel 810 may be attached to a mounting block 813, for example, a rectangular, square, circular, rod, or other shaped block via an axle 812 (as illustrated in FIG. 18A). The mounting block 813 pivots via one or more short axles 814 or other pivotable connection in a channel set into the ends of the swivel arm 818. These short axles 814 may be biased, for example, spring loaded to return the wheels 810 more quickly to a neutral position when the trolley 880 is traveling on a straight part of the guide rail 800. Nylon bushings or other durable, low friction material known in the art may be used between the surfaces of the block 813 and the swivel arm 818, to allow for highly repetitive, low-friction pivoting movements for longer life. Limits may be set on how far the wheels 810 can turn right or left by adjusting the size of the block 813 in the channel setting. The wheel assembly 813, 814, 812, 810 shown in FIG. 18C that allows the wheels 810 to turn right or left may also be used in other embodiments described herein, for example in FIGS. 15 and 16 to allow the trolley with wheels 710 to negotiate a curved guide rail 700.

For the fall control device illustrated in FIGS. 18 and 19, it is expected that, in the event of a fall, the forces acting on the tether 754 and/or hanger 720 will be down and away from the wall. However, with all wheels 810 turning passively right or left, it is possible that if the user and therefore the trolley 880 is traveling relatively fast and entering a tight corner, that the wheels 810 may partially or fully ride up on the raceways 804, causing the leading side edge of the trolley 880 to possibly strike the guide rail's front surface. To avoid this, guiding wheels 831 (shown in FIG. 18B) may be attached to the opposing edges of the top-plate 821 of the trolley 880. The guiding wheels 831 may not be in constant contact with the guide rail 800, but would keep the side edges of the trolley 880 a minimum distance away from the guide rail's front surface at all times to prevent the trolley 880 from collapsing against the guide rail 800 during times of high radial forces that push the trolley 880 towards the guide rail 800 and wall.

In FIGS. 18A, 18B and 19A a background speed controller (e.g., an eddy current braking mechanism or gear wheel mechanism as previously described) is always active. Magnets 718 are attached to the underside of each swivel arm 818, with the magnetic fields shielded by one or more ferromagnetic and non-ferromagnetic coverings, for example three shields 715, 716, 717 as shown in FIGS. 18A and 19A, and as previously described with reference to FIGS. 15A and 16A. The magnets 718 face the guide rail surface 803 (FIGS. 18A, 18B and 19A) that is composed of a conductive, but non-ferromagnetic material (e.g., aluminum). Alternatively, as illustrated in FIG. 18E, the fall control system may not comprise a background speed controller. For example, if the fall control system is used in a location where the guide rail of the fall control system is positioned horizontally with respect to the floor, and the guide rail is not positioned at an angle with respect to the floor, for example located beside a set of stairs, then fall control system may only require the (primary) speed controller that is activated during a fall event by the user, and the background speed control system may be omitted.

Figure 18D:
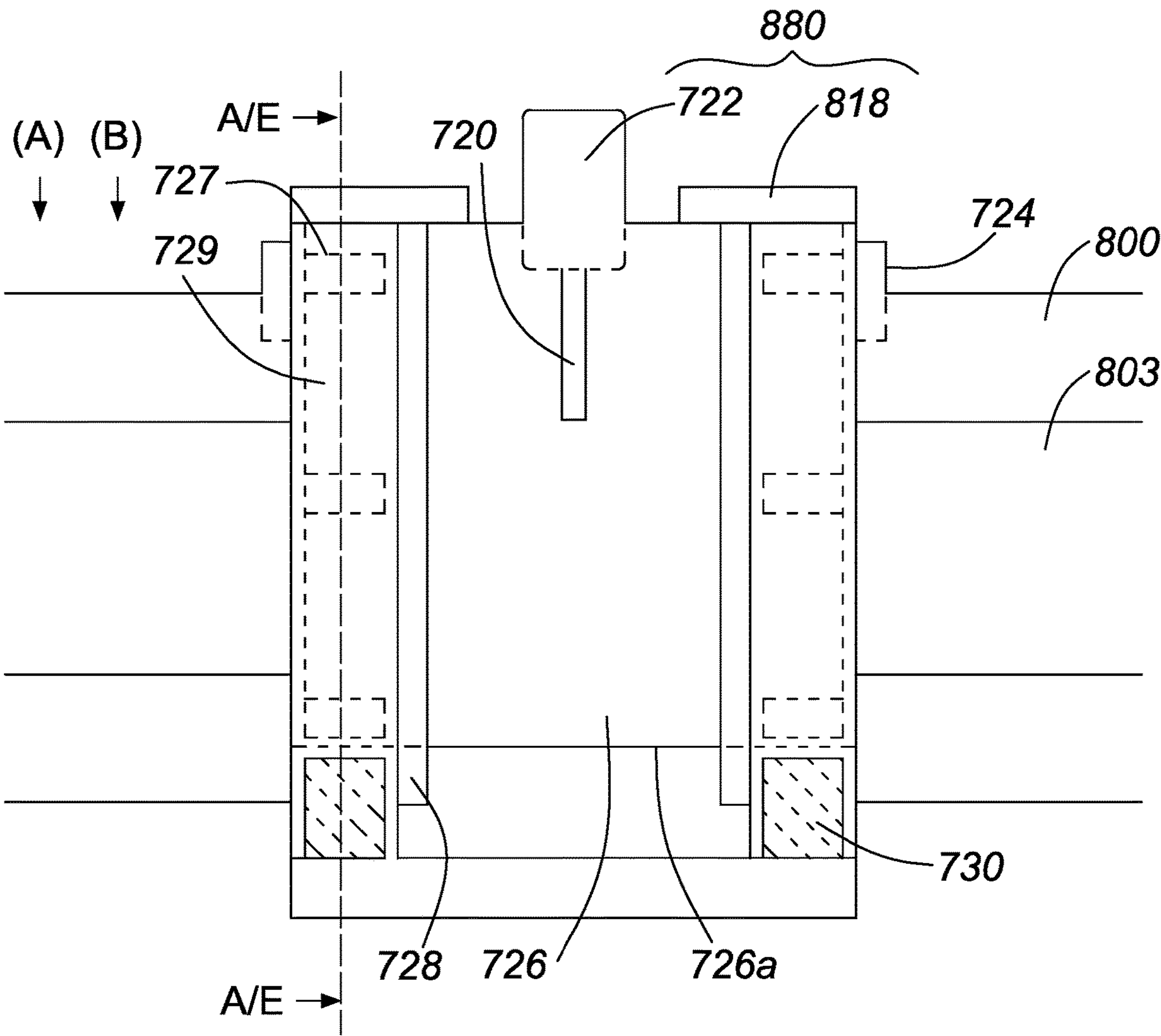
FIG. 18D shows a front view of the fall control system of FIG. 18A.
Figure 18E:
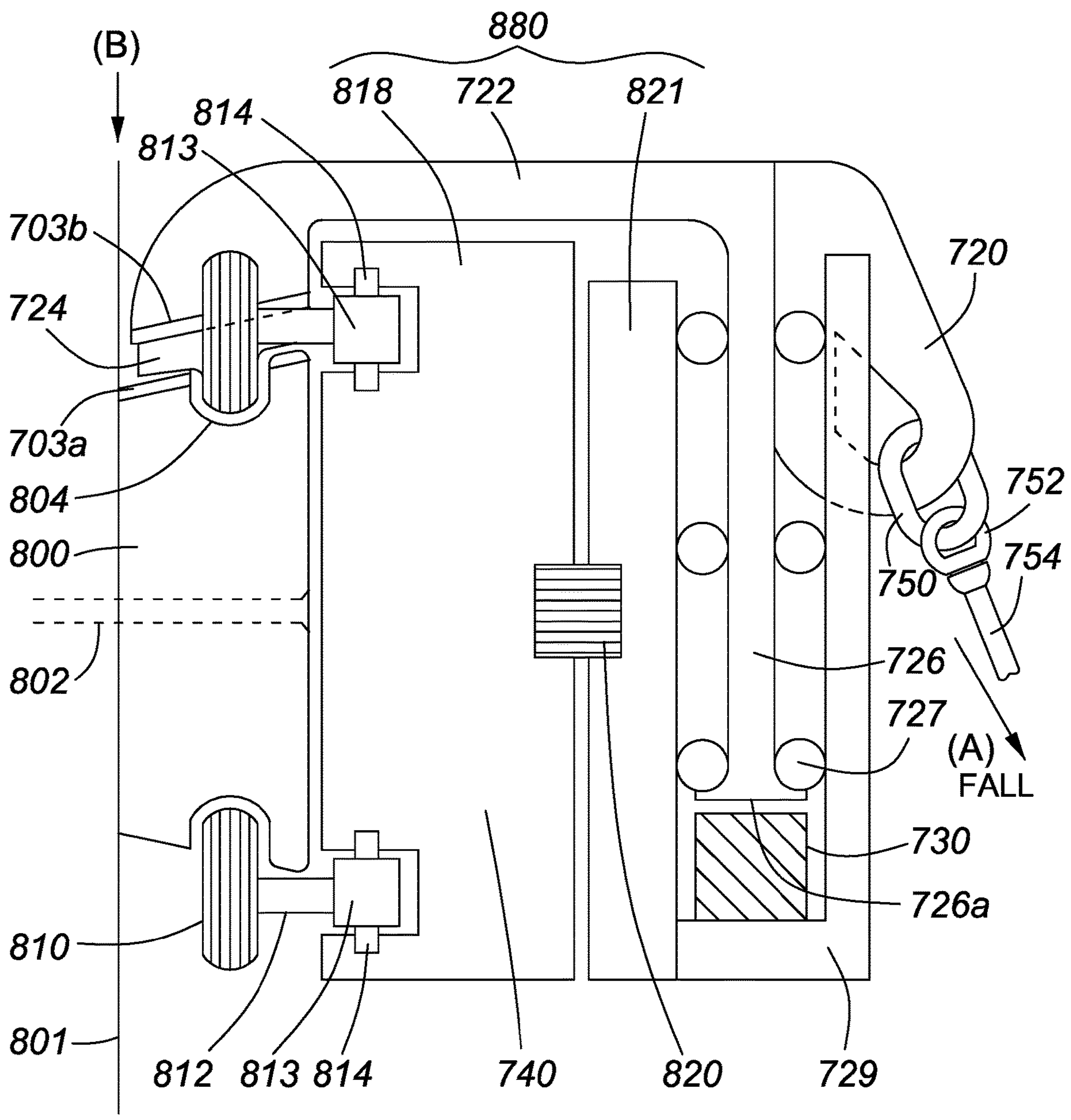
FIG. 18E shows a cross-sectional side view of a fall control system similar to the fall control system of FIG. 18A, except without the background speed controller.

FIGS. 18A and 18D illustrate a hanger 720, braking arm plate 722, and rollers/balls 727 as previously described for FIGS. 16A and 16B. However, in contrast to FIGS. 16A and 16B, the one or more than one biasing member 730, for example a spring, rubber member or other resilient member, is located below the lower edge of the braking arm plate 726*a*. The biasing member 730 biases the braking plate 726 away from the bottom ledge of the guiding bracket 729. In a falling orientation, the braking plate 726 is pulled down, engaging the speed control track 703*a* with the braking arm surface 703*b*, thereby activating the braking mechanism. Also in contrast to FIGS. 16A and 16B, the speed control track 703*a* and corresponding opposing braking arm surface 703*b* both slope down toward the wall. This prevents the trolley from being pulled away from the guide rail 800 during a strong braking action, if a user vigorously pulls down on the braking arm 722. FIG. 18D also illustrates thin flexible shields 728 that protect the user from getting fingers, other body parts, or clothing caught between the braking arm plate 726 and the guiding brackets 729. The features shown in FIGS. 18A-18D may also be used in the embodiments illustrated in FIGS. 16A and 16B.

Figure 19B:
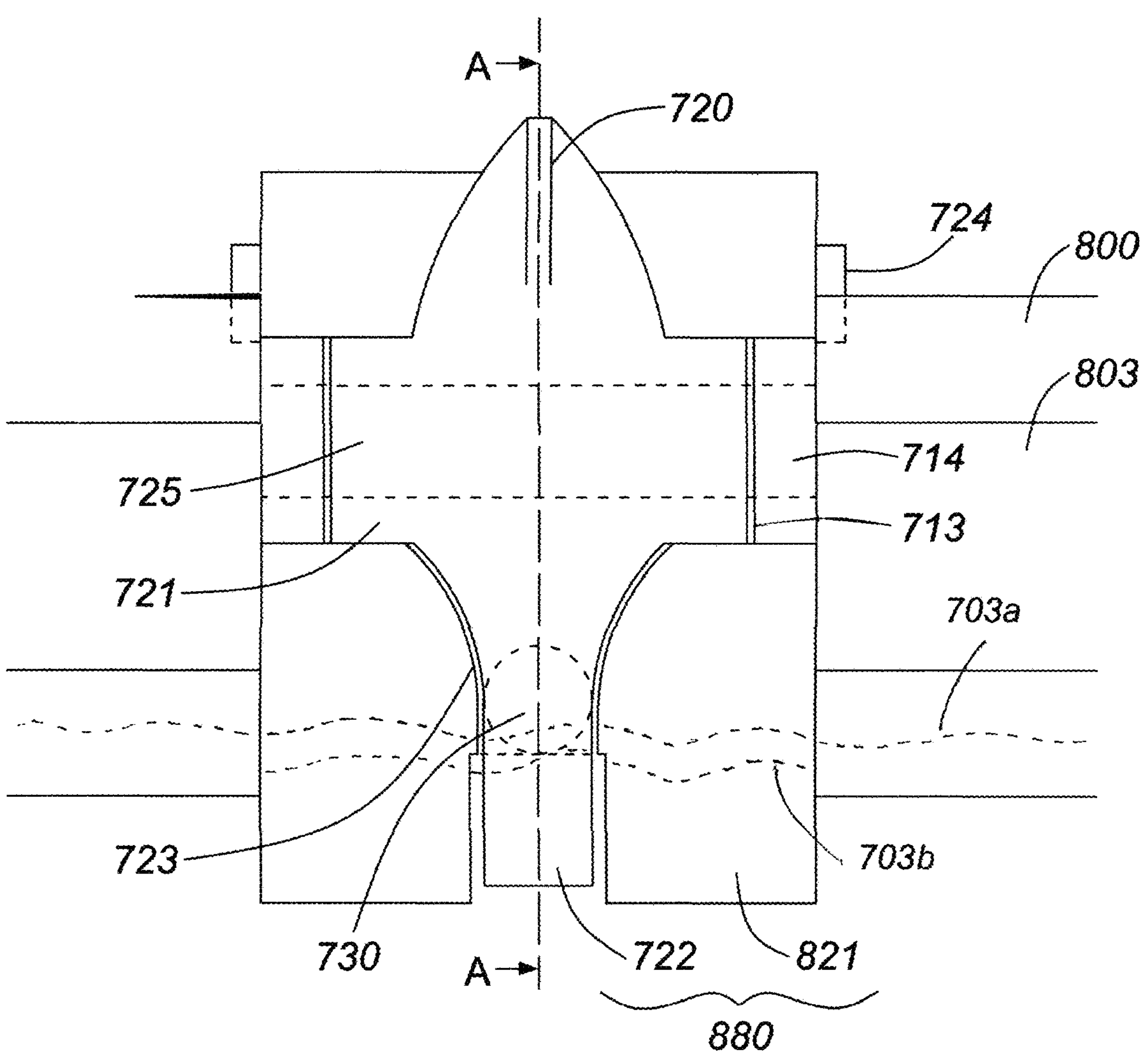
FIG. 19B shows a front view of the fall control system of FIG. 19A.

FIG. 19A has a speed controller comprising a similar braking mechanism to the embodiments illustrated in FIGS. 15A and 15B. The differences in the braking arm mechanism are: a) as illustrated in FIG. 19B, the bottom of the braking arm 722, when viewed from the front, is narrower than the lower portion of the braking arm as shown in FIG. 15B (this permits the lower portion of the braking arm 722, when viewed from the front, to sit between swivel arms 818), but the option exists for braking arm 722 to be wider e.g., if it extended below the lower edge of the trolley while still permitting the surface of the braking arm 703*b* to engage the surface of the elongate guide rail 703*a*; and b) surfaces 703*a* and 703*b* slope upward toward the wall to allow for better grip of the braking surfaces. Top plate 821 may comprise an opening to permit the passage of braking arm 722, of alternatively top plate 821 may be dimensioned such that it does not overlap or interfere with the passage of braking arm 722. Guiding wheels 831 as shown in FIG. 18B may also be present in the embodiment shown in FIG. 19. The additional or alternative features shown in FIGS. 18A and 19B may also be used in the embodiments illustrated in FIGS. 15A and 15B and vice versa.

For several of the embodiments described herein, it is anticipated that the guide rail 800 will be usually installed on flat, non-curved walls. However, if curved rail is installed to navigate inside or outside corners (for example an inside corner within a stairwell, or an outside corner between a hall and a room), then a portion of the rail may be mounted at a greater distance away from the wall as the curved rail passes around the corner, since the radius of the curve of the rail may be greater than the curve of the corner. In this case, one or more brackets bridging the distance between the guide rail and the wall may be needed to provide adequate support for the guide rail 800 and trolley 880 system. When navigating tight turns where the guide rail 800 is in a convex configuration relative to the trolley 880, the center of the trolley may slightly move toward the guide rail 800 and wall, and in some cases may cause the end of the braking arm 722 to partially overshoot the guide rail 800, and potentially strike the wall. It is anticipated that in applications where the guide rail 800 is in a convex orientation relative to the trolley 880, that the guide rail 800 will be positioned away from the wall by brackets, which would allow the braking arm 722 to partially overshoot the guide rail 800 without hitting the wall.

The guide rail 110 may be provided in sections, e.g., in 1, 2, 4, or 8 foot, or other lengths, and may be directly attached to the wall, or metal brackets can first be installed on the wall to which the guide rails are attached. An advantage to first installing the metal brackets is that for walls with unevenly spaced wall studs, screws or other fastening devices can be placed at almost any point in the bracket that attaches to the wall. The metal brackets may have guiding slots at both ends to ensure good alignment of the brackets end-to-end. Predrilled holes in the metal bracket may match the hole spacing in the guide rails for easy and perfect alignment using bolts or other fastening devices. This bracket system may be used for the installation of all the guide rail embodiments discussed herein.

For the embodiments described herein, particularly the embodiments shown in FIGS. 9A-9C, 10A-10B, 11A-11B, 13A-13C, 14A-14G, 15A-15C, 16A-16B, 18A-18E and 19A-19B, the tether attachment end of the braking arm or trolley is offset from, and extends outward from, the elongate guide rail at a distance perpendicular to the plane (or longitudinal axis) of the elongate guide rail (i.e., it is not directly above or below the elongate guide rail), meaning that the forces (e.g., torsional force) applied by the user as well as gravitational forces must be considered. For all embodiments, particularly in applications where the device is used on stairs, multidirectional forces on the hanger 146, 720 would be anticipated. Without wishing to be bound by theory, increasing the ratio of the bearing length (the length between the axels of the outermost wheels; distance X shown in FIG. 15B) to the lever length (distance Y" shown in FIGS. 15A and 16A) reduces the risk of the trolley binding (sticking) on the guide rail. Since the braking arm 722 extends outwards from the plane of the plain bearing/wheel assembly, during use while the user is walking, ascending or descending stairs and the trolley is moving along the guide rail, the user exerts forces on the braking arm 722 in two directions, down, as well as outward, from the wall. As a result, the "lever length" is a combination of both the length, Y (distance from the rollers 710 to the hanger 720 at right angles to the rail; FIGS. 15A and 16A), and length, Y' (Y prime; the distance between the axel of roller 710 and the hanger 720 in the same plane as the guide rail, resulting in length Y" (Y double prime), the compound moment arm distance. For embodiments where a plain bearing (or other linear motion system) between the trolley and guide rail is used, binding may be avoided by approximating (e.g., not exceeding) a 2:1 ratio (of the moment arm distance, Y": bearing length, X). The 2:1 ratio is also known as the "Binding Ratio" (see URL: pages.pbclinear.com/rs/909-BFY-775/images/White-Paper-Demystifying-the-2-1-Ratio-and-Stick-Slip-Phenomenon.pdf). The "binding ratio" may be defined as the maximum ratio of moment arm distance (Y") to bearing length (X) which will not bind (prevent motion) of the linear bearing or wheels, when a torque is applied to braking arm 722. For example, in a plain bearing system, the composite length of the braking arm 722 from point of attachment at the trolley at 725 to the end of the hanger 720 where the trolley is attached to the user (distance Y"; Y double prime) should not exceed twice the width of the bearing length where the trolley contacts the guide rail at each end (distance X). The ratio may be higher for linear systems with ball bearing or wheel systems, depending on the coefficient of friction.

In an analogous manner, binding may also be considered for the ratio of the moment arm distance, Y" (Y double prime), of the braking plate 726 and guide brackets 729 (FIGS. 16A and 18A) to the bearing length (X). As shown in FIGS. 16A and 16B (not to scale), the bearing length is wide relative to the moment arm distance Y", thus reducing bearing friction resulting from torque applied to the trolley body during a fall event.

A second potential site of binding that is avoided in the designs discussed herein is within the braking mechanism itself. For example, in FIGS. 15A-15B and 19A-19B, the width of the cylindrical shaft 725 (analogous to "X" in a plain bearing system) is maximized, and the horizontal distance between the outer edge of hanger 720 to the braking shaft 725 (analogous to "Y") is minimized to prevent binding of the braking shaft 725 when rotating inside the middle cylindrical surround 721. Another example is FIGS. 16A-16B and 18A-18D, where the width of the braking arm plate 726 (analogous to "X") is maximized, and the horizontal distance between the outer edge of the hanger 720 to the braking arm plate 726 (analogous to "Y") is minimized to prevent binding of the plate 726 within the guiding bracket 729. This second potential binding site may play a role in wall mounted gait control systems wherein in the event of a fall, multidirectional forces acting on the braking arm have the potential to cause binding. In contrast, the second potential binding site is relatively unimportant in overhead gait control systems known in the art, where the braking mechanism consists of a lever being pulled straight down, with little or no forces pulling it to one side or the other.

To further reduce the chance of the braking plate 726 binding against the guide brackets 729, nylon or other low friction material can be placed on a surface of the trolley body 728 adjacent the ends of the braking plate on the inner guide bracket 729 to provide a smooth gliding surface between the braking plate 726 and the guide brackets 729. In some embodiments, rolling elements 727 are not present and a smooth, low friction surface on the inside of the guide bracket 729 is instead provided. Since it is anticipated that falls would be infrequent, there would be minimal wear on the rolling elements and low-friction surfaces.

It is contemplated that any part of any aspect or embodiment discussed in this specification can be implemented or combined with any part of any other aspect or embodiment discussed in this specification. While particular embodiments have been described in the foregoing, it is to be understood that other embodiments are possible and are intended to be included herein. It will be clear to any person skilled in the art that modification of and adjustment to the foregoing embodiments, not shown, is possible.

What is claimed is:

1. A fall control system comprising, an elongate guide rail extending along a longitudinal axis, the elongate guide rail comprising one or more than one raceway and a lateral mounting portion extending along the longitudinal axis of the elongate guide rail, the lateral mounting portion for mounting the elongate guide rail laterally to a vertical weight bearing surface, such that the longitudinal axis of the elongate guide rail is substantially parallel to the vertical weight bearing surface, a trolley adjacent to and engaged with a first portion of the elongate guide rail, the trolley configured to move along the one or more than one raceway of the elongate guide rail, the trolley comprising a trolley body and a braking arm, the braking arm attached to the trolley body and moveable from a first position to a second position, the braking arm comprising an attachment end and a braking end, the attachment end of the braking arm extending outwards from the trolley body in a direction substantially perpendicular to the longitudinal axis of the elongate guide rail and substantially perpendicular to the vertical weight bearing surface;

a tether attached at a first end of the attachment end of the braking arm, a second end of the tether for attaching to a user, and a speed control system for controlling a speed of the trolley along the elongate guide rail, the speed control system comprising:

one or more than one speed control track extending along the longitudinal axis of the elongate guide rail, the one or more than one speed control track comprising a first surface; and a speed controller coupled to the trolley, the speed controller comprising a surface of the braking arm for frictionally engaging with the first surface of the one or more than one speed control track for controlling the speed of the trolley along the elongate guide rail in the falling orientation, wherein the braking arm is movable from the first position when the trolley is in a travelling orientation and the speed controller does not reduce speed, or temporarily stop movement, of the trolley along the elongate guide rail when the user is attached to the tether, to the second position when the trolley is in the falling orientation, so that the surface of the braking arm frictionally engages the first surface of the one or more than one speed control track, and the speed controller reduces speed, or temporarily stops movement, of the trolley along the elongate guide rail thereby decreasing the user's ground impact speed during a fall event to prevent or minimize injury from a fall, wherein the first surface of the speed control track is a sinusoidal wave surface and the surface of the braking arm is a flat surface or a sinusoidal wave surface, or the first surface of the speed control track is a flat surface and the surface of the braking arm is a sinusoidal wave surface or a flat surface.

2. The fall control system of claim 1, the trolley comprising one or more than one roller for moving the trolley along the one or more than one raceway of the elongate guide rail.

3. The fall control system of claim 2, the fall control system further comprising a background speed controller comprising a gear wheel coupled to the one or more than one roller of the trolley, the gear wheel comprising a plurality of teeth, and the trolley comprising a moveable arm with a single point or multiple points of contact configured to interact with the teeth of the gear wheel.

4. The fall control system of claim 2, wherein the one or more than one raceway of the elongate guide rail comprises one or more than one pair of raceways, and the one or more than one roller of the trolley comprises one or more than one pair of rollers, wherein the one or more than one pair of rollers are attached to each end of a swivel arm that rotates around a pivot on the trolley body having a first axis of rotation substantially perpendicular to the direction of movement of the trolley, and wherein each roller in each or more than one pair of rollers is pivotable about a second axis of rotation substantially perpendicular to the direction of movement of the trolley, wherein the movement of the swivel arm about the first axis of rotation and movement of each roller about the second axis of rotation allow the trolley to move along a guide rail curving in any direction.

5. The fall control system of claim 1, the speed control system further comprising a background speed controller coupled to the trolley and engaged with the elongate guide rail, the background speed controller for controlling the speed of the trolley along the elongate guide rail in a traveling orientation while the user is walking, ascending stairs, or descending stairs.

6. The fall control system of claim 5, wherein the background speed controller comprises one or more than one magnet, and the elongate guide rail comprises a conductive portion extending along the elongate guide rail.

7. The fall control system of claim 1, the trolley further comprising a braking plate moveable in a compartment formed by the body of the trolley and a guide plate, the braking plate slidable in a plane parallel to the elongate guide rail when the braking arm moves from the first position to the second position.

8. The fall control system of claim 7, wherein the compartment comprises one or more rolling elements in the compartment, the rolling elements sandwiched between the braking plate and the guide plate and between the braking plate and the body of the trolley.

9. The fall control system of claim 1, wherein the one or more raceways of the elongate guide rail comprise one or more than one rod, and the trolley comprises one or more than one roller for engaging with the one or more than one rod.

10. The fall control system of claim 9, wherein the one or more than one rod has a convex surface and the one or more than one roller of the trolley has a corresponding concave surface.

11. The fall control system of claim 1, further comprising a pad configured to hang from the trolley between the user and a portion of the vertical weight bearing surface below the trolley, when the trolley is mounted on the elongate guide rail and the elongate guide rail is mounted laterally on the vertical weight bearing surface, the pad is moveable with the trolley along the elongate guide rail, wherein the pad prevents or reduces injury to the user should the user fall against the portion of the vertical weight bearing surface below the trolley.

12. The fall control system of claim 11, wherein the pad comprises one or more than one hole to allow the user to hold a handrail mounted on the vertical weight bearing surface, or the pad comprises the handrail attached to or built-in to the pad.

13. The fall control system of claim 11, wherein the pad is positioned to cover the trolley, a second portion of the elongate guide rail, or a combination thereof.

14. The fall control system of claim 11, wherein the pad is removably attached to the trolley, the pad is foldable, the pad comprises one or more than one pad wheel at a lower edge of the pad, or a combination thereof.

15. The fall control system of claim 11, wherein the pad is an impact-attenuating pad.

16. The fall control system of claim 11, wherein the pad is a fitness pad or a crash pad.

17. The fall control system of claim 1, wherein the tether comprises two or more attachment points for attaching the trolley to the user.

18. A fall control system comprising:

an elongate guide rail extending along a longitudinal axis, the elongate guide rail comprising one or more than one speed control track and a lateral mounting portion for mounting the elongate guide rail laterally to a vertical weight bearing surface, such that the longitudinal axis of the elongate guide rail is substantially parallel to the vertical weight bearing surface;

a trolley configured to move along the elongate guide rail, the trolley comprising an attachment end;

a tether attached to the attachment end of the trolley at a first end, a second end of the tether for attaching to a user;

a first speed control system for controlling a speed of the trolley along the elongate guide rail, wherein the first speed control system reduces speed, or temporarily stops movement of the trolley along the elongate guide rail, by engaging with a first surface of the one or more than one speed control track; and a pad coupled to the trolley and configured to be positioned between the user and a portion of the vertical weight bearing surface below the trolley when the trolley is mounted on the elongate guide rail and the elongate guide rail is laterally mounted to the vertical weight bearing surface, the pad moveable with the trolley along the elongate guide rail, wherein the pad prevents or reduces injury to the user should the user fall against the vertical weight bearing surface below the trolley.

* * * * *